United States Patent [19]

Miyazaki et al.

[11] Patent Number: 5,227,831
[45] Date of Patent: Jul. 13, 1993

[54] AUTO-ZOOMING CAMERA APPARATUS HAVING ADVANCED PHOTOGRAPHING-MAGNIFICATION SETTING AND DISPLAYING FUNCTIONS

[75] Inventors: Satoshi Miyazaki; Junichi Itoh; Yasuo Tanbara; Mitsuo Kawazoe, all of Tokyo, Japan

[73] Assignee: Olympus Optical Co., Ltd., Tokyo, Japan

[21] Appl. No.: 734,222

[22] Filed: Jul. 22, 1991

[30] Foreign Application Priority Data

Aug. 17, 1990 [JP] Japan .................. 2-215895

[51] Int. Cl.⁵ .................. G03B 3/00; G03B 7/00; G03B 17/18
[52] U.S. Cl. .................. 354/402; 354/412; 354/475
[58] Field of Search .............. 354/402, 412, 474, 475, 354/400

[56] References Cited

U.S. PATENT DOCUMENTS 4,942,417  7/1990  Miyazawa et al. .......... 354/400

FOREIGN PATENT DOCUMENTS 63-220118  9/1988  Japan .

Primary Examiner—Russell E. Adams
Assistant Examiner—Jae N. Noh
Attorney, Agent, or Firm—Frishauf, Holtz, Goodman & Woodward

[57] ABSTRACT

A photographing lens system includes at least one zooming lens. A photometric circuit measures brightness of an object. An exposure calculation circuit calculates an exposure value in accordance with an output from the photometric circuit. A distance measurement circuit measures a distance to the object. A magnification setting circuit determines a photographing magnification of an image of the object to be formed on a film arranging surface. An auto-zooming calculation circuit determines a focal length of the photographing lens system in accordance with an output from the magnification setting circuit, and an output from the distance measurement circuit. A drive circuit drives the zooming lens in accordance with an output from the auto-zooming calculation circuit. A switch is turned on upon a first stroke of a release button. A switching circuit outputs a first value in accordance with a setting value of the magnification setting circuit before the switch is turned on, and outputs a second value according to an output from the exposure calculation circuit after the switch is turned on. A display selectively displays the first and second values.

17 Claims, 46 Drawing Sheets

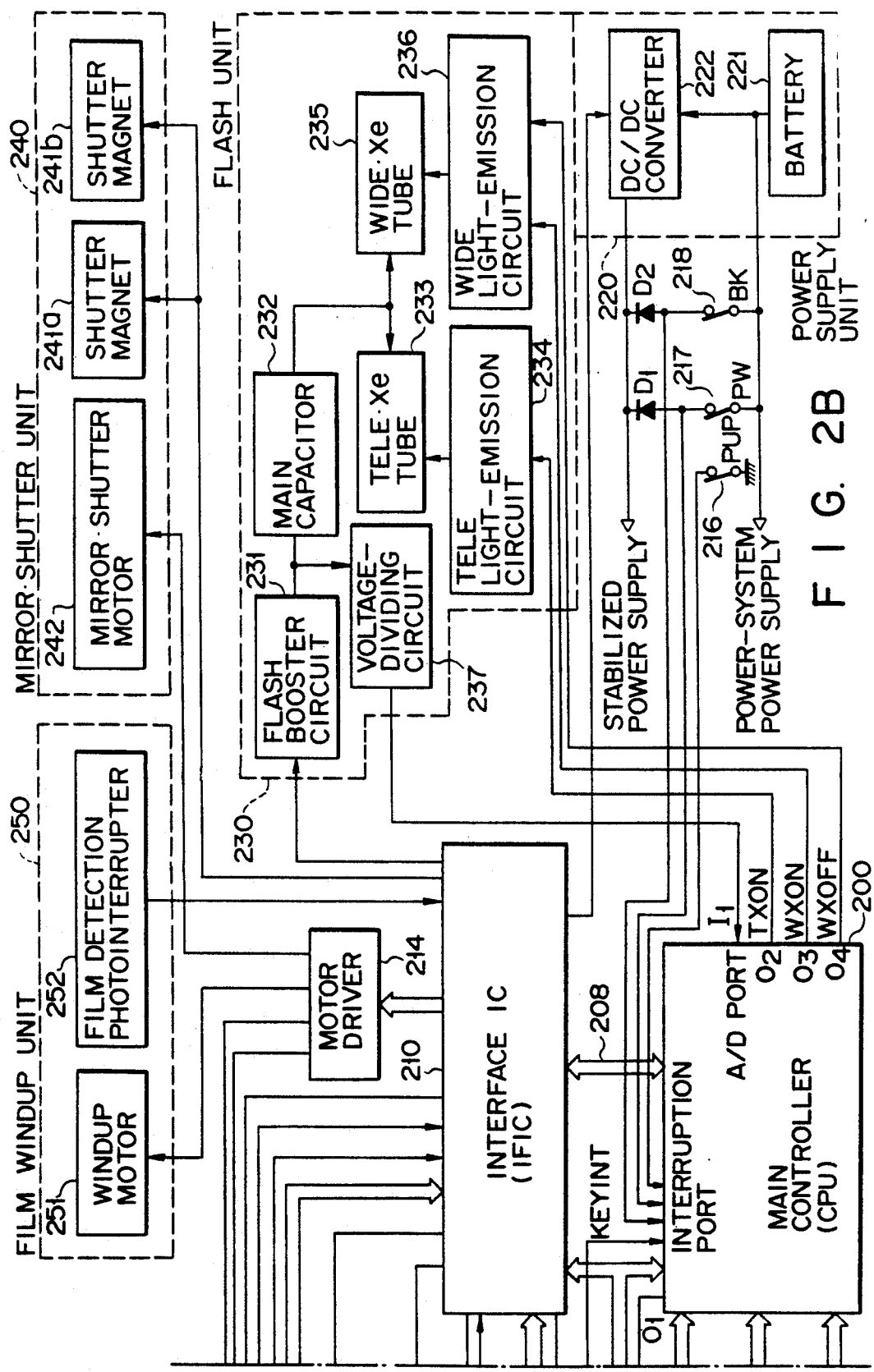
F I G. 2B

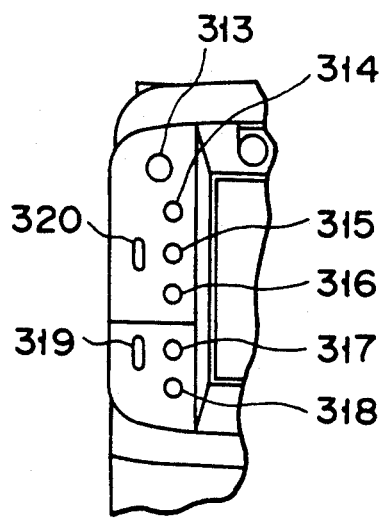
F I G. 3A
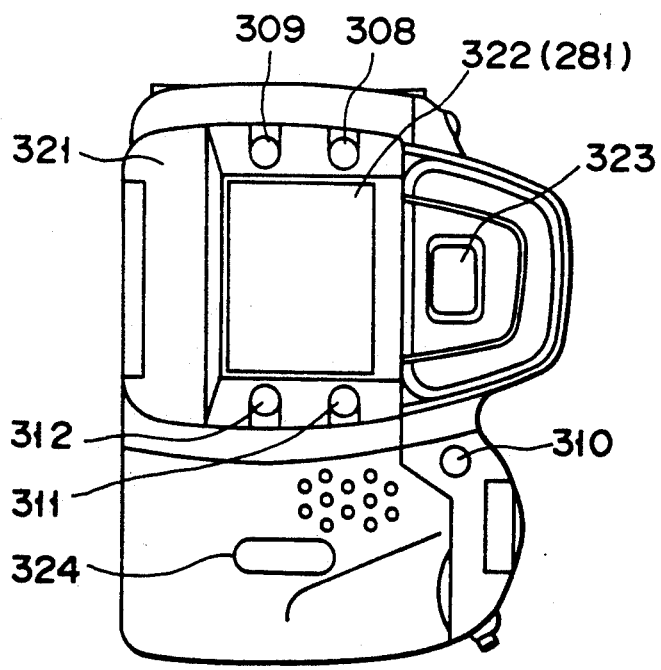
F I G. 3B

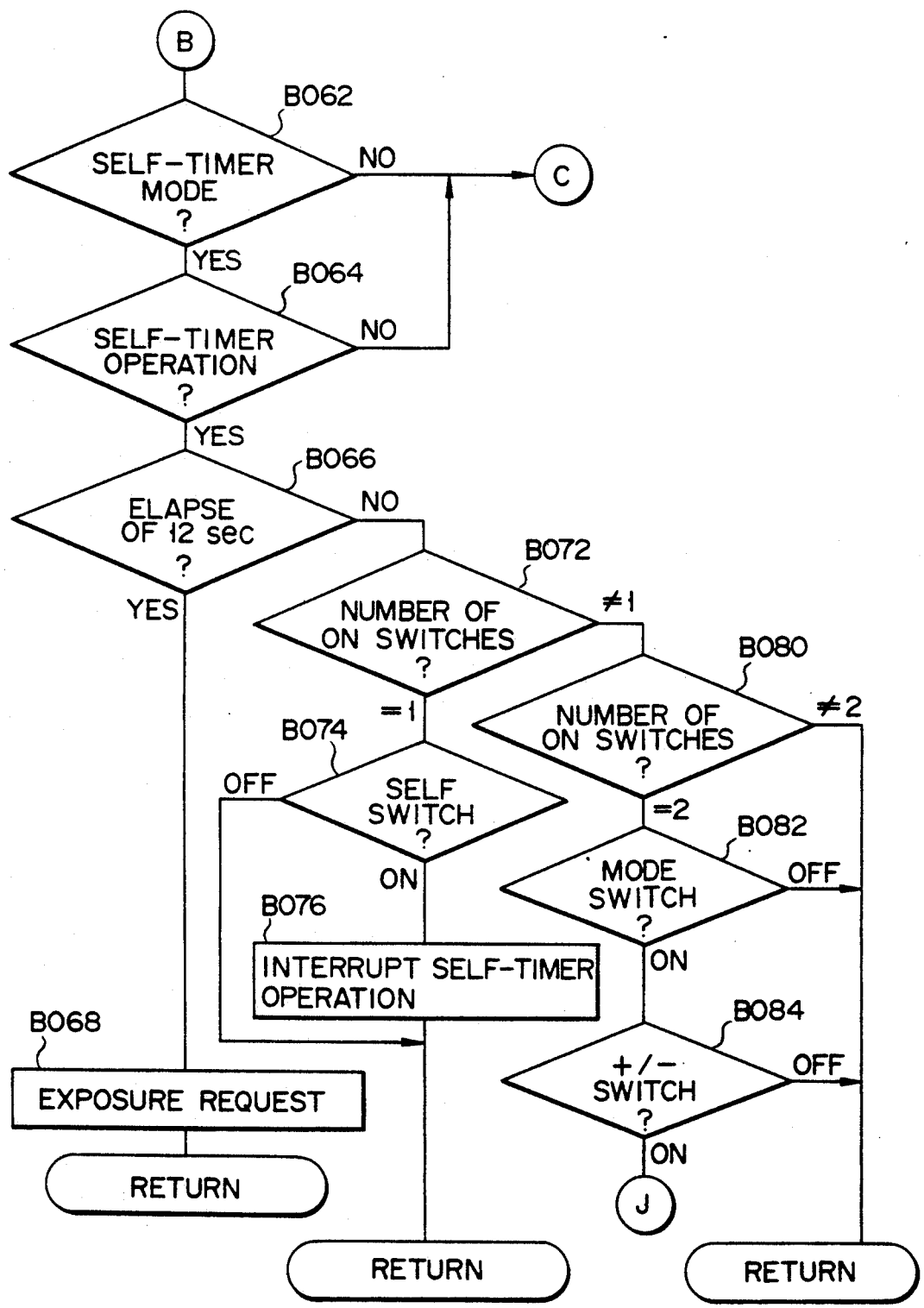
F I G. 7C

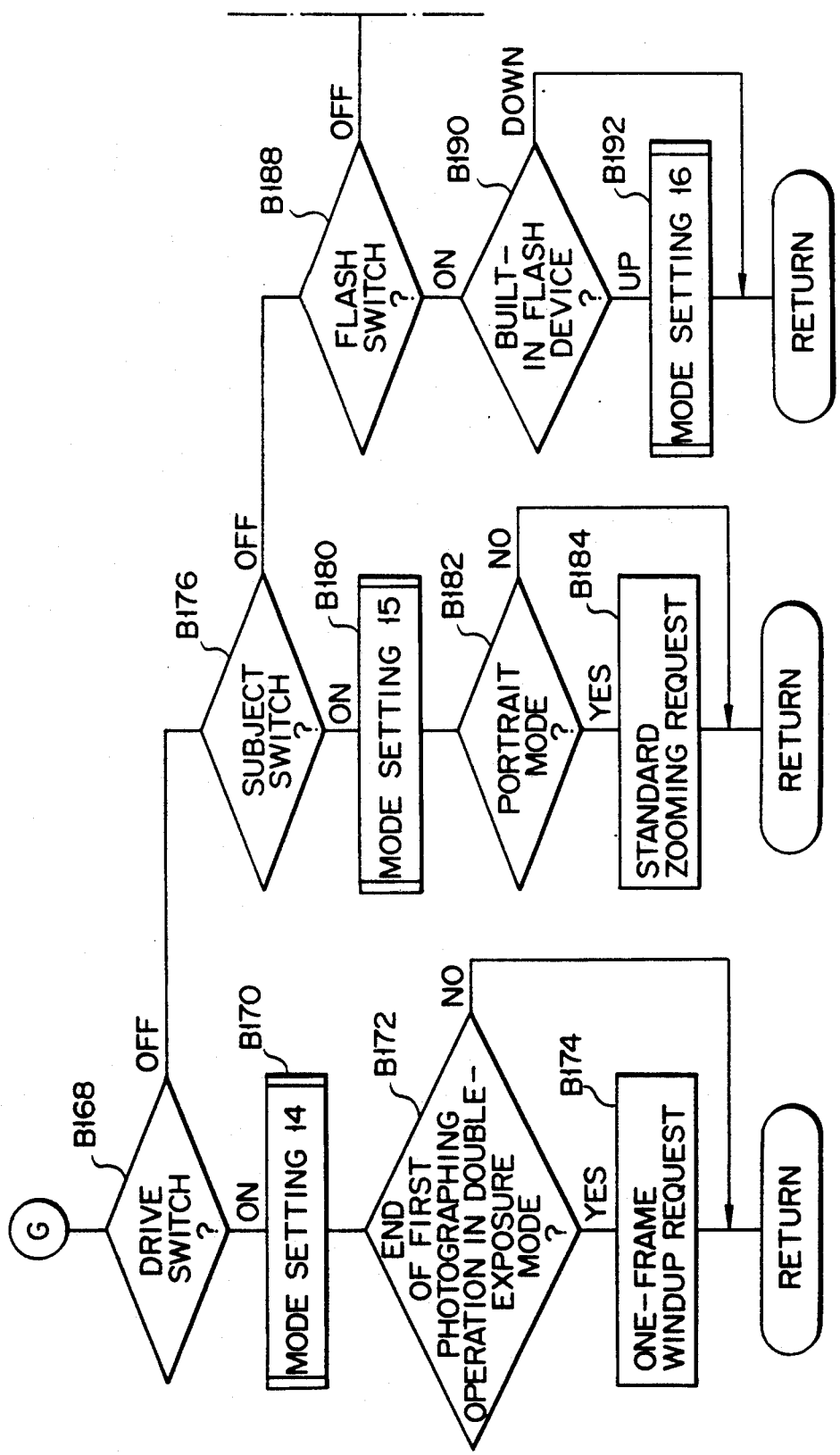
FIG. 7F-I

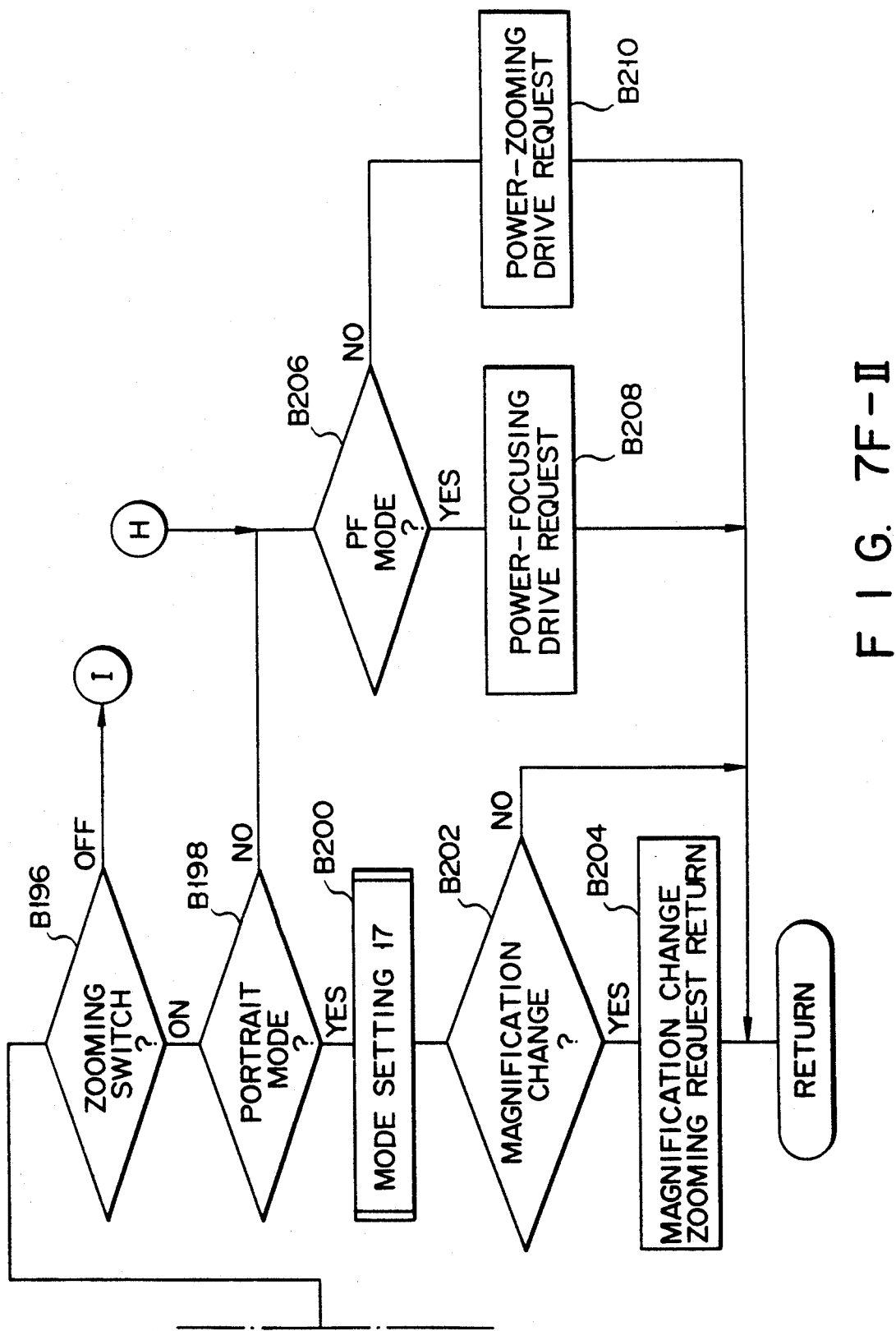
FIG. 7F-II

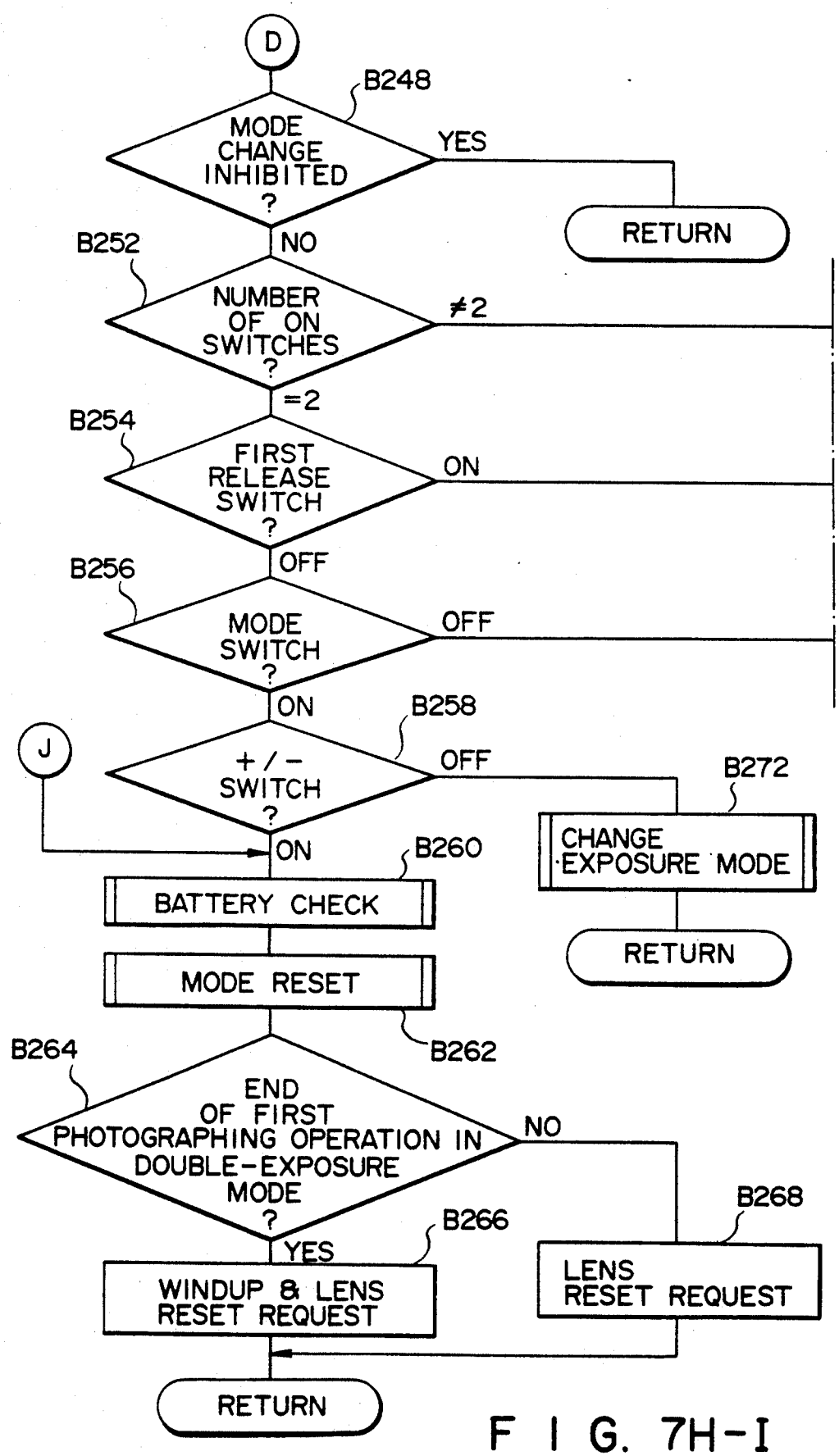
FIG. 7H-I

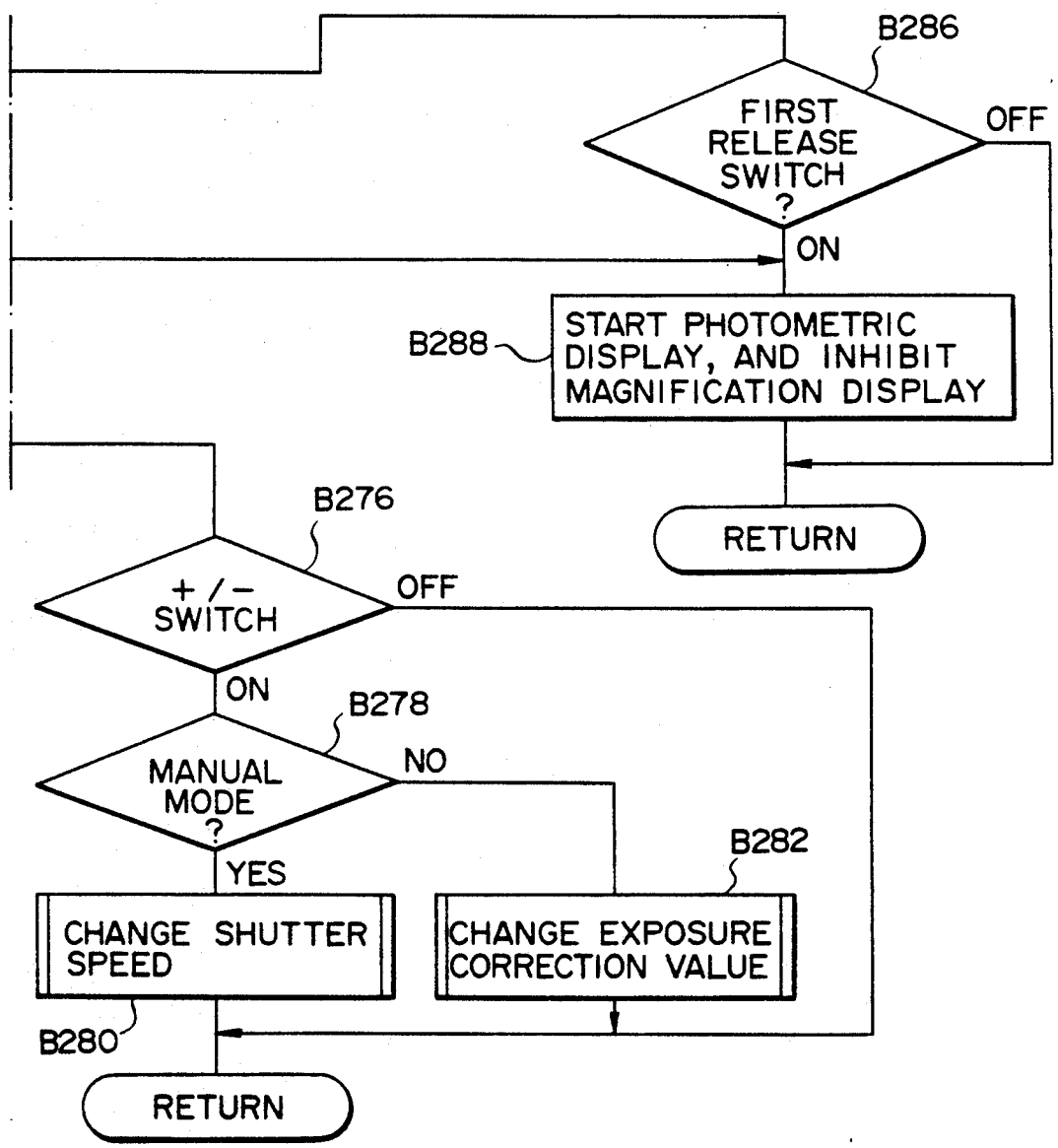
FIG. 7H-II

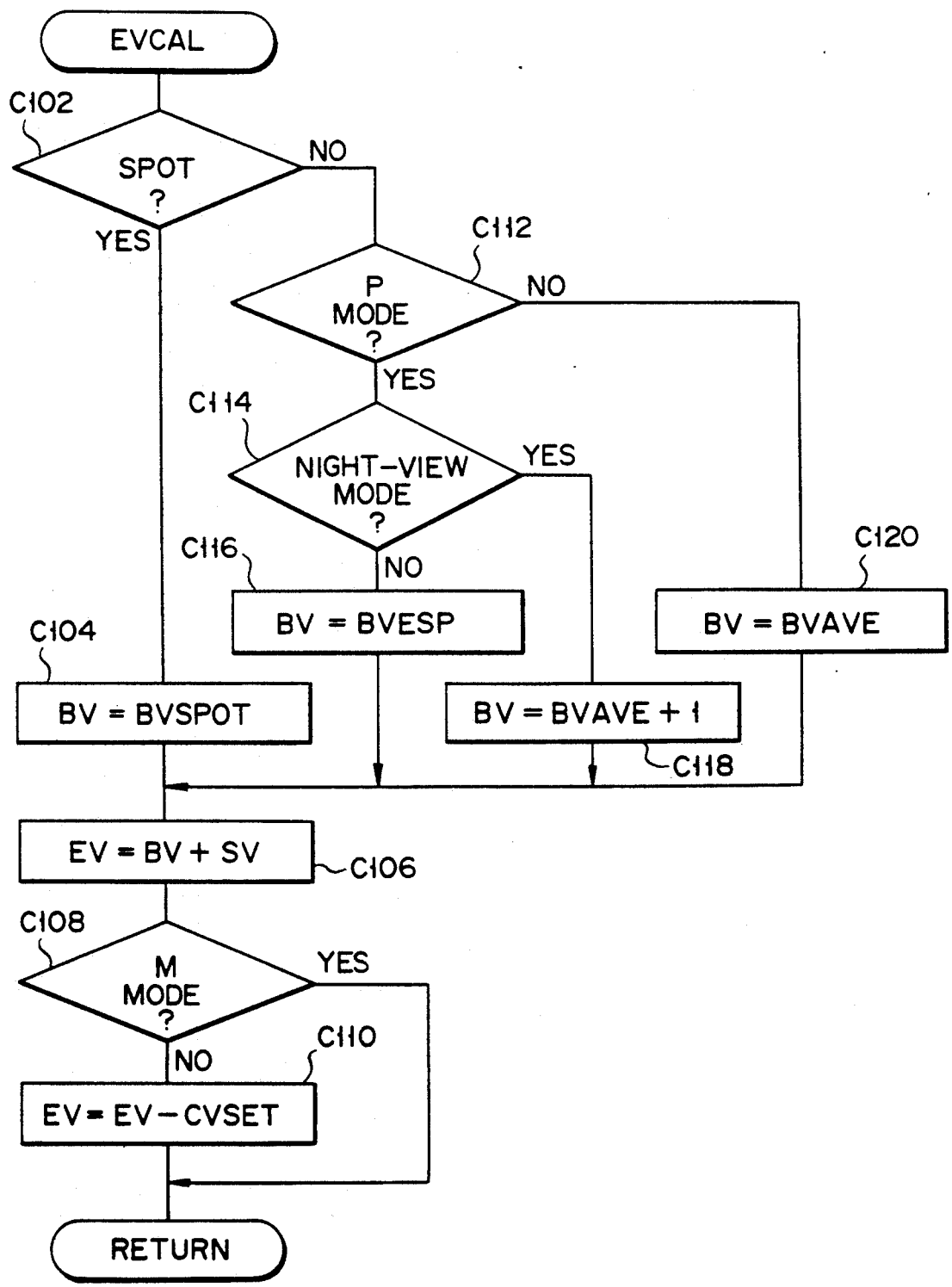
F I G. 9

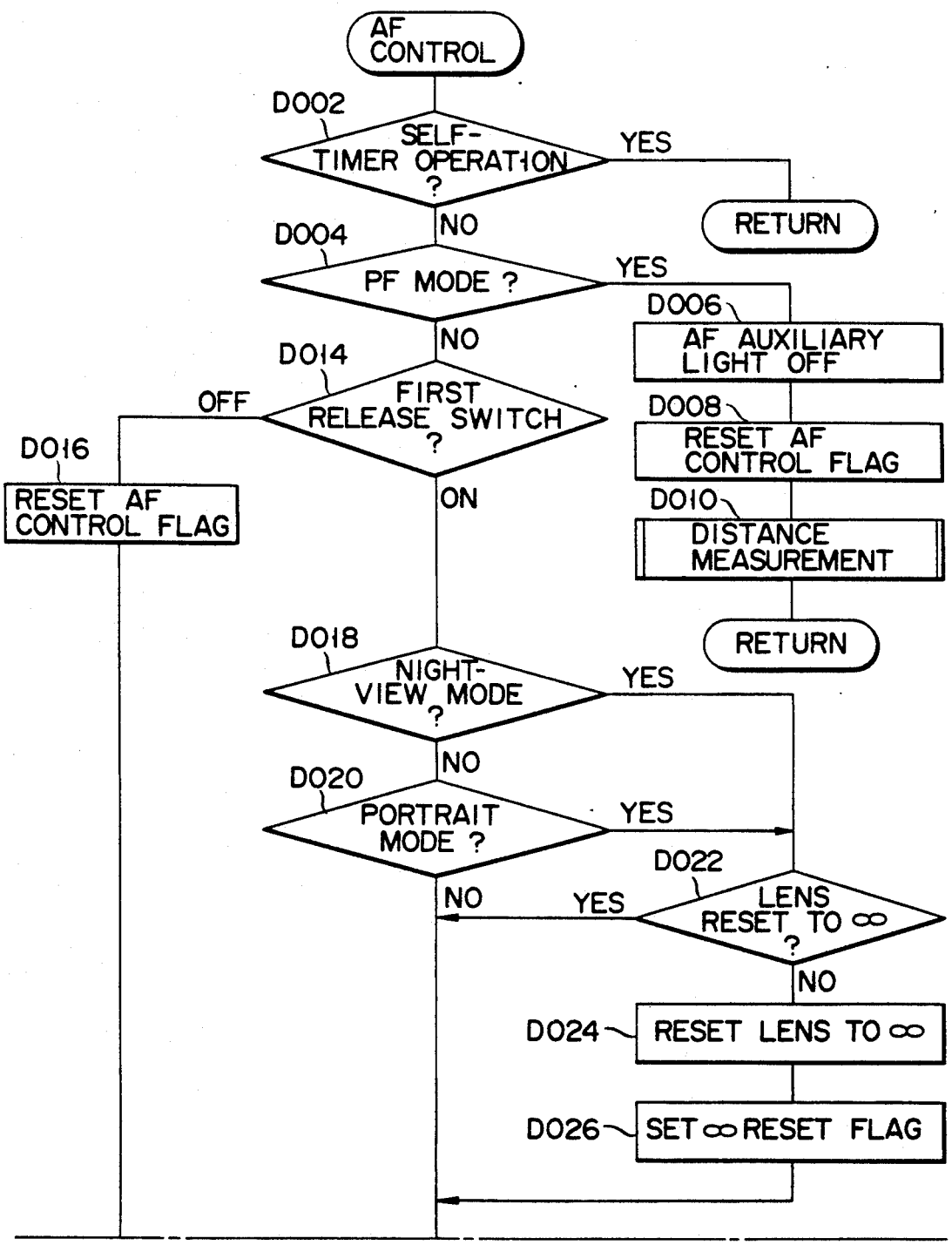
FIG. 14A-I

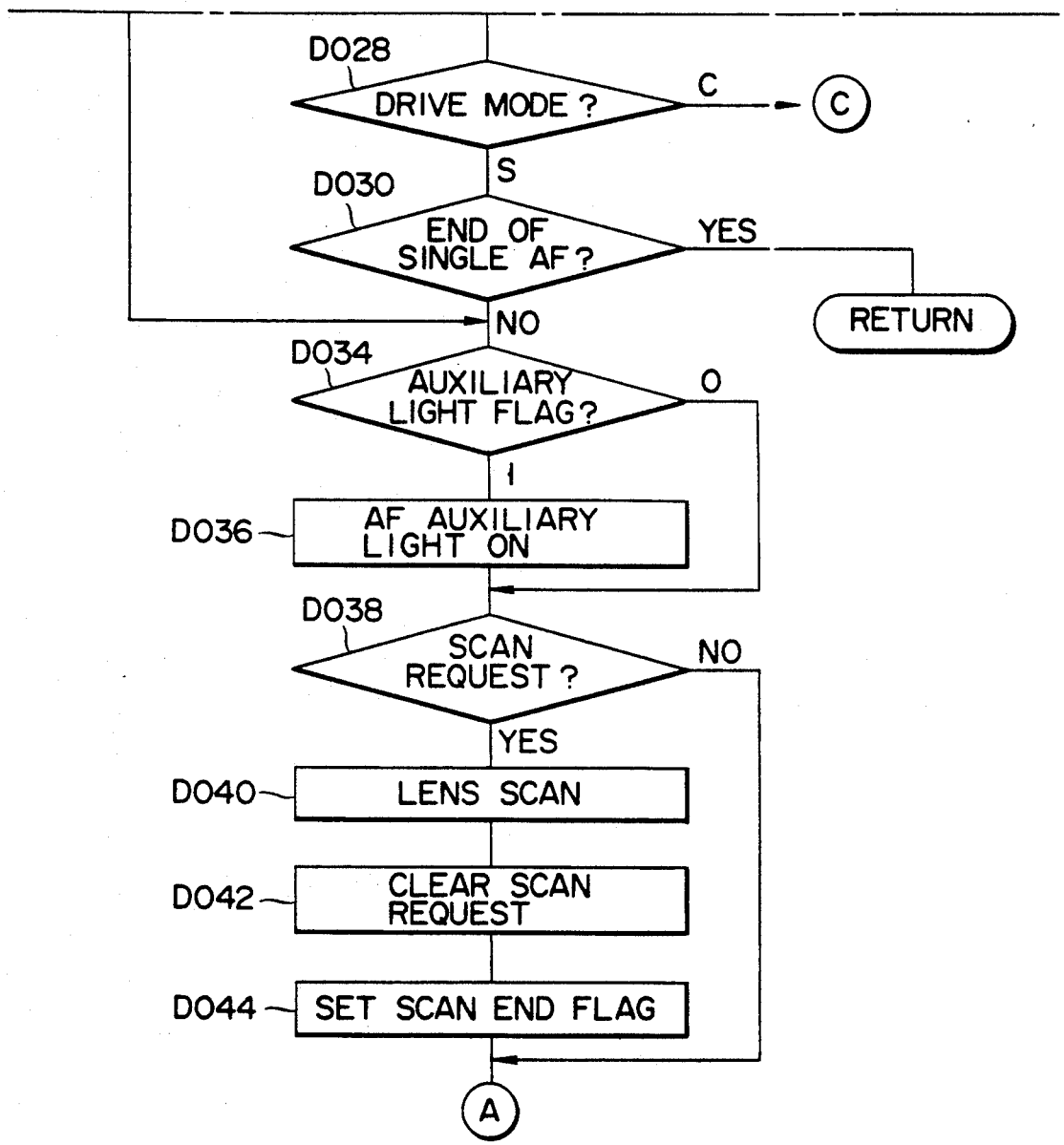
FIG. 14A-II

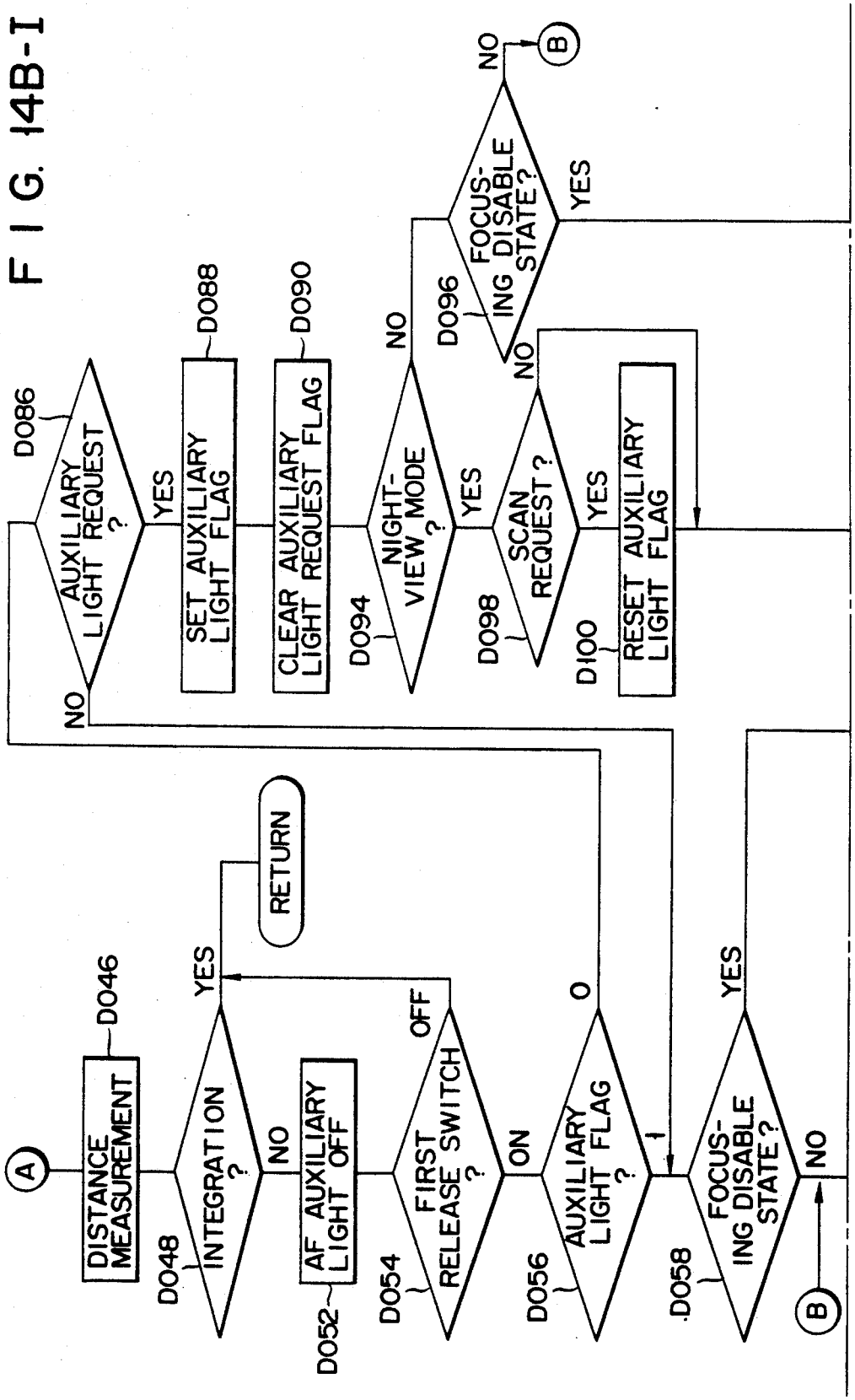

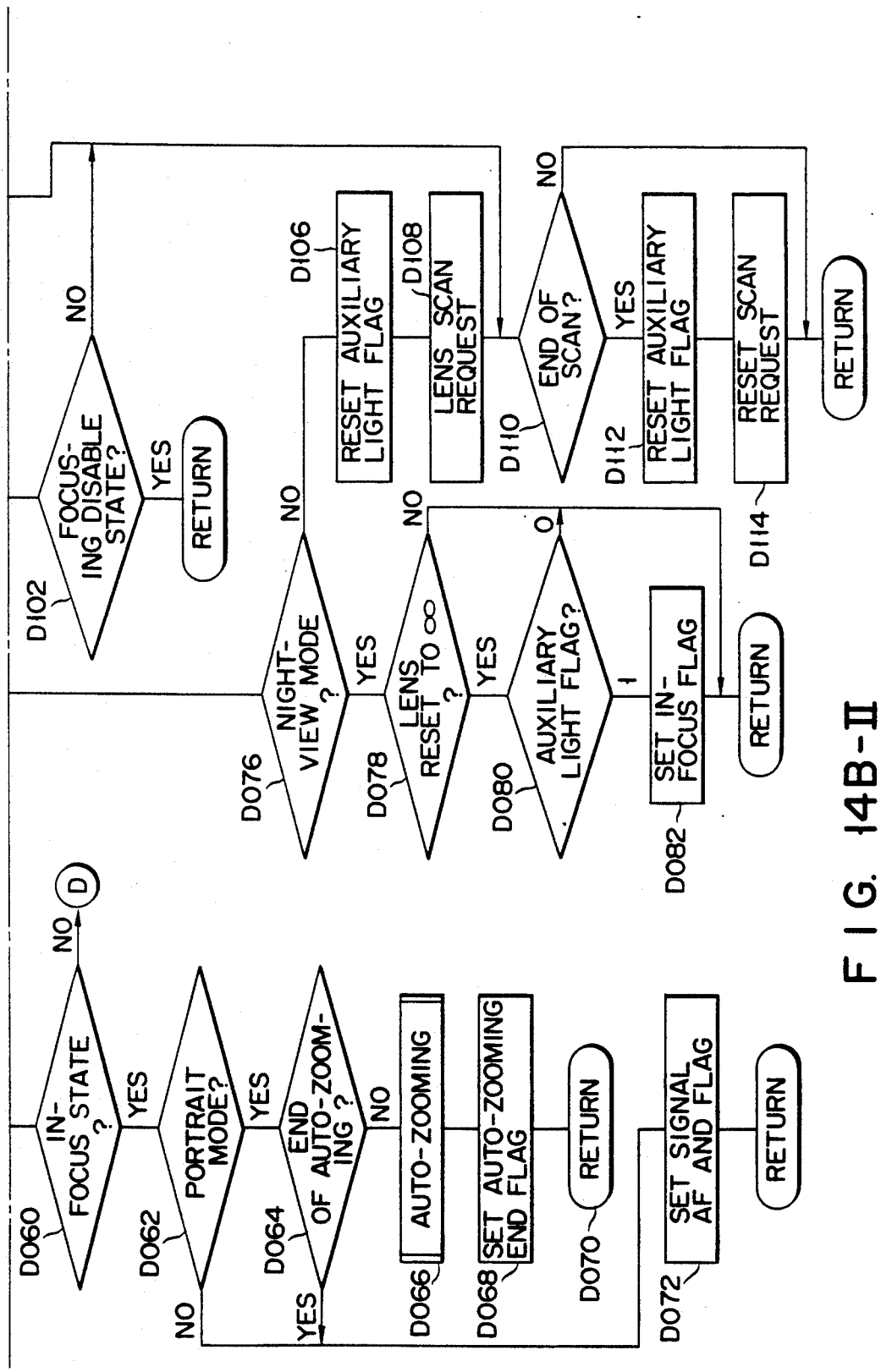
FIG. 14B-II

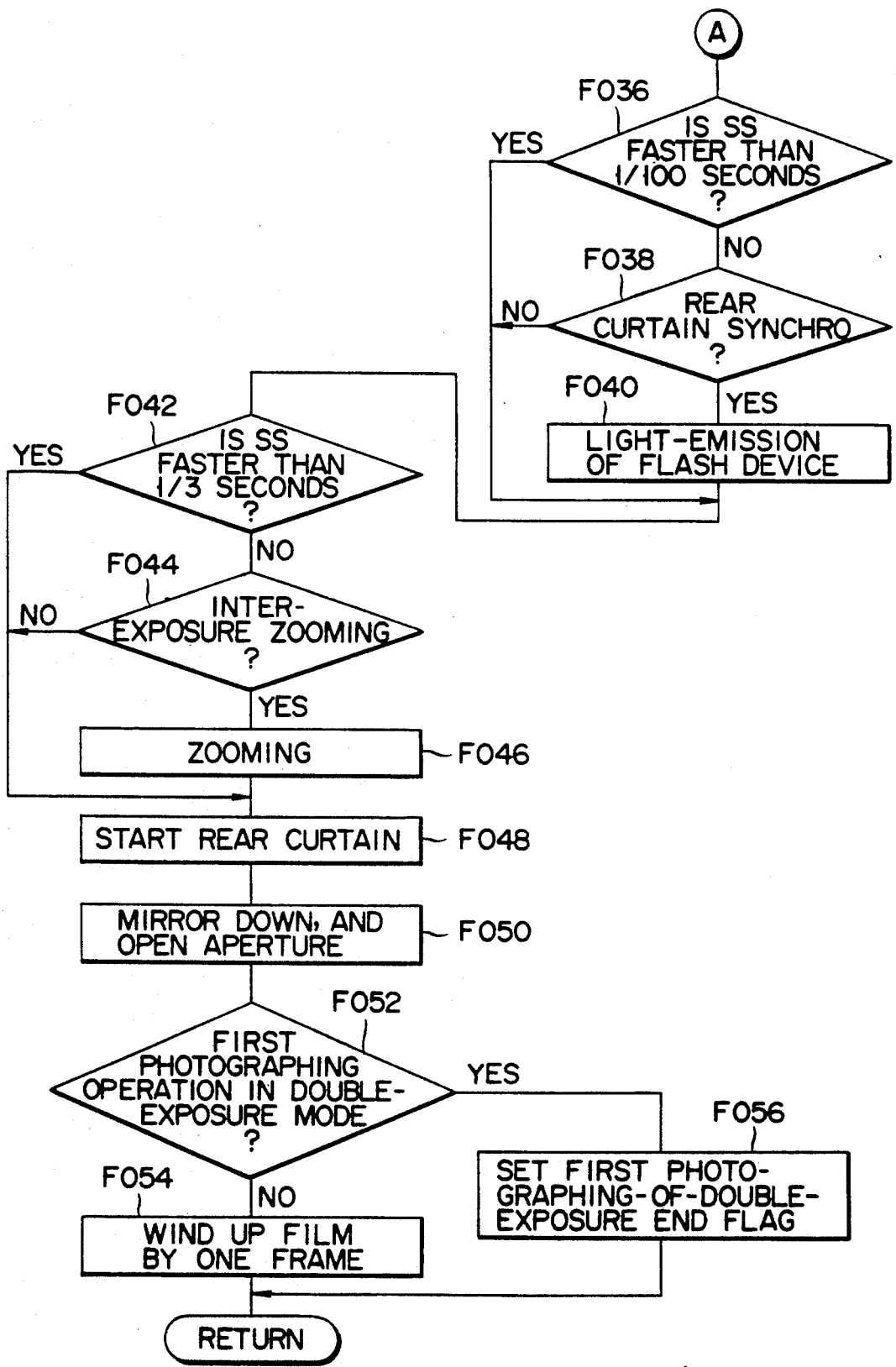
F I G. 16B

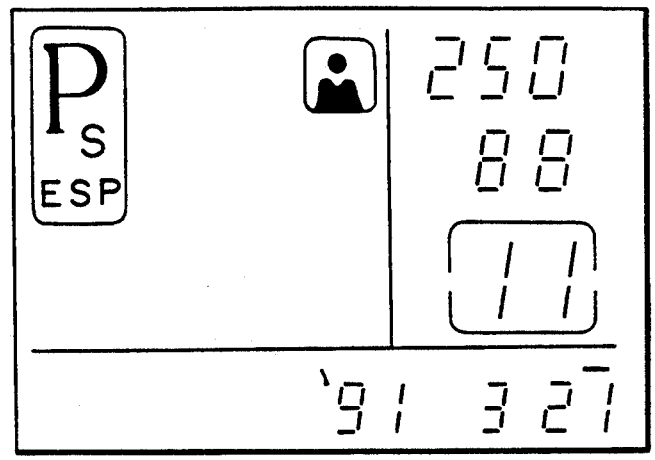
F I G. 19
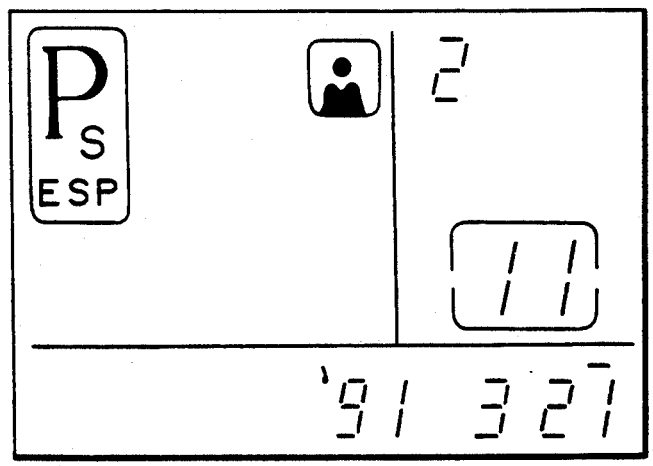
F I G. 20

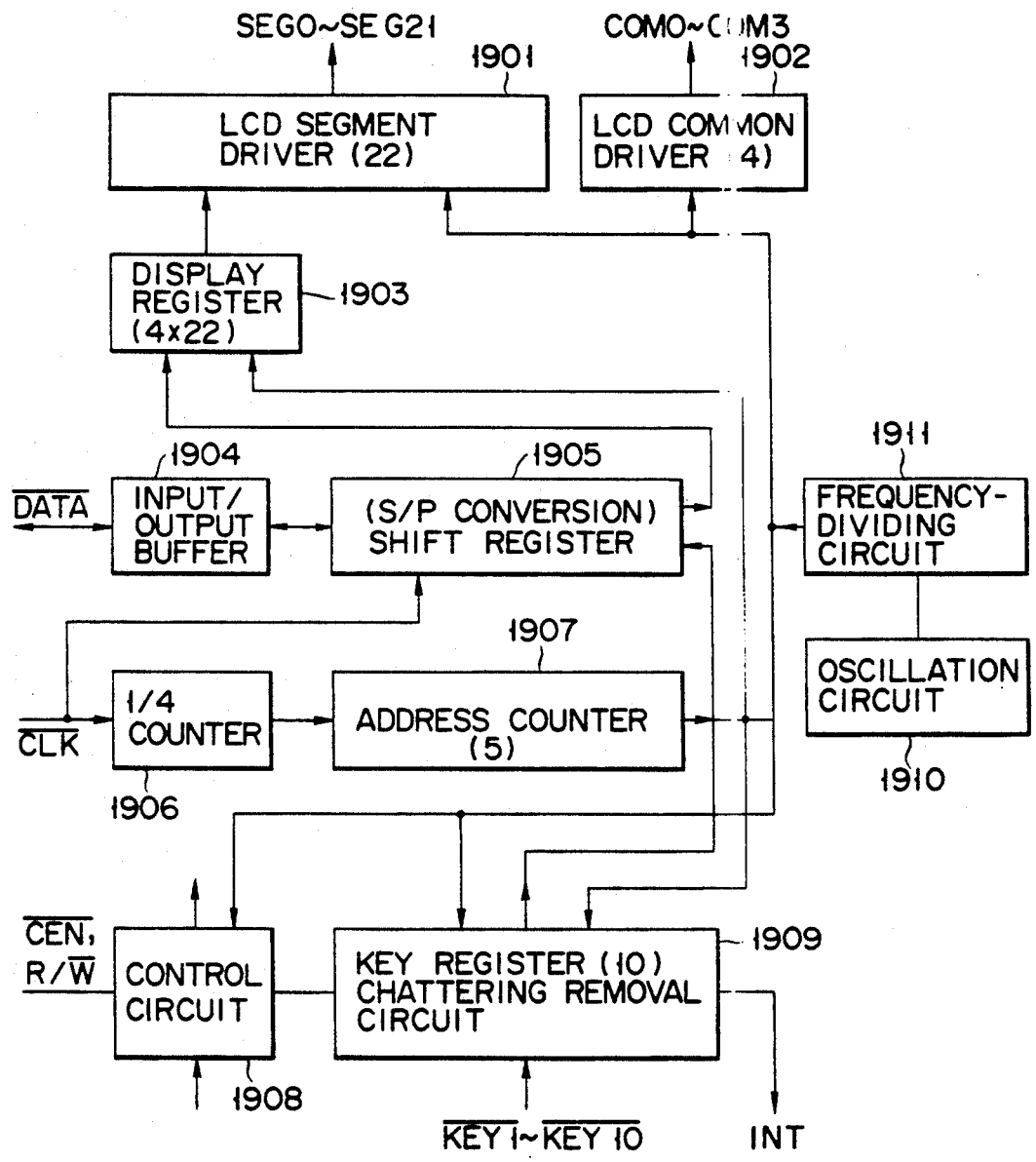
F I G. 22

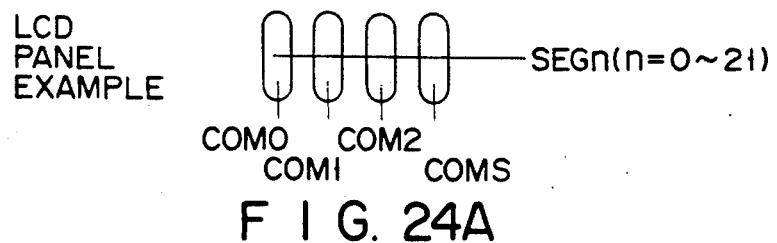
FIG. 24A
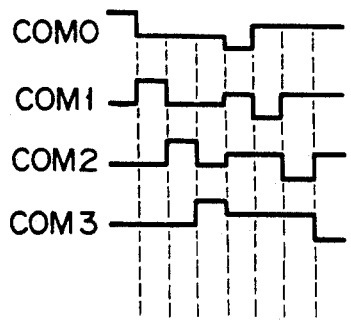
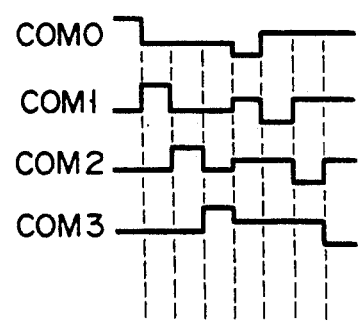
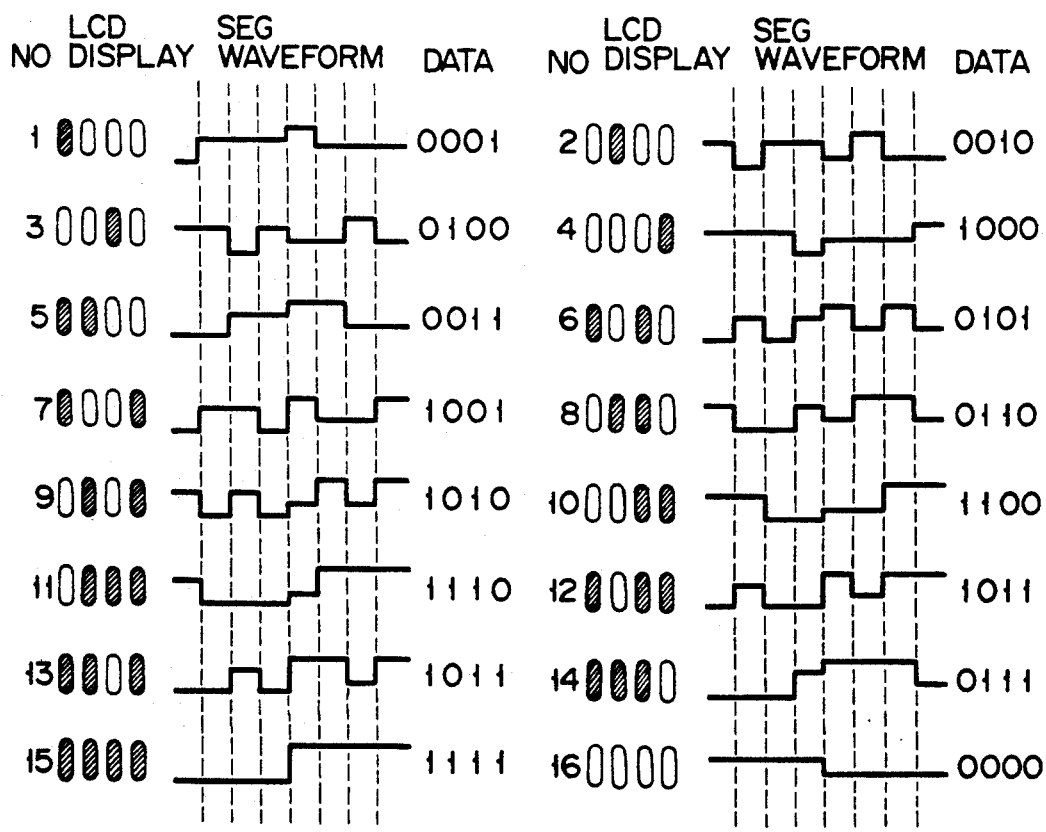
FIG. 24B    FIG. 24C

| | | | | | | | | |
|---|---|---|---|---|---|---|---|---|
| 0 | 0 | 1 | 1 | 1 | 1 | 1 | 0 | 1 |
| 1 | 0 | 1 | 1 | 0 | 0 | 0 | 0 | 0 |
| 2 | 0 | 0 | 1 | 1 | 1 | 1 | 1 | 0 |
| 3 | 0 | 1 | 1 | 1 | 1 | 0 | 1 | 0 |
| 4 | 0 | 1 | 1 | 0 | 0 | 0 | 1 | 1 |
| 5 | 0 | 1 | 0 | 1 | 1 | 0 | 1 | 1 |
| 6 | 0 | 1 | 0 | 1 | 1 | 1 | 1 | 1 |
| 7 | 0 | 1 | 1 | 1 | 0 | 0 | 0 | 0 |
| 8 | 0 | 1 | 1 | 1 | 1 | 1 | 1 | 1 |
| 9 | 0 | 1 | 1 | 1 | 1 | 0 | 1 | 1 |
| " | 0 | 0 | 1 | 0 | 0 | 0 | 0 | 1 |
| ⌴ | 0 | 0 | 0 | 0 | 0 | 0 | 0 | 0 |

AUTO-ZOOMING CAMERA APPARATUS HAVING ADVANCED PHOTOGRAPHING-MAGNIFICATION SETTING AND DISPLAYING FUNCTIONS

BACKGROUND OF THE INVENTION

1. Field of the Invention

The present invention generally relates to a zooming camera apparatus and, more particularly, to an auto-zooming camera apparatus having photographing magnification setting and displaying functions.

2. Description of the Related Art

In recent years, with the advent of cameras for moving a lens by a motor, cameras provided with various functions have been proposed. For example, the functions include an auto-focus function for measuring a distance to an object, and automatically moving a focusing lens to an in-focus position, a power-zooming function for, when a photographer (user) operates a switch for indicating a telephoto- or wide angle-side direction, automatically driving a zooming lens according to the operation, and the like.

As a combination of the auto-focus function and the power-zooming function, an auto-zooming function for automatically performing a zooming operation while maintaining a constant photographing magnification (=lens focal length + object distance) has already been proposed. Furthermore, in some auto-zooming functions, an arbitrary magnification can be selected from a magnification (e.g., ×1/50) for photographing the upper half of a body as an object, and a magnification (e.g., ×1/70) for photographing the whole body using a selection switch.

In a conventional auto-zooming camera, however, a photographing magnification can only be displayed on an outer portion of a camera (outside a finder). For this reason, a user cannot perform an operation for changing the photographing magnification while he or she holds a camera ready to shoot. Therefore, the operation for changing the photographing magnification is troublesome for a photographer.

An operation switch used in the power-zooming function is not used while the auto-zooming function is used, resulting in poor cost performance.

SUMMARY OF THE INVENTION

It is, therefore, an object of the present invention to provide a new and improved auto-zooming camera apparatus, which can facilitate an operation for changing and setting a photographing magnification with an inexpensive arrangement, thus improving cost performance.

According to one aspect of the present invention, there is provided an auto-zooming camera apparatus comprising:

a photographing lens system including at least a zooming lens;

a photometric circuit for measuring brightness of an object;

an exposure calculation circuit for calculating an exposure value in accordance with an output from the photometric circuit;

a distance measurement circuit for measuring a distance to the object;

a magnification setting circuit for determining a photographing magnification on a film arranging surface on which an image of the object is to be formed;

an auto-zooming calculation circuit for determining a focal length of the photographing lens system in accordance with an output from the magnification setting circuit and an output from the distance measurement circuit;

drive means for driving the zooming lens in accordance with an output from the auto-zooming calculation circuit;

a release button which is operated in a photographing operation;

a switch which is turned on by a first depression state of the release button;

a switching circuit, connected to the switch, the exposure calculation circuit, and the magnification setting circuit, for outputting a first value according to a setting value of the magnification setting circuit before the switch is turned on, and outputting a second value according to an output from the exposure calculation circuit after the switch is turned on;

a display circuit which is operated according to an output from the switching circuit; and display means for selectively displaying the first and second values in accordance with an output from the display circuit.

Additional objects and advantages of the invention will be set forth in the description which follows, and in part will be obvious from the description, or may be learned by practice of the invention. The objects and advantages of the invention may be realized and obtained by means of instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A and 2B are schematic diagrams of a camera system having photographing magnification setting and displaying functions according to one embodiment of the present invention;

FIGS. 3A to 3D are schematic views showing an outer appearance, and operation members of the camera having the photographing magnification setting and displaying functions according to the embodiment of the present invention;

FIGS. 7A to 7H-II are flow charts for explaining a mode/request code setting subroutine shown in FIGS. 6A to 6D;

FIG. 9 is a flow chart for explaining an EVCAL subroutine shown in FIG. 8;

FIGS. 14A-I to 14C are flow charts for explaining an AF control subroutine shown in FIGS. 6A to 6D;

FIGS. 16A and 16B are flow charts for explaining an exposure subroutine shown in FIG. 15B;

FIG. 19 is a schematic view showing a display state of the LCD panel when a shutter speed is displayed;

FIG. 20 is a schematic view showing a display state of the LCD panel when a photographing magnification is displayed;

FIG. 22 is a schematic block diagram showing an arrangement of an LCDIC;

FIGS. 24A to 24C are charts showing drive waveforms of COM and SEG signals shown in FIG. 22.

DETAILED DESCRIPTION OF THE PREFERRED EMBODIMENTS

Figure 1:
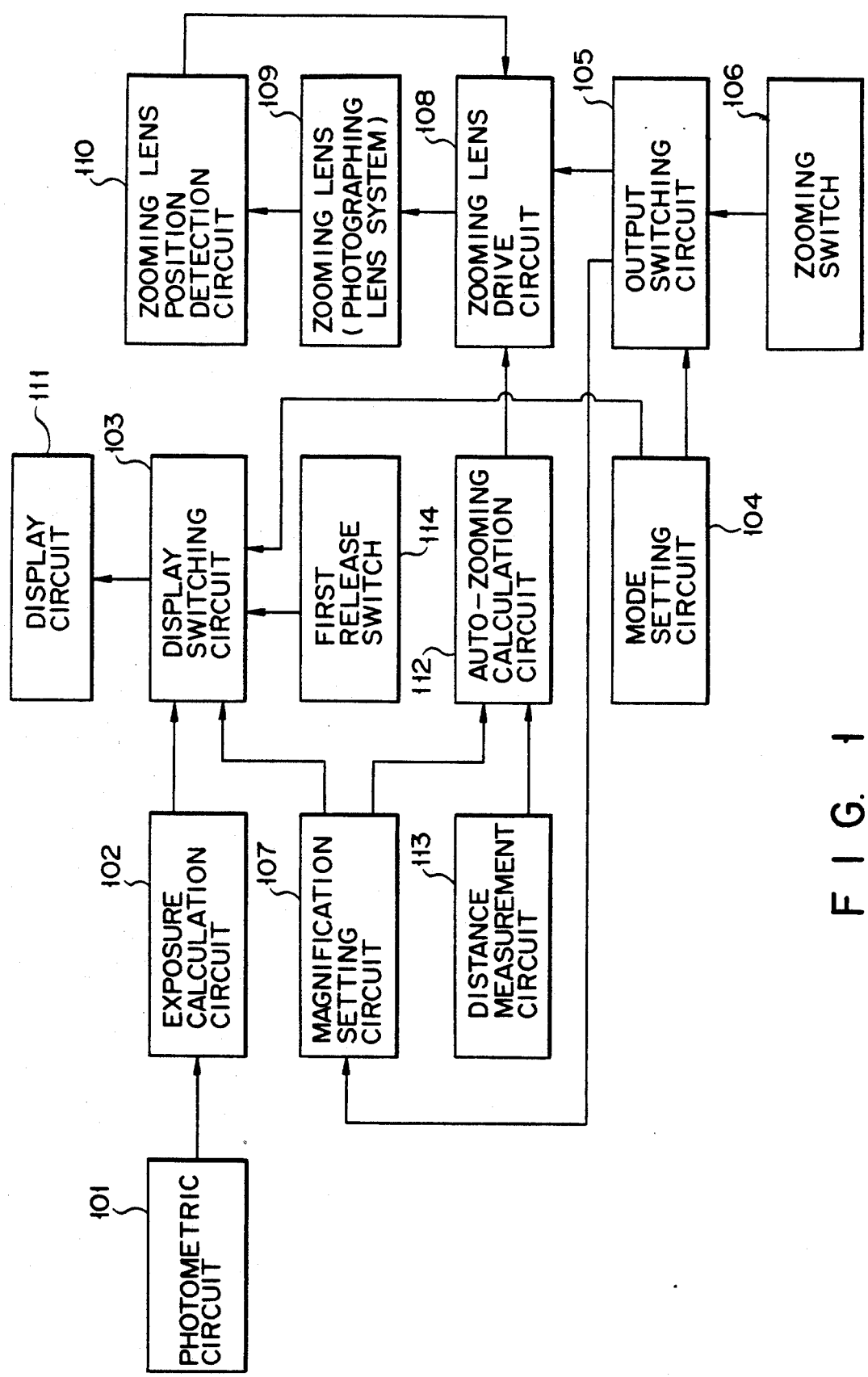
FIG. 1 is a schematic block diagram showing a camera apparatus having photographing magnification setting and displaying functions according to the present invention.

Reference will now be made in detail to the presently preferred embodiments of the invention as illustrated in the accompanying drawings, in which like reference characters designate like or corresponding parts throughout the several drawings.

The principle of photographing magnification setting and display functions employed in a camera apparatus having improved photographing magnification setting and display functions will be explained below. FIG. 1 is a schematic block diagram showing the camera apparatus having the improved photographing magnification setting and display functions.

In FIG. 1, a photometric value output from a photometric circuit 101 is input to an exposure calculation circuit 102. The exposure calculation circuit 102 calculates an exposure condition. The calculated exposure condition is supplied to a display switching circuit 103.

Reference numeral 104 denotes a mode setting circuit. The output from the mode setting circuit 104 is supplied to the display switching circuit 103, and an output switching circuit 105. The output switching circuit 105 transfers an input from a zooming switch 106 to one of a magnification setting circuit 107 for setting a photographing magnification, or a zooming lens drive circuit 108 for driving a zooming lens 109 included in a photographing lens system.

When a power-zooming mode is selected by the mode setting circuit 104, the display switching circuit 103 selects an input signal from the exposure calculation circuit 102, and the output switching circuit 105 transfers the input from the zooming switch 106 to the zooming lens drive circuit 108. When the zooming switch 106 is turned on, the zooming lens drive circuit 108 drives a motor (not shown) in a direction designated by the zooming switch 106, thereby moving the zooming lens 109. When the zooming switch 106 is turned off, the movement of the zooming lens 109 is stopped. The moving amount of the zooming lens 109 is detected by a zooming lens position detection circuit 110, and is fed back to the zooming lens drive circuit 108. The display switching circuit 103 transfers the exposure condition data input from the exposure calculation circuit 102 to a display circuit 111. The display circuit 111 displays the exposure condition.

On the other hand, when the mode setting circuit 104 selects an auto-zooming mode, the display switching circuit 103 selects an input signal from the magnification setting circuit 107, and the output switching circuit 105 transfers the input from the zooming switch 106 to the magnification setting circuit 107. More specifically, the magnification setting circuit 107 determines a setting value of the photographing magnification in accordance with the input signal from the zooming switch 106, and outputs the setting value to the display switching circuit 103, and an auto-zooming calculation circuit 112. The display switching circuit 103 transfers the photographing magnification input from the magnification setting circuit 107 to the display circuit 111. The display circuit 111 displays the photographing magnification. In this state, when a first release switch 114 is turned on, the selection of the display switching circuit 103 is switched to output the input signal from the exposure calculation circuit 102, and an exposure value is displayed on the display circuit 111. The auto-zooming calculation circuit 112 calculates a focal length of the zooming lens 109 on the basis of the setting value of the photographing magnification input from the magnification setting circuit 107, and a distance to an object input from a distance measurement circuit 113, and outputs the calculation result to the zooming lens drive circuit 108. The zooming lens drive circuit 108 drives a motor in the zooming lens 109 on the basis of the input focal length, thereby moving the zooming lens. The moving amount of the zooming lens 109 is detected by the zooming lens position detection circuit 110, and is fed back to the zooming lens drive circuit 108. When it is determined based on data fed back from the zooming lens position detection circuit 110 that the zooming lens 109 has reached a position defined by the focal length input from the auto-zooming calculation circuit 112, the drive operation of the zooming lens is stopped.

A camera having the improved photographing magnification setting and displaying functions according to one embodiment of the present invention based on the above-mentioned principle will be described in detail below.

Figure 2A:
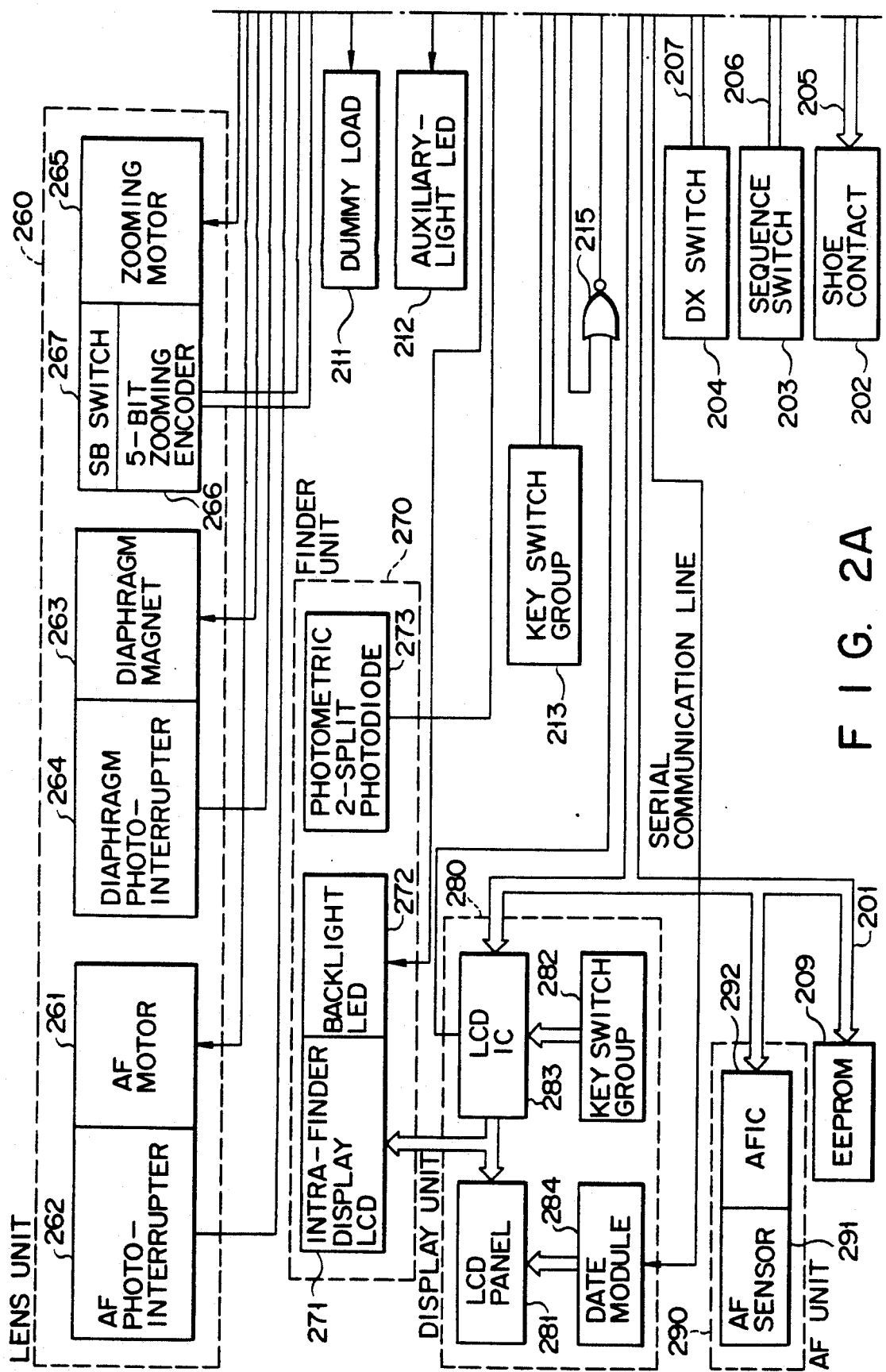
Figure 3C:
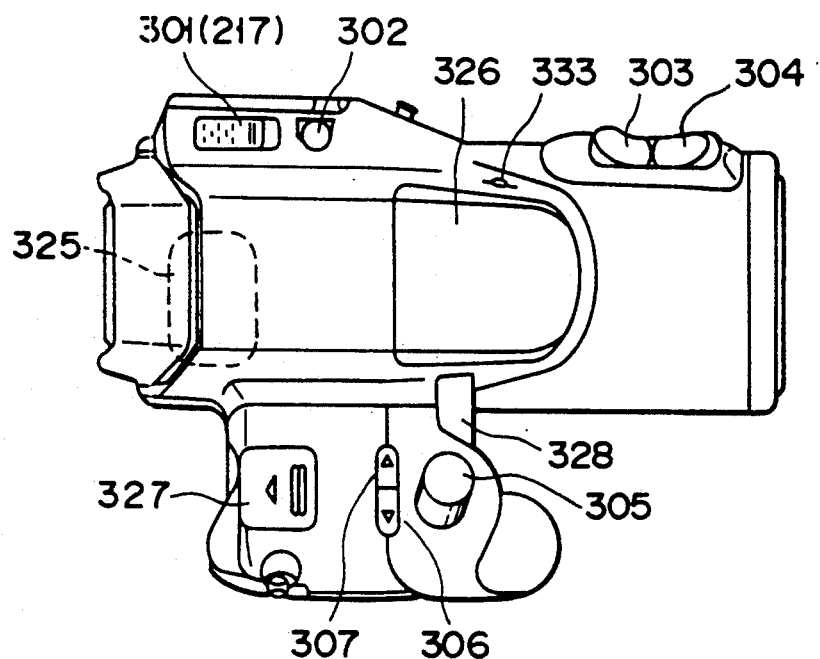
Figure 3D:
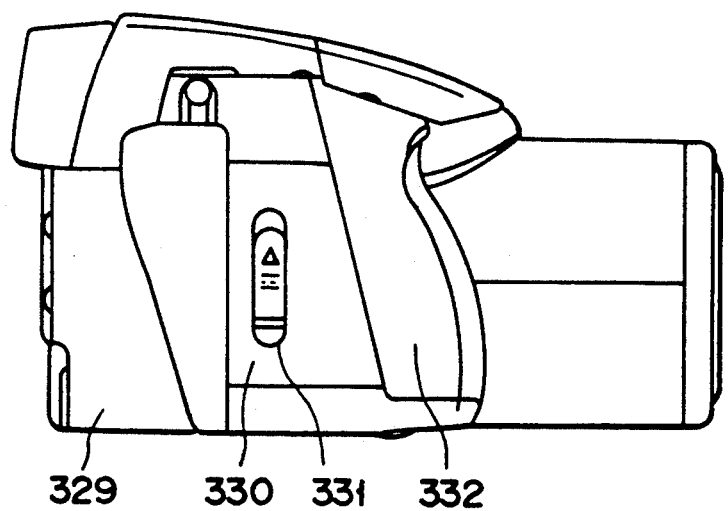

FIGS. 2A and 2B are block diagrams showing the overall camera system having the improved photographing magnification setting and displaying functions of this embodiment.

As shown in FIGS. 2A and 2B, the camera having the improved photographing magnification setting and displaying functions of this embodiment can be roughly classified into 10 blocks, i.e., a main controller (CPU)

200, an interface circuit (IFIC) 210, a power supply unit 220, a flash unit 230, a mirror.shutter unit 240, a film windup unit 250, a lens unit 260, a finder unit 270, a display unit 280, and an auto-focusing (AF) unit 290.

The respective blocks will be described in detail below.

The main CPU 200 controls the overall system of the camera apparatus, and exchanges data with the IC 210, a liquid crystal display circuit (LCDIC) 283, an auto-focusing circuit (AFIC) 292, and an electrically erasable/programmable read-only memory (EEPROM) 209 via a serial communication line 201, as will be described later. Another serial communication line 205 is arranged between the main CPU 200 and a shoe contact 202, and is used in a communication with an accessory such as an external flash device. A special-purpose data line 208 is arranged between the main CPU 200 and the IFIC 210, and is used to exchange data such as a power supply voltage, an analog signal of a photometric output, a waveshaped signal from a photointerrupter, and the like, which cannot be supplied in serial communications. An analog signal is input to an A/D conversion port of the main CPU 200, and is converted into digital data in the main CPU 200. Similarly, a flash charging voltage voltage-divided by a voltage-dividing circuit 237 (to be described later) is also input to an A/D port $I_1$ of the main CPU 200. In the main CPU 200, four interrupt ports are prepared, and are respectively connected to a power (PW) switch 217, a back cover open/close detection (BK) switch 218, a flash pop-up detection (PUP) switch 216, and a KEYINT line, as will be described later. Other input/output (I/O) ports are normal I/O ports. With these ports, the main CPU 200 directly reads ON/OFF states of a DX switch 204 for reading DX data of a patrone, and a sequence switch 203 including an MU switch for detecting an upper position of a mirror, an SC switch for detecting whether or not a shutter is charged, an X switch for detecting whether or not a travel operation of a front curtain of the shutter is completed, and the like. Output ports $O_1$ to $O_4$ are used for control of a date module, for light emission of a telephoto/wide angle (TELE/WIDE) flash device, for a dimmer signal, and the like.

The IFIC 210 comprises a BI-CMOSIC including both digital and analog units. More specifically, the IFIC 210 is constituted by an analog processing unit for driving various motors (a mirror.shutter motor 242, a windup motor 251, a zooming motor 265, and an AF motor 261), and a diaphragm magnet 263, and for performing a battery check operation in a photometric operation, waveshaping for the photointerrupter, and the like, and a digital processing unit for performing a scanning operation of a key switch group 213, a serial communication, a data latch operation, and the like.

The digital processing unit of the IFIC 210 has an 8-bit shift register for a serial communication, and an 8-bit latch circuit for latching data. The analog processing unit is controlled by rewriting data in the latch circuit. The key switch group 213 connected to the IFIC 210 includes a first release switch, a second release switch, a ZOOM.TELE switch, a ZOOM.WIDE switch, a SHIFT.UP switch, a SHIFT.DOWN switch, a SELF switch, a SPOT switch, a 5-bit zooming encoder, and an SB switch for detecting a collapsed position of a lens barrel. The ON/OFF states of these switches are similarly read by the main CPU 200 in serial communications.

Outputs from a photometric two-split photodiode 273, and a battery check circuit (not shown) are supplied as analog voltages to the main CPU 200 via the IFIC 210, and are A/D-converted. A photointerrupter 252 for detecting a film feed operation, a photointerrupter 262 for detecting a lens drive amount in an AF mode, and a photointerrupter 264 for detecting a stop-down amount respectively require drive circuits for light-emission sections, and circuits for waveshaping light-reception signals from light-receiving sections. These circuits are arranged in the IFIC 210, and shaped outputs are supplied to the main CPU 200 via the special-purpose data line. Furthermore, the IFIC 210 includes drive circuits for the motors (the motor 242 for driving a mirror and a shutter, the windup motor 251, the zooming motor 265, and the AF motor 261), drive circuits for magnets (shutter magnets 241a and 241b, and the diaphragm magnet 263), and circuits for an actuation signal for a flash booster circuit 231, an ON signal for a DC/DC converter 222, an output signal for a dummy load 211, a drive signal for an AF auxiliary-light light-emitting diode (LED) 212, a drive signal for a back-light LED 272 for an intra-finder display LCD 271, and the like. Since the drive operations of the motors require a large current, a motor driver 214 is arranged outside the IFIC 210.

The power supply unit 220 supplies two systems of power supply voltages. One power supply voltage is used for drivers for the motors, magnets, and the like, which require high power, and is always directly supplied from a battery 221. The other power supply voltage is a one for small signals, which is obtained by stabilizing the voltage from the battery 221 by the DC/DC converter 222. The stabilized power supply voltage is controlled by the IFIC 210. When the DC/DC converter 222 is not enabled, no power supply voltage is supplied to the main CPU 200, and the IFIC 210. Therefore, when one of the PW switch 217 and the BK switch 218 is turned on, a voltage from the battery 221 is supplied to the IFIC 210 via a diode D1 or D2, and the DC/DC converter 222 starts an operation in response to a command from the IFIC 210.

The flash unit 230 comprises a main capacitor 232, the flash booster circuit 231 for charging the main capacitor 232, the voltage-dividing circuit 237 for dividing a voltage of the main capacitor so as to be monitored by the main CPU 200, a TELE xenon lamp (Xe tube) 233, a TELE light-emission circuit 234 for causing the TELE Xe tube 233 to emit light, a WIDE xenon lamp (Xe tube) 235, and a WIDE light-emission circuit 236 for causing the WIDE Xe tube to emit light. The flash booster circuit 231 is controlled by a signal from the IFIC 210. The main CPU 200 instructs the IFIC 210 to execute or stop charging on the basis of the output from the voltage-dividing circuit 237. As the light-emission sections of the flash unit 230, the TELE Xe tube 233 having a narrow light-distribution angle, and the WIDE Xe tube 235 having a wide light-distribution angle are arranged. The TELE Xe tube 233 performs full light emission in response to a TX.ON signal from the main CPU 200. The WID Xe tube 235 starts light emission in response to a WX.ON signal from the output port $O_3$ of the main CPU 200, and stops light emission in response to a WX.OFF signal from the output port $O_4$. Note that the WIDE X tube 235 is also used for pre-emission for preventing so-called a "red eye" phenomenon.

The mirror.shutter unit 240 comprises the mirror.-shutter motor 242 for performing mirror up/down operations, and a shutter charging operation upon its forward rotation, and the two shutter magnets 241a and 241b for controlling traveling of the front and rear curtains of the shutter. The mirror.shutter unit 240 directly inputs the ON/OFF signal of the sequence switch 203 described above to the main CPU 200. More specifically, the sequence switch is a switch for monitoring the positions of the mirror and the shutter. In this switch, the upper position of the mirror is detected by the MU switch, and completion of charging of the shutter is detected by the SC switch, thereby outputting a signal for stopping the motor to the main CPU 200. In addition, the X switch is a switch for signaling a full open state of a focal plane shutter, and is used for obtaining an emission timing of the flash device. The reverse rotation of the mirror shutter motor 242 is transmitted to a patrone chamber through a gear train, and is used to rewind a film.

The film windup unit 250 comprises the windup motor 251, and the film detection photointerrupter 252. As described above, the output from the film detection photointerrupter 252 is waveshaped by the IFIC 210, and is converted into a feedback pulse for informing a windup amount to the main CPU 200. The film is wound up by the forward rotation of the windup motor 251. On the other hand, the reverse rotation of the windup motor 251 is used to release gears when a film is unloaded in the middle of a roll. The film detection photointerrupter 252 detects a moving amount of perforations of a film, thereby detecting a moving amount of the film. Every time a film is wound up by one frame, the film detection photointerrupter 252 generates 24 pulses. The film detection photointerrupter 252 is also used for monitoring a film rewind operation. While pulses are output from the photointerrupter 252, this means that the rewind operation is being executed, and when pulses are stopped, this means that the rewind operation is completed. When it is determined that the rewind operation is completed, the main CPU 200 stops the mirror.shutter motor 242.

The lens unit 260 comprises the AF motor 261 used when focusing is performed, the AF photointerrupter 262 for generating feedback pulses, the diaphragm magnet 263 for stopping a stop-down operation, the diaphragm photointerrupter 264 for detecting a stop-down amount, the zooming motor 265 for performing a zooming operation, a 5-bit zooming encoder 266 for detecting an absolute position of the zooming lens, and an SB switch 267 for detecting a collapsed position of the zooming lens. The lens unit 260 controls the lens. The AF motor 261 is driven by an amount according to a defocusing amount measured by the AFIC 292. The drive amount of the AF motor 261 is detected as the number of feedback pulses from the AF photointerrupter 262. The absolute distance to an object required for controlling the G number of the flash device, and for determining an aperture value is obtained by accumulating the number of pulses from the AF photointerrupter 262 after the lens is reset to its infinity position. The zooming motor 265 is used for zooming the lens (not shown), and for collapsing the lens when the lens is not used. The motor 265 is controlled by the zooming encoder 266 and the SB switch 267 in correspondence with the absolute position of the lens. The zooming encoder 266 divides a photographable region into 32 regions (=5 bits), and supplies absolute position data to the main CPU 200 via the IFIC 210. The SB switch 267 is arranged at the collapsing end of the lens, and detects completion of the collapsing operation. The release point of the collapsing position coincides with the WIDE end of the zooming encoder 266. A diaphragm (not shown) mechanically performs a stop-down operation by a spring simultaneously with the mirror-up operation, and when a setting aperture value is reached, magnetic attraction of the diaphragm magnet 263 is released, thus stopping the diaphragm at a desired position. The stop-down amount is detected by detecting rotation of a gear interlocked with a stop-down operation of aperture blades by the diaphragm photointerrupter 264. More specifically, the number of pulses output from the diaphragm photointerrupter 26 is proportional to the stop-down amount.

The finder unit 270 guides an object image reflected by a reflex mirror (not shown) and formed on a Fresnel lens toward an eyepiece section. An electrical system arranged in the finder unit 270 includes the intra-finder display LCD 271 for performing a display in the finder, the back-light LED 272 for illuminating the intra-finder display LCD 271, and the photometric two-split photodiode 273. The photometric two-split photodiode 273 is split to have a circle-in-a-square or concentric-circle pattern, and can perform center-weighted and peripheral photometric operations. A photocurrent generated by the photometric two-split photodiode 273 is directly supplied to the IFIC 210, and is current/voltage-converted by the IFIC 210. The converted voltage is supplied to the A/D port of the main CPU 200. The intra-finder display LCD 271 comprises a transmission type liquid crystal. Some display contents of the intra-finder display LCD 271 are common to those of an LCD panel 281 of the display unit 280. When a display is to be made on the intra-finder display LCD 271, the back-light LED 272 is turned on. When the back-light LED 272 is kept OFF, even if a display is made on the intra-finder display LCD 271, a photographer cannot recognize it. Therefore, when a display of only the LCD panel 281 is performed, and no display is made on the intra-finder display LCD 271, the back-light LED 272 can be turned off.

The display unit 280 is arranged in the back cover of the camera, as will be described later. In the display unit 280, the large-size LCD panel 281, a key switch group 282 arranged on a back cover portion, the LCDIC 283 for driving the LCD panel 281, and reading states of the key switch group 282, and a date module 284 for printing, e.g., a date on a film are arranged. The LCD panel 281 performs both a display by the LCDIC 283 and a date display by the date module using a single panel. Since the LCD panel 281 employs a reflection type liquid crystal unlike the intra-finder display LCD 271, a reflection plate (not shown) is arranged on the rear surface of the LCD panel although the LCD panel requires no back light. As the key switch group 282, i.e., a MODE switch, a +/− switch, a PF switch, a Z.MEMO switch, a MACRO switch, a REWIND switch, a DRIVE switch, a SUBJECT switch, and a FLASH switch are connected, as will be described later. ON/OFF states of these switches are read by the main CPU 200 via the LCDIC 283. The date module 284 is directly controlled by the main CPU 200, and uses the battery 221 as a common power source to other constituting units of the camera. Therefore, when the battery 221 is disconnected, date data is reset. For this reason, a backup capacitor (not shown) having a relatively large capacitance is connected to the date module so as not to reset the date data even when the battery is connected/disconnected for a short period of time.

The AF unit 290 comprises an AF sensor 291, and the AFIC 292 formed integrally with the AF sensor 291. The AFIC 292 sends the integration result of the AF sensor 291 to the main CPU 200 using the serial communication line, and the main CPU 200 calculates a defocusing amount. The EEPROM 209 is arranged in the AF unit 290 so as to store correction data for a variation of pixels, a dark current, a position error, and the like of the AF sensor 291. After the camera is completed, the EEPROM 209 is also used as a means for storing data to be left after the power supply is turned off, of those stored in an internal RAM of the main CPU 200.

A method of interrupting the main CPU 200 to turn on/off the power supply or to perform restoration from a power saving mode will be described below. The main CPU 200 has the four interrupt ports which can be interrupted at the trailing edge of a signal, and these ports are connected to the PW switch 217, the BK switch 218, the PUP switch 216, and the key interrupt (KEYINT) line for supplying a signal obtained by NORing interrupt request signals from the IFIC 210 and the LCDIC 283 by a NOR gate 215. These interrupt ports can be set in both interrupt enable and disable states. The interrupt ports are normally set in the interrupt disable state. However, when the power saving mode is set, the interrupt ports are reset to the interrupt enable state. In the power saving mode, when the camera is not used for a long period of time while the PW switch 217 or the BK switch 218 is kept ON, the main CPU 200 stops its function to save the battery power.

The PW switch 217 is a power switch of the camera. When the PW switch 217 is turned on, a voltage from the battery 221 is supplied to a stabilized power supply as a power supply for the main CPU 200, and the main CPU 200 is power-on reset. Thus, an operation is started from the beginning of a program to prepare for a photographing operation. The BK switch 218 is a switch interlocked with the back cover, and when the back cover is opened, a power supply voltage is supplied to the main CPU 200 in the same manner as the PW switch 217. This is to load a film when the back cover is closed even when the PW switch 217 is kept OFF. For this reason, even when only the BK switch 218 is turned on, a preparation for a photographing operation is not performed. When the main CPU 200 starts an operation, the DC/DC converter 222 is started via the IFIC 210, and a power supply voltage can be kept supplied to the main CPU 200 after the PW switch 217 and the BK switch 218 are turned off. In this case, the main CPU 200 performs processing (collapsing, saving of data to the EEPROM 209, and the like) which must be performed before a power-OFF operation, and then stops the DC/DC converter 222. The PUP switch 216 detects a pop-up state of the flash device, and permits charging and light-emission operations of the flash device, and need not issue an interrupt request since it is periodically read by the main CPU 200. The KEYINT line supplies an output signal from the NOR gate 215, which signal is obtained by NORing a signal input when one of switches in the first key switch group 282 connected to the LCDIC 283 is depressed, and an output signal from the IFIC 210. However, during an operation of the main CPU 200, since the main CPU 200 periodically reads all the key switches, the output signal on the KEYINT line is ignored. The interrupt function from the KEYINT line is required only when the power saving mode is set. In the power saving mode, all the functions of the main CPU 200, the IFIC 210, the DC/DC converter 222, and the like are stopped. When the PW switch 217 or the BK switch 218 is turned off, the camera is undesirably stopped without executing power-down processing or film loading. In order to prevent this, the main CPU 200 permits an interrupt before the power saving mode is started, and when the PW switch 217 or the BK switch 218 is turned off, the CPU 200 operates the DC/DC converter 222 to assure its own power supply. More specifically, a filter capacitor of the DC/DC converter 222 can compensate for an operation from when the switch is turned off until the DC/DC converter 222 is started. The PUP switch 216 and the KEYINT line can perform an interrupt to be escaped from the power saving mode when the camera is operated.

Figure 4:
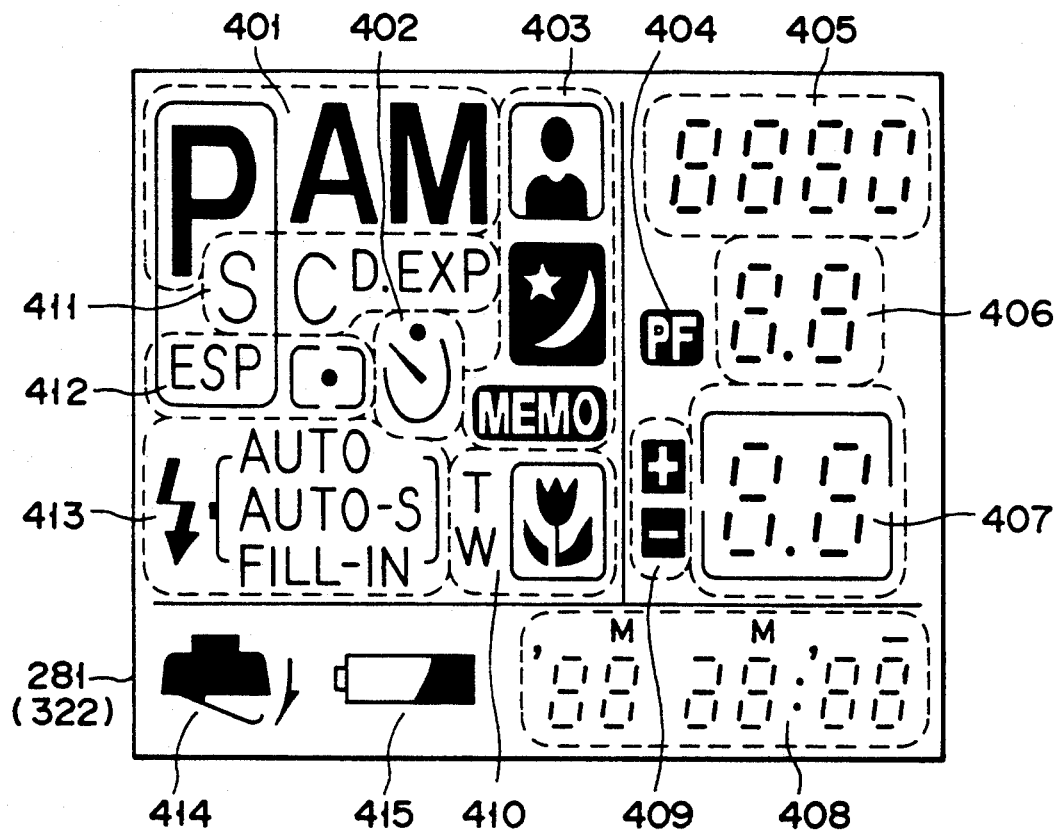
FIG. 4 is a schematic view showing a display content on an LCD panel shown in FIG. 2.
Figure 5:
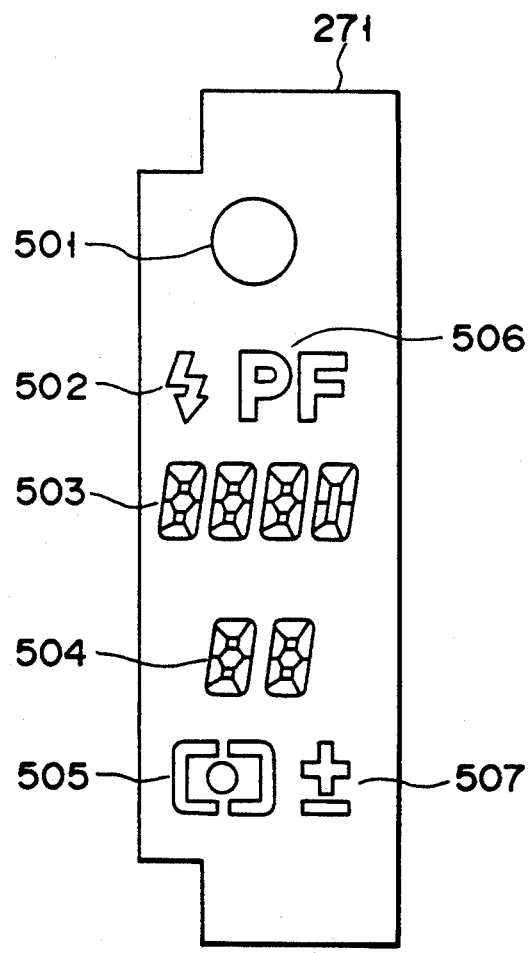
FIG. 5 is a schematic view showing a display content of an intra-finder display LCD shown in FIG. 2.
Figure 6A:
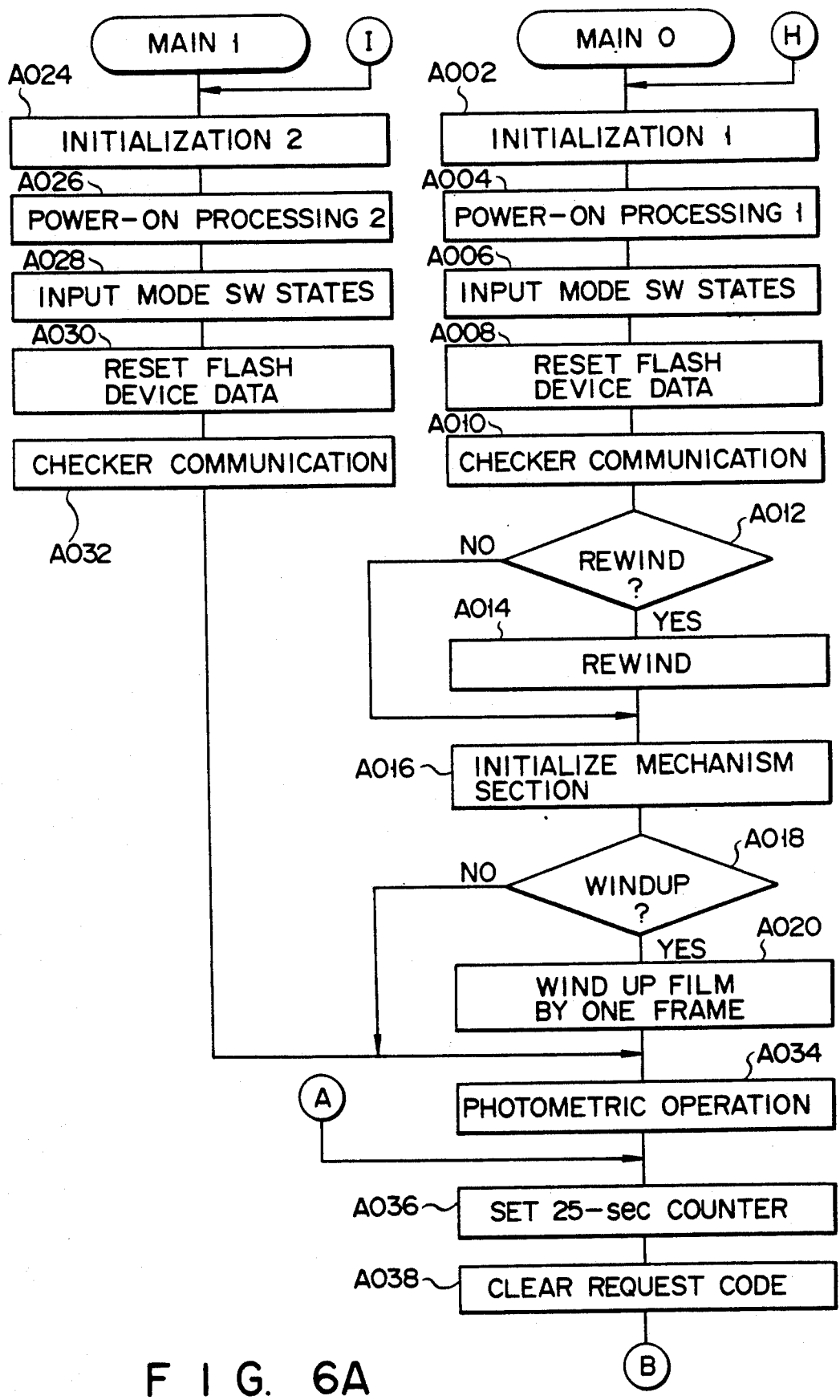
FIGS. 6A to 6D are schematic flow charts showing operations of a main CPU shown in FIG. 2.
Figure 6B:
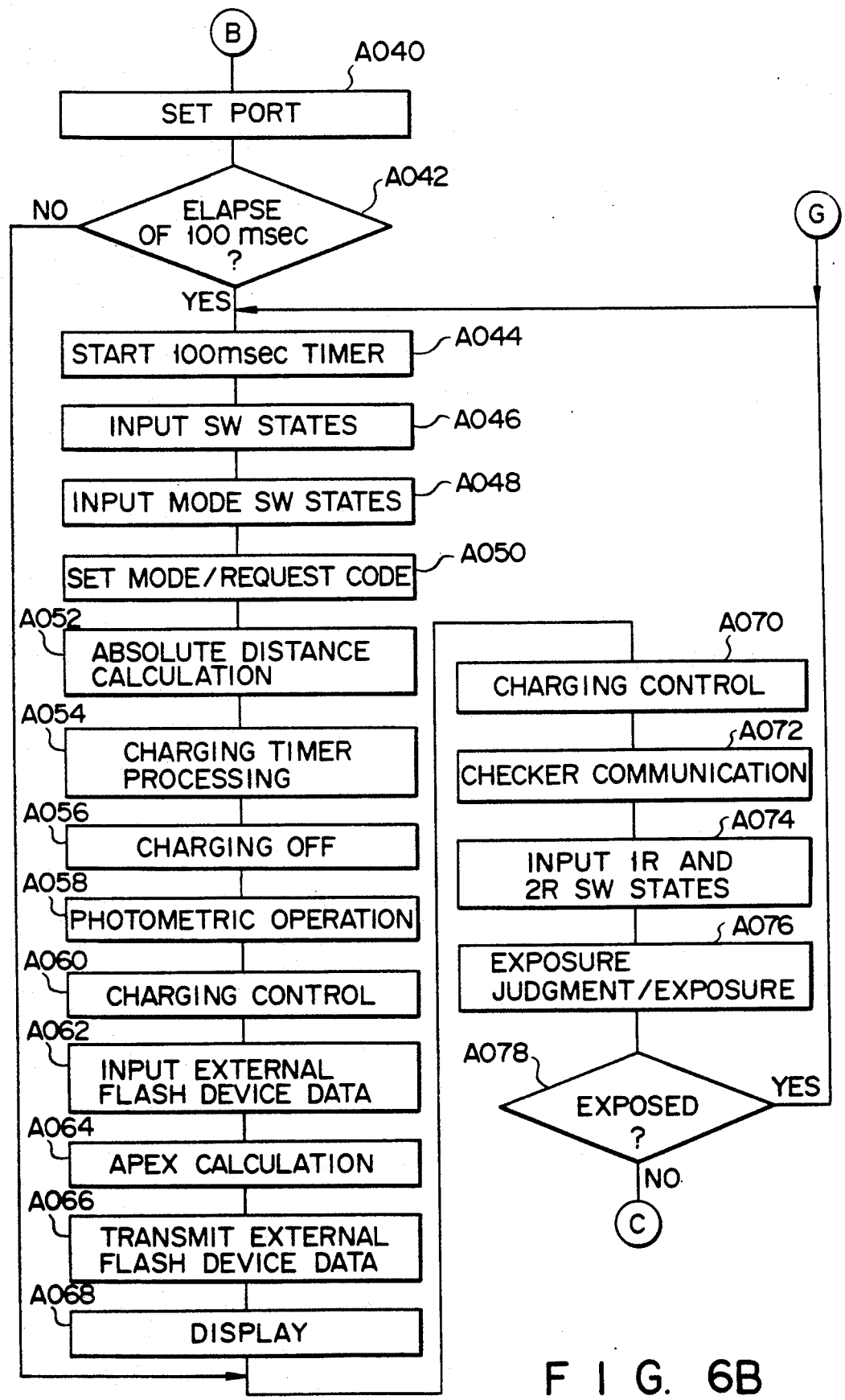
Figure 6C:
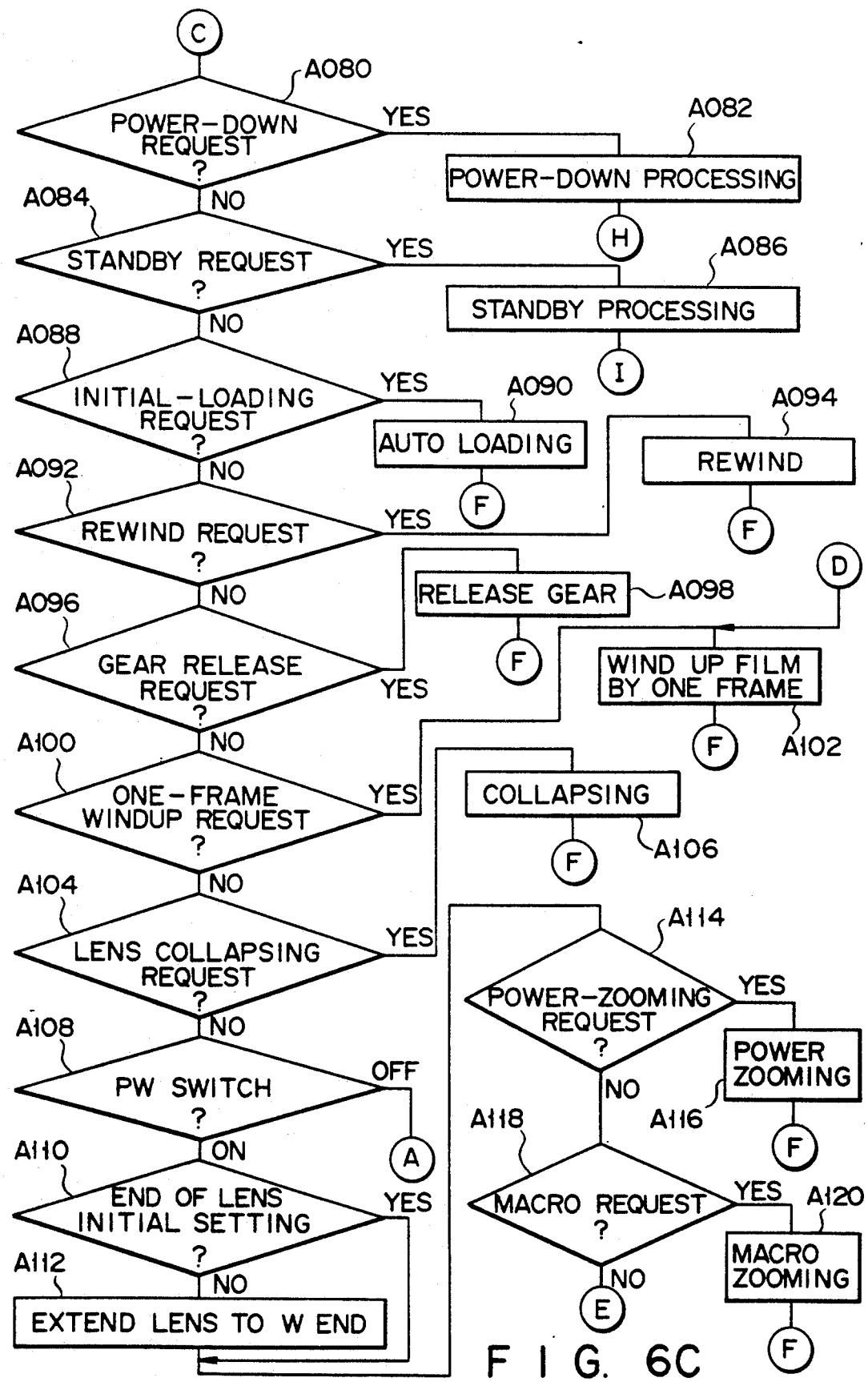
Figure 6D:
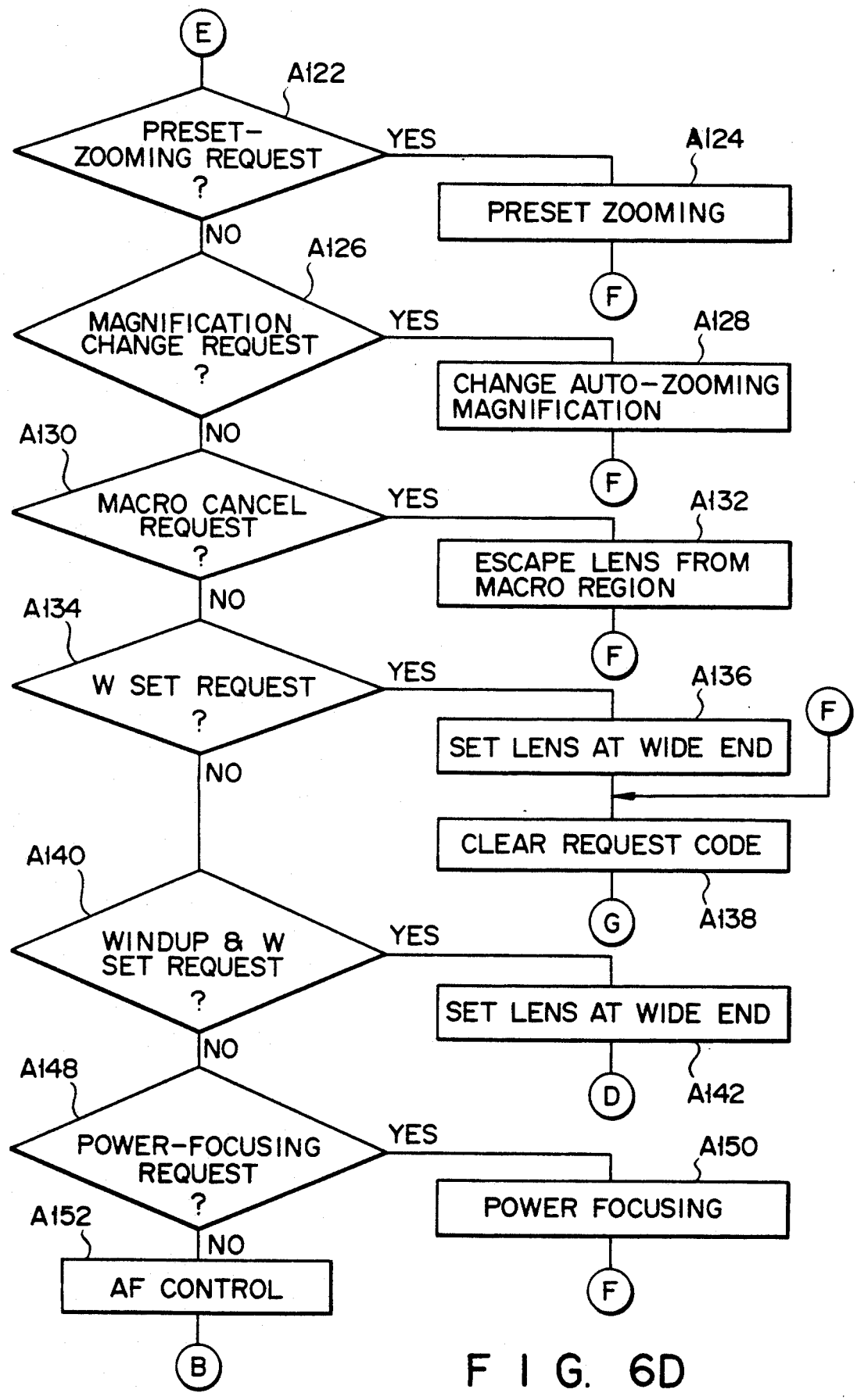

FIGS. 3A to 3D are schematic views showing an outer appearance and operation members of the camera apparatus having the improved photographing magnification setting and displaying functions according to this embodiment. FIG. 4 is a schematic view showing a display content of an LCD panel 322 or 281, and FIG. 5 is a schematic view showing a display content of the intra-finder display LCD 271. Operations and displays will be briefly described below with reference to these figures.

A PW switch 301 (217) is a switch for turning on the power supply. When the PW switch 301 (217) is turned on, a lens is extended from the collapsed position to the WIDE end, and the LCD panel 322 or 281 and the intra-finder display LCD 271 start displays. In this manner, the camera is set in a photographable state.

A flash pop-up button 333 is a button for setting the flash device stored in the main body of the camera in a ready state.

A SELF switch 302 is a switch for setting and canceling a self-timer mode. In the self-timer mode, a self-timer mark 402 is displayed on the LCD panel 322 or 281. In the self-timer mode, the self-timer mark 402 and AF auxiliary light blink.

A ZOOM.WIDE switch 303 and a ZOOM.TELE switch 304 are switches for driving the zooming lens and the focusing lens.

A release switch 305 has a two-stroke structure. The first-stroke switch (first release switch) is a switch for starting a photometric operation, a measurement of exposure data, an intra-finder display, and an AF operation. The second-stroke switch (second release switch) is a switch for performing an exposure operation, and starting a self timer.

A SHIFT.UP switch 306 and a SHIFT.DOWN switch 307 are switches for changing an exposure mode, an f-number, a shutter speed, and an exposure correction value. The exposure mode is changed by simultaneously depressing the SHIFT.UP switch 306 or the SHIFT.DOWN switch 307 and a MODE switch 308. The exposure mode includes a program mode (P mode), an aperture priority mode (A mode), and a manual mode (M mode). The selected mode is displayed on an exposure mode display section 401 of the LCD panel 322 or 281.

The f-number can be changed by depressing the SHIFT.UP switch 306 or the SHIFT.DOWN switch 307 when the A or M mode is selected as the exposure mode. The setting value of the f-number is displayed on f-number display sections of the LCD panel 322 or 281 and the intra-finder display LCD 271.

The shutter speed can be changed only when the M mode is set as the exposure mode. The shutter speed is changed by simultaneously depressing the SHIFT.UP switch 306 or the SHIFT.DOWN switch 307 and a +/− switch 309. The setting value of the shutter speed is displayed on shutter speed display sections 405 and 503 of the LCD panel 322 or 281 and the intra-finder display LCD 271.

The exposure correction value can be changed when the P or A mode is selected. The exposure correction value is also changed by simultaneously depressing the SHIFT.UP switch 306 or the SHIFT.DOWN switch 307 and the +/− switch 309. The exposure correction value is displayed on +/− display sections 409 and 507 of the LCD panel 322 or 281 and the intra-finder display LCD 271, and a frame count display section 407 of the LCD panel 322 or 281.

A SPOT switch 310 is a switch for selecting a spot photometric mode. When a spot photometric value is input, a display on a photometric mode display section 412 of the LCD panel 322 or 281, and a spot photometric display on the intra-finder display LCD 271 are made. On the other hand, when the spot photometric mode is not selected, and when the P mode is selected as the exposure mode, an estimation photometric mode is set, and "ESP" is displayed on the photometric mode display section 412 of the LCD panel 322 or 281. In this case, however, when the A or M mode is selected as the exposure mode, an average photometric mode is set, and no display is made on the LCD panel 322 or 281 and the intra-finder display LCD 271.

When the MODE switch 308 and the +/− switch 309 are simultaneously turned on, the respective modes can be reset, and a battery check operation can be performed.

A PF switch 311 is a switch for switching between an auto-focus mode and a power-focus mode. When the power-focus mode is selected, a power-focus display is made on the LCD panel 322 or 281 and the intra-finder display LCD 271.

A Z.MEMO switch 312 is a switch for memorizing and calling a zoom position.

A MACRO switch 313 is a switch for switching a macro mode. Every time the MACRO switch 313 is depressed, the macro mode is switched in the order of a tele-macro mode, a wide-macro mode, and a non-macro mode. At the same time, a macro state is displayed on a macro mode display section 410 of the LCD panel 322 or 281.

A DRIVE switch 314 is a switch for switching a drive mode. A drive mode selected by the DRIVE switch 314 is displayed on a drive mode display section 411 of the LCD panel 322 or 281.

A SUBJECT switch 315 is a switch for switching a subject mode. A subject mode selected by the SUBJECT switch 315 is displayed on a subject mode display section 403 of the LCD panel 322 or 281. When a portrait mode is selected as the subject mode, a numerical value indicating an auto-zooming magnification is displayed on the shutter speed display sections 405 and 503 of the LCD panel 322 or 281 and the intra-finder display LCD 271.

A FLASH switch 316 is a switch for switching a flash mode. An operation of the FLASH switch 316 is accepted when a built-in flash device is used, and the P or A mode is selected as the exposure mode. A display is made on a flash mode display section 413 of the LCD panel 322 or 281 only when the built-in flash device is used as a flash device. On the other hand, when the M mode is selected as the exposure mode, only lightning marks on the LCD panel 322 or 281 and the intra-finder display LCD 271, and parentheses on the LCD panel 322 or 281 are displayed.

A back cover mark 414 blinks to urge a user to open the back cover.

A battery mark 415 blinks when the battery 221 is almost discharged, thereby urging a user to exchange the battery 221. When the battery 221 is completely discharged, the operation of the camera is stopped.

A date mode switch 317, a date set switch 318, a date adjust switch 319, and a date display section 408 are operation switches and a display used in a date printing operation.

A REWIND switch 320 is a switch for issuing a rewind request (to be described later).

Reference numeral 321 denotes a switch cover; 322 or 281, the external LCD panel; 323, an eyepiece; 324, a film window; 325, a battery cover; 326, a flash device; 327, a shoe (with a cover); 328, an AF illuminator; 329, a back cover; 330, a main body; 331, a back cover opening knob; and 332, a grip.

In FIG. 4, reference numeral 401 denotes the exposure mode display section; 402, the self-timer mode display section; 403, the subject mode display section; 404, a power-focus display section; 405, the shutter speed display section; 406, the f-number display section; 407, the frame count display section; 408, the date display section; 409, the +/− display section; 410, the macro mode display section; 411, the drive mode display section; 412, the photometric mode display section; and 413, the flash mode display section.

Furthermore, in FIG. 5, reference numeral 501 denotes an AF display section; 502, a flash display section; 503, the shutter speed display section; 504, an f-number display section; 505, a spot photometric display section; 506, a power-focus display section; and 507, the +/− display section.

When the auto-focus mode is selected by the PF switch 311, the AF display section 501 of the intra-finder display LCD 271 is turned on when a focusing operation is possible, and blinks when it is determined that a focusing operation is impossible. The flash display section 502 of the intra-finder display LCD 271 blinks when both the built-in flash device and an external flash device are OFF, and a luminance of an object is too low, thereby urging a photographer to use the flash device. When only the built-in flash device is used, the display section 502 is turned on when the charging operation of the built-in flash device is completed, and when only the external flash device is used, it is turned on when the charging operation of the external flash device is completed. Furthermore, when both the built-in and external flash devices are used, the display section 502 is turned on when the charging operations of both the flash devices are completed.

Operations of the camera apparatus having the improved photographing magnification setting and displaying functions shown in FIG. 2 will be described hereinafter.

FIGS. 6A to 6D are schematic flow charts (main routine) showing operations of the main CPU 200.

When a photographer turns on the PW switch 217 or 301 to perform a photographing operation, or opens the back cover to load a film, the BK switch 218 is turned on, and the main CPU 200 is started. When the main CPU 200 is started, a predetermined program is executed in a sequence to be described below according to the flow charts shown in FIGS. 6A to 6D.

In step A002, processing for setting a stack, and disabling an interrupt mode is executed.

In step A004, power-ON initialization processing is executed. In this initialization processing, the IFIC 210 is started, the DC/DC converter 222 is started via a communication to the IFIC 210, data are read from the EEPROM 209, the internal RAM (random-access memory) of the main CPU 200 is initialized, the I/O ports of the main CPU 200 are initialized, and so on.

In step A006, a mode switch input subroutine is executed. In the mode switch input subroutine, the states of the switches (the key switch group 213 and 282) connected to the LCDIC 283 and the IFIC 210 are read by the main CPU 200 via a serial communication, and are compared with the previous data, thus detecting edges, counting ON switches, and counting switches which are turned on from an OFF state. This subroutine aims at inputting switch initial states immediately after a power-ON operation.

In step A008, processing for resetting data of, e.g., charging states of the built-in and external flash devices is executed.

In step A010, a checker communication subroutine is executed. In the checker communication subroutine, a communication is performed with a device outside the camera via the shoe contact, and a read/write operation of RAM data is performed using an external checker.

In step A012, it is checked based on data stored in the EEPROM 209 if a rewind operation was being executed when the PW switch 217 or 301 was previously turned off. If it is determined in step A012 that the rewind operation was being executed, the rewind operation is restarted in step A014. That is, when the PW switch 217 or 301 is turned off during the rewind operation, data indicating that the rewind operation is being performed when the PW switch 217 or 301 is turned off is stored in the EEPROM 209. Thus, when the PW switch 217 or 301 is turned on again, the rewind operation is restarted.

In step A016, mechanism sections of the camera are initialized to prepare for an exposure operation.

In step A018, it is checked if a film windup operation was being executed when the PW switch 217 or 301 was previously turned off. If it is determined in step A018 that the film windup operation was being executed, the windup operation is restarted in step A020. When the PW switch 217 or 301 is turned off during the film windup operation, data indicating that the windup operation is being executed when the PW switch 217 or 301 is turned off is stored in the EEPROM 209, and when the PW switch 217 or 301 is turned on again, the film windup operation is restarted again like in the rewind operation described above (steps A012 and A014). In this case, since the film windup operation is performed, for example, when the battery 221 is disconnected during the windup operation after exposure, an exposed film can be prevented from double-exposure.

In step A034, a photometric subroutine is executed. In this subroutine, an initial photometric value is input.

In step A036, a counter of a display timer is reset. This counter is decremented every time a 100-msec timer in the main CPU 200 overflows. When a count of the counter is borrowed, the main CPU 200 transits to the power saving mode.

In step A038, a request code is reset. As will be described later, when the flow is required to branch from the main routine according to various data, a request code corresponding to the required branch operation is set. The request code is a 1-byte code, and when it is 00H, no branch operation is performed, and a main loop is repeated.

A section corresponding to the main loop will now be described. The main loop can be roughly classified into two loops. The first loop consists of step A040, and steps A070 to A152, and is always executed. When the 100-msec timer overflows, the second loop consisting of steps A040 to A152 is executed. The respective processing operations in the main loop will be described below.

In step A040, the I/O ports of the main CPU 200 are refreshed.

In step A042, it is checked if the 100-msec timer overflows. If it is determined that the timer overflows, the 100-msec timer is restarted in step A044.

In step A046, the states of the BK switch 218 and the PUP switch 216 for detecting a ready/storage state of the built-in flash device ar input to the main CPU 200, and are compared with the previous data, thereby detecting OFF→ON/ON→OFF edges.

In step A048, the same mode switch input subroutine as in step A006 described above is executed.

In step A050 a mode/request code setting subroutine is executed. In this subroutine, a branch request command from the main routine is set, and operation modes and data of the camera are set or changed in accordance with the states of the switches input in steps A046 and A048, as will be described later.

In step A052, the absolute distance to an object is calculated based on an extension amount of the focusing lens from the infinity position. Note that the absolute distance to the object is used in a calculation of a G number in a flash photographing mode, and a zooming position calculation in the auto-zooming mode. The extension amount of the lens can be obtained by accumulating the number of pulses from the AF photo-interrupter 262 from the infinity position of the lens.

In step A054, processing for managing a charging time of the built-in flash device is executed. When a charging operation is not completed after an elapse of 20 sec, the charging operation is stopped, and the following recharging operation is inhibited. Once the charging operation is completed, the voltage of the capacitor is monitored to compensate for leakage.

In step A056, the charging operation of the flash device is stopped.

In step A058, a photometric subroutine is executed. When a command is transmitted to the IFIC 210, a voltage proportional to a log value of a photocurrent from the photodiode based on light reflected by an object, which light is incident through the lens, is output. The voltage is A/D-converted by the main CPU 200, thereby calculating the luminance (BV value) of the object. The photometric two-split photodiode 273 is split to have a circle-in-a-square or concentric-circle pattern, and a weighted mean value of outputs from the split portions is calculated according to a selected mode. Furthermore, a spot photometric operation is commonly executed by the AF sensor 291, and a spot BV value is calculated based on an integration time of the AF sensor 291.

In step A060, a charging control subroutine is executed to control the charging operation of the built-in flash device. When the main CPU 200 detects that the PUP switch 216 is turned on, it transmits a start command of the flash booster circuit 231 to the IFIC 210, and the flash booster circuit 231 starts the charging operation. A voltage of the capacitor is input from the voltage-dividing circuit 23 to the A/D port of the main CPU 200. When the voltage of the capacitor reaches a predetermined value, the main CPU 200 sets a charging end flag, and the flash booster circuit 231 stops the charging operation.

In step A062, an external flash data input subroutine is executed. In this subroutine, data from the external flash device are received. This subroutine is executed only when the external flash device is attached. Data input from the external flash device includes a charging state, a maximum G number, a flash mode, and the like.

In step A064, an APEX calculation subroutine (to be described in detail later) is executed. In this subroutine, an f-number, a shutter speed, a G number of the flash device, and the like are calculated on the basis of luminance data of an object calculated in step A058, data set in step A050, and data of the built-in and external flash devices.

In step A068, display data of modes, photometric data, and the like are decoded, and the decoded data are sent to the LCDIC 283 through the serial communication line 201, thereby updating a display of the LCDIC 283. As display means, the LCD panel 281 or 322, the intra-finder display LCD 271, the back-light LED 272 for illuminating the LCD 271, and the auxiliary-light LED 212 used in the self-timer mode are arranged, and operations of these means are processed in step A068. As described above, the LCD panel 281 or 322 and the intra-finder display LCD 271 are driven by the LCDIC 283. The LCDIC 283 comprises four COMMON terminals, and 22 SEGMENT terminals, and can perform 88 displays at a ¼ duty. The main CPU 200 selects displays to be turned on in accordance with the modes and data, and transfers 88 data to the LCDIC 283 via the serial communication line 201. The LCDIC 283 selectively drives the display sections of the LCD panel 322 or 281 and the intra-finder display LCD 271 on the basis of the 88 data. The display contents are updated every 100 msec. However, a blink display for an alarm is made while step A068 is executed three times, and is then turned off while step A068 is executed twice, thereby realizing a blink display at a 2-Hz frequency and at a duty of 3:2. The back-light LED 272 and the auxiliary-light LED 212 are controlled by a serial communication to the IFIC 210. The back-light LED 272 is turned on when the first release switch or the SPOT switch 310 is operated to start a photometric operation. During a self-timer operation or an exposure operation, the back-light LED 272 is kept OFF. The auxiliary-light LED 212 originally aims at assisting a auto-focusing operation in a low-luminance state. When the self timer is being operated, the auxiliary-light LED 212 blinks at a 2-Hz frequency to inform the operation of the self timer. As described above, the LCD panel 322 or 281 and the intra-finder display LCD 271 perform a blink display at a duty of 3:2. However, since the auxiliary-light LED 212 has a high luminance, it blinks at a duty of 1:4 so as not to give an uneasy feeling to a photographer.

The second loop has been described. The second loop is executed every 100 msec. Since basic operations of the camera are executed in the second loop executed every 100 msec, setup data of modes, photometric data, displays, and the like are updated every 100 msec.

The first loop processing which is always executed regardless of the 100-msec timer will be described below.

In step A070, a charging control subroutine is executed. In this subroutine, the charging operation of the built-in flash device is controlled like in step A060 described above.

In step A072, a checker communication subroutine is executed. In this subroutine, the same processing as in step A010 described above is executed.

In step A074, states of the first and second release switches of the release switch 305 are input.

In step A076, an exposure judgment/exposure subroutine is executed. In this subroutine, judgment of branch processing to an exposure sequence, and exposure are executed, as will be described later.

In step A078, it is checked if the exposure is executed in step A076. If it is determined that the exposure is executed, the flow jumps to step A044; otherwise, processing in step A080 and subsequent steps is executed.

In steps A080 to A148, various processing operations are executed in accordance with a branch request code detected in step A050.

In step A080, it is checked if a power-down request is set in step A050. If it is determined that the power-down request is set, power-down processing is executed in step A082.

The power-down processing will be described below. In a power-down mode, an interrupt to the main CPU 200 is disabled. A command is transmitted to the IFIC 210 to turn off all the motors (the mirror.shutter motor 242, the windup motor 251, the zooming motor 265, and the AF motor 261), and all the LEDs. Furthermore, necessary data are transmitted to and stored in the EEPROM 209. Data to be stored include data indicating a camera operation state (whether or not the rewind operation is being executed when the PW switch 271 or 301 is turned off, whether or not the windup operation is being executed when the PW switch 217 or 301 is turned off), an operation mode, an f-number, a shutter speed, exposure correction data, and the like. In particular, as the f-number and shutter speed, values set in the corresponding exposure modes are stored. Finally, the focusing lens is collapsed to the infinity position. Upon completion of the above-mentioned processing, the DC/DC converter 222 is stopped by system-down of the IFIC 210. Thereafter, initialization of the I/O ports and monitoring of the PW switch 217 or 301, and BK switch 218 are repeated until the backup capacitor is discharged, and the main CPU 200 is stopped. If the PW switch 217 or 301, or the BK switch 218 is turned on in this state, the flow jumps to step A002, and execution of the program is restarted.

If it is determined in step A080 that no power-down request is set, processing in step A084 is executed. In step A084, it is checked if a standby request is set in step A050. If it is determined that the standby request is set, standby processing is executed in step A086. In a standby mode, display OFF data is transmitted to the LCDIC 283 to turn off all the displays. Subsequently, an interrupt for canceling the standby mode is set. As described above, the main CPU 200 has the four interrupt ports, which are respectively connected to the PW switch 217 or 301, the BK switch 218, the PUP switch 216, and the KEYINT line. A signal appearing on the KEYINT line corresponds to a logic sum of an interrupt signal from the LCDIC 283 and an interrupt signal from the IFIC 210. Therefore, when one of a total of 17 switches of the key switch group 213 connected to the IFIC 210 and the key switch group 282 connected to the LCDIC 283 is turned on, an interrupt signal is generated on this line. When an interrupt signal is generated from one of the PW switch 217 or 301, the BK switch 218, the PUP switch 216, and the KEYINT line, steps A024 to A032 are executed. In step A024, initialization is performed. In this case, an interrupt is inhibited. Subsequently, in step A026, power-ON initialization processing is executed like in step A004. In this case, since RAM data are held even in the standby mode, the RAM is not initialized. In the standby mode, the operations of the IFIC 210, the LCDIC 282, and the like are stopped, and a clock is also stopped. In step A028, a mode switch input subroutine is executed like in step A006. In step A030, data of, e.g., charging states of the built-in flash device and the external flash device are reset in the same manner as in step A008. In step A032, a checker communication subroutine is executed like in step A010. Thereafter, processing in step A034 and subsequent steps is executed.

If it is determined in step A084 that no standby request is set, processing in step A088 is executed. It is checked in step A088 if an auto-loading request is set in step A050. If it is determined that an initial-loading request is set, initial-loading processing is executed in step A090. In the initial-loading processing, when a photographer sets a new film, the film is wound up to a photographable position. When the initial-loading operation is performed, the windup motor 251 is controlled on the basis of output pulses from the film detection photointerrupter 252. The windup motor 251 and the film detection photointerrupter 252 are selected by transmitting a command to the IFIC 210. When the film is fed to a predetermined position, the request command is reset, and the flow jumps to step A138 (to be described later).

If it is determined in step A088 that no initial-loading request is set, processing in step A092 is executed. In step A092, it is checked if a rewind request is set in step A050. If it is determined that the rewind request is set, a rewind operation is executed in step A094. In the rewind operation, a photographed film (or a film which is photographed up to the middle of roll) is rewound into a patrone. The rewind operation is performed by reversing the mirror.shutter motor 242 commonly used in a mirror up/down operation, and an aperture/shutter charging operation while monitoring the output from the film detection photointerrupter 252. The mirror.-shutter motor 242 and the film detection photointerrupter 252 are controlled through a communication to the IFIC 210. During the rewind operation, the PW switch 217 or 301, and the BK switch 218 are monitored, and the processing is completed when the PW switch 217 or 301 is turned off, when the BK switch 218 is turned on, or when the rewind operation is completed. Thereafter, the request command is reset in step A138, and the flow jumps to step A044 described above. When the PW switch 217 or 301 is turned off, data representing a camera operation state is set in "rewind state" so as to restart the rewind operation in step A014 when the PW switch 217 or 301 is turned on for the next time.

If it is determined in step A092 that no rewind request is set, processing in step A096 is executed. It is checked in step A096 if a gear release request is set in step A050. If it is determined that the gear release request is set, a gear release operation is executed in step A098. In the gear release operation, a windup spool is set in a free state so as to allow extraction of a wound-up film. Upon completion of the gear release operation, the request command is reset in step A138, and the flow jumps to step A044.

If it is determined in step A096 that no gear release request is set, processing in step A100 is executed. It is checked in step A100 if a one-frame windup request is set in step A050. If it is determined that the one-frame windup request is set, a one-frame windup operation is executed in step A102. In the one-frame windup operation, a film is wound up by one frame without performing an exposure operation. In this case, the windup motor 251 and the film detection photointerrupter 252 ar controlled through the IFIC 210.

If it is determined in step A100 that no one-frame windup request is set, processing in step A104 is set. In step A104, it is checked if a lens collapsing request is set in step A050. If it is determined that the lens collapsing request is set, the lens is collapsed in step A106 to be set in a photographing disabled state.

In step A108, the state of the PW switch 217 or 301 is monitored. If the PW switch 217 or 301 is OFF, since processing in step A110 and subsequent steps is unnecessary, the flow jumps to step A036.

In steps A110 and A112, processing for, when the PW switch 217 or 301 is ON, extending of the lens from a collapsed region to the WIDE end is executed. Once step A112 is executed, since a lens initial set flag of the main CPU 200 is set, this processing is not executed in the second and subsequent executions of this sequence.

In step A114, it is checked if a power-zooming request is set in step A050. If it is determined that the power-zooming request is set, power-zooming processing is performed in step A116. In the power-zooming processing, the ZOOM.TELE switch 304, and the ZOOM.WIDE switch 303 are monitored, and the zooming motor 265 is rotated in the operated direction of the switch. When the ZOOM.TELE switch 304 or the ZOOM.WIDE switch 303 is turned off, the zooming motor 265 is stopped. During the power-zooming processing, the main CPU 200 receives the state of the first release switch and the value of the zooming encoder 266 via a communication with the IFIC 210. When the first release switch is turned on, or when the zooming lens has reached the TELE or WIDE end, the zooming motor 265 is stopped. Thereafter, in step A138, the request code is cleared, and the flow jumps to step A044. The reason why the zooming motor 265 is stopped when the first release switch is turned on is that a shutter chance has priority over the zooming state. When the first release switch is turned on, a preparation for a release operation is subsequently performed.

If it is determined in step A114 that no power-zooming request is set, processing in step A118 is executed. It is checked in step A118 if a macro-zooming request is set in step A050. If it is determined that the macro-zooming request is set, a macro-zooming operation is executed in step A120. In the macro-zooming operation, the zooming lens is moved to a focal length position capable of performing a macro photographing operation. In this case, two focal lengths capable of performing a macro photographing operation are available, and are referred to as TELE and WIDE macro modes. Whether the macro-zooming operation is executed in the TELE or WIDE macro mode is selected by setting a flag for indicating this selection in step A050. In zooming control, a zooming direction and speed are controlled while comparing an encoder value of a pre-stored macro position with the present encoder position, so that the lens is stopped at a target position.

Thereafter, the request code is cleared in step A138, and the flow jumps to step A044.

If it is determined in step A118 that no macro-zooming request is set, processing in step A122 is executed. In step A122, it is checked if a preset-zooming request is set in step A050. If it is determined that the preset-zooming request is set, a preset-zooming operation is executed in step A124. In the preset-zooming operation, a zooming operation is instantaneously performed to an arbitrary focal length prestored in the EEPROM 209, and substantially the same processing as in the macro-zooming control is performed, except that the target value is stored in the EEPROM 209. Thereafter, the request code is cleared in step A138, and the flow jumps to step A044.

If it is determined in step A122 that no preset-zooming request is set, processing in step A126 is executed. It is checked in step A126 if a magnification change request is set in step A050. If it is determined that the magnification change request is set, a magnification change operation is executed in step A128. In this case, a magnification means an auto-zooming magnification. That is, Magnification = Lens Focal Length/Object distance (1)

Several magnifications are predetermined, and a focal length is obtained on the basis of object distance data obtained in step A052, and the selected magnification. In step A128, zooming is performed to a position corresponding to the obtained focal length. The zooming control is executed by inputting the value of the zooming encoder 266 to the main CPU 200 via a communication with the IFIC 210. Thereafter, the request code is cleared in step A138, and the flow jumps to step A044.

If it is determined in step A126 that no magnification change request is set, processing in step A130 is executed. It is checked in step A130 if a macro cancel request is set in step A050. If it is determined that the macro cancel request is set, a macro cancel operation is executed in step A132. In step A132, when the focusing lens falls within a macro photographing region, the lens is collapsed to the normal closest end using the AF motor 261 while monitoring an absolute distance counter by the AF photointerrupter 262. Thereafter, the request code is cleared in step A138, and the flow jumps to step A044.

If it is determined in step A130 that no macro cancel request is set, processing in step A134 is executed. In step A134, it is checked if a lens WIDE end set request is set in step A050. If it is determined that the lens WIDE end set request is set, a lens WIDE end set operation is executed in step A136. In step A136, the target value of the zooming encoder 266 is set to be a value corresponding to the lens WIDE end, and the same processing as in step A120 or A124 is executed. Thereafter, the request code is cleared in step A138, and the flow jumps to step A044.

If it is determined in step A134 that no lens WIDE end set request is set, processing in step A140 is executed. It is checked in step A140 if a one-frame windup & lens WIDE end set request is set in step A050. If it is determined that the one-frame windup & lens WIDE end set request is set, a one-frame windup & WIDE end set operation is executed in step A142. In the one-frame windup & WIDE end set operation, both the one-frame windup operation and the WIDE end set operation are executed. After the same lens WIDE end set processing as in step A136 is executed in step A142, the flow jumps to step A102, and the one-frame windup processing is executed.

If it is determined in step A140 that no one-frame windup & lens WIDE end set request is set, processing in step A148 is executed. In step A148, it is checked if a power-focusing request is set in step A050. If it is determined that the power-focusing request is set, a power-focusing operation is executed in step A150. In the power-focusing operation, the ZOOM.TELE switch 304 and the ZOOM.WIDE switch 303 are monitored. When the ZOOM.TELE switch 304 is turned on, the AF motor 261 is driven to drive the lens toward the infinity side, while when the ZOOM.WIDE switch 303 is turned on, the AF motor 26 is driven to drive the lens toward the closest side. The drive operation of the AF motor 261 is stopped when the ZOOM.TELE switch 304 or the ZOOM.WIDE switch 303 is turned off. Thus, a photographer can manually perform focusing. During the drive operation of the lens, the first release switch and the value of the absolute distance counter are monitored. When the first release switch is turned on, the drive operation of the lens is stopped to prepare for exposure. Similarly, when the lens reaches the infinity end or closest end, the drive operation of the lens is stopped. The closest end is set at different positions in the macro mode and in a non-macro mode even when the focal length remains the same.

If it is determined in step A148 that no power-focusing request is set, processing in step A152 is executed. In step A152, an AF control subroutine is executed. In the AF control subroutine, an integration of the AF sensor is started for a distance measurement, and an AF distance measurement calculation is performed. When the auto-focusing mode is selected by the PF switch 311, and the first release switch is ON, the lens is driven for focusing. Subsequently, when focusing is possible, an in-focus flag is set; when focusing is impossible, a focusing disable flag is set. With these flags, whether or not exposure is started is determined, and an in-focus/focusing disable display in step A068 is made.

The mode/request code setting subroutine in step A050 in the main routine (FIGS. 6A to 6D) described above will be described in detail below with reference to FIGS. 7A to 7H-II.

FIGS. 7A to 7H-II are flow charts showing the mode/request code setting subroutine in step A050 in FIGS. 6A to 6D. As described above, in the mode/request code setting subroutine, modes, a branch request code of the main routine, and the like are set in accordance with data such as states of the switches. In step B000, initialization is performed.

Thereafter, in step B002, the position of the zooming lens is input. As described above, the 5-bit zooming encoder 266 is attached to the zooming lens, the output value from the zooming encoder 266 is read by the IFIC 210, and the read value is transmitted to the main CPU 200 via a serial communication. The zooming encoder 266 outputs "11111", i.e., "31" in decimal notation at the WIDE end, and outputs "00000", i.e., "0" in decimal notation at the TELE end. When the lens is present within a collapsed region, the collapsing switch (SB switch) is turned on independently of the encoder. In this case, the encoder output indicates "31" (WIDE end) in decimal notation.

In step B004, data of an open f-number according to the zooming position is input in the form of APEXAV.

In step B006, it is checked if the built-in flash device or the external flash device is ON or OFF. If the built-in flash device or the external flash device is ON, a SPOT flag is cleared in step B008 to inhibit a SPOT photometric operation.

It is then checked in step B010 if the back cover is opened or closed.

If the back cover is closed, step B012 is executed. It is checked in step B012 if the back cover is closed immediately before this step, i.e., it is checked if the back cover was open or closed while the mode/request code setting subroutine was previously executed. If it is determined that the back cover is closed immediately before the present step, mode reset operations upon closing of the back cover, such as reset operations of a film frame count, an exposure correction value, and the like are executed in step B014. In step B016, an initial-loading request code is set, and this subroutine is ended. The initial-loading request code is a code for executing an operation of a content requested in the main routine.

If it is determined in step B012 that the back cover is not closed immediately before the present step, it is checked in step B020 if the PW switch 217 or 301 is ON or OFF. If the PW switch 217 or 301 is OFF, mode reset operations are performed in step B022, and thereafter, a power-down request code is set in step B024, thus ending this subroutine.

If it is determined that the back cover is not closed immediately before the present step B012, and that the PW switch 217 or 301 is ON, film end detection is performed in step B028. If the film end is detected, mode reset operations are performed in step B030, and thereafter, a rewind request code is set in step B032, thus ending the subroutine. Note that the film en represents a case wherein a predetermined number of pulses from the film detection photointerrupter 252 are not input upon film travel after an elapse of a predetermined period of time during a film windup operation. In this case, film end data is set in a windup sequence. Whether or not a rewind request is set can be determined based on the film end data.

If it is determined in step B028 that the film end is not detected, the flow jumps to step B062 (FIG. 7C).

If it is determined in step B010 that the back cover is opened, it is checked in step B036 if the back cover is opened immediately before this step, i.e., it is checked if the back cover was open or closed while the mode/request code setting subroutine was previously executed. If it is determined that the back cover is opened immediately before this step, mode reset operations such as a reset operation of an exposure correction value, and the like are performed in step B038. In step B040, a gear release request code is set, thus ending this subroutine. However, if it is determined that the back cover is not opened immediately before the present step, it is checked in step B044 if the PW switch 217 or 301 is turned off immediately before this step. If it is determined that the PW switch 217 or 301 is turned off immediately before this step, the same mode reset operations as in the power-OFF processing are performed in step B046. Thereafter, a lens collapsing request code is set in step B048, thus ending this subroutine.

On the other hand, if it is determined in step B044 that the PW switch 217 or 301 is not turned off immediately before this step, the ON/OFF state of the PW switch 217 or 301 is checked in step B052. If the PW switch 217 or 301 is turned off while the back cover is open, and when the collapsing operation of the lens is completed, the display counter executes a decrementing processing sequence from the next routine. If it is determined in step B054 that 25 sec have elapsed, a standby request code is set in step B058. If it is determined in step B052 that the PW switch 218 or 301 is ON, the flow jumps to step B062.

After step B062, the same processing routine is executed regardless of an open/closed state of the back cover. In steps B062 to B084, processing when the self timer is operated is executed.

The operation state of the self timer can be determined based on a self-timer mode flag (F-MSLF) and a self-timer operation flag (F-ISLF). In step B062, the self-timer mode flag is checked, and in step B064, the self-timer operation flag is checked. If both the flags are set, i.e., if the self-timer mode is selected, and the self timer is in operation, the self timer is operated for 12 sec. In this state, the SELF switch 302, the MODE switch 308, and the +/− switch 309 are accepted in addition to the PW switch 217 or 301, and the BK switch 218.

It is checked in step B066 if 12 sec have elapsed. In this checking operation, a self-timer counter is decremented, and its borrow is checked. If it is determined that 12 sec have elapsed, an exposure request code is set in step B068, and the subroutine is ended. On the other hand, if it is determined that 12 sec have not elapsed, it is checked in step B072 if the number of ON switches is one.

If it is determined that the number of ON switches is one, the state of the SELF switch 302 is checked in step B074. If it is determined that the SELF switch 302 is ON, the self-timer operation flag (F_ISLF) is cleared, thus interrupting the self timer. In this case, since the self-timer mode flag (F_MSLF) is held, the self timer can be restarted when the release switch 305 is depressed. On the other hand, if it is determined that the SELF switch 302 is OFF, the subroutine is ended.

If it is determined in step B072 that the number of ON switches is other than 1, it is checked in step B080 if the number of ON switches is 2. If it is determined that the number of ON switches is 2, the ON/OFF state of the MODE switch 308 is checked in step B082, and the ON/OFF state of the +/− switch 309 is checked in step B084. If it is determined that the MODE switch 308 and the +/− switch 309 are simultaneously turned on, the flow jumps to step B260 (FIG. 7H), and mode reset operations of the camera are performed, as will be described later. In this case, since the self-timer mode flag (F_MSLF) and the self-timer operation flag (F_ISLF) are simultaneously cleared, the self-timer mode is also canceled. When at least one of the MODE switch 308 and the +/− switch 309 is ON, the subroutine is ended. A counter is set with an initial value of 120, and this subroutine is executed every 100 msec. Therefore, exposure is performed about 12 sec after the self timer is started. If it is determined in step B062 that the self-timer mode flag (F_MSLF) is not set, and if it is determined in step B064 that the self-timer operation flag (F_ISLF) is not set, the flow jumps to step B088.

In step B088, the self-timer counter is reset.

In step B090, it is checked if there is an ON switch. If it is determined that there is no ON switch, the display counter is checked. If it is determined that 25 sec have not elapsed yet, setting processing is executed in step B094, and a standby request code is set in step B096. Note that the display timer decrements an initial value of 250 every 100 msec to measure about 25 sec like in the self-timer counter.

On the other hand, if it is determined in step B090 that there is an ON switch, a DX code subroutine is executed in step B100. In the DX code subroutine, DX data printed on a side surface of a film patrone is input. The DX data is directly input by the port of the main CPU 200.

In step B102, the display counter is reset.

It is then checked in step B104 if the camera state corresponds to a rewind end state. If it is determined to be rewind ending condition, the flow immediately returns, and no mode setting operations are accepted until the rewind end code is reset in an open state of the back cover.

Figure 7A:
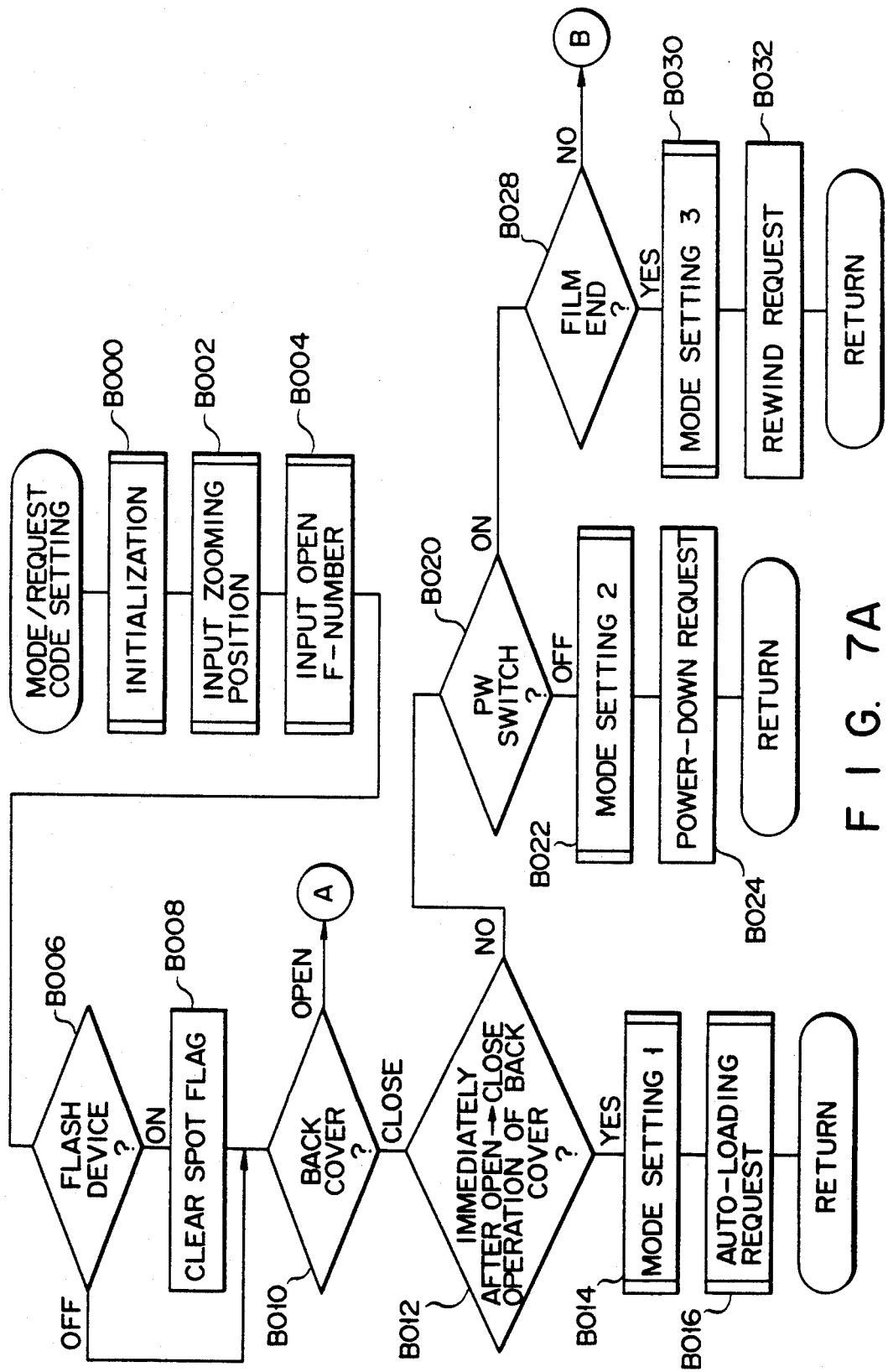
Figure 7B:
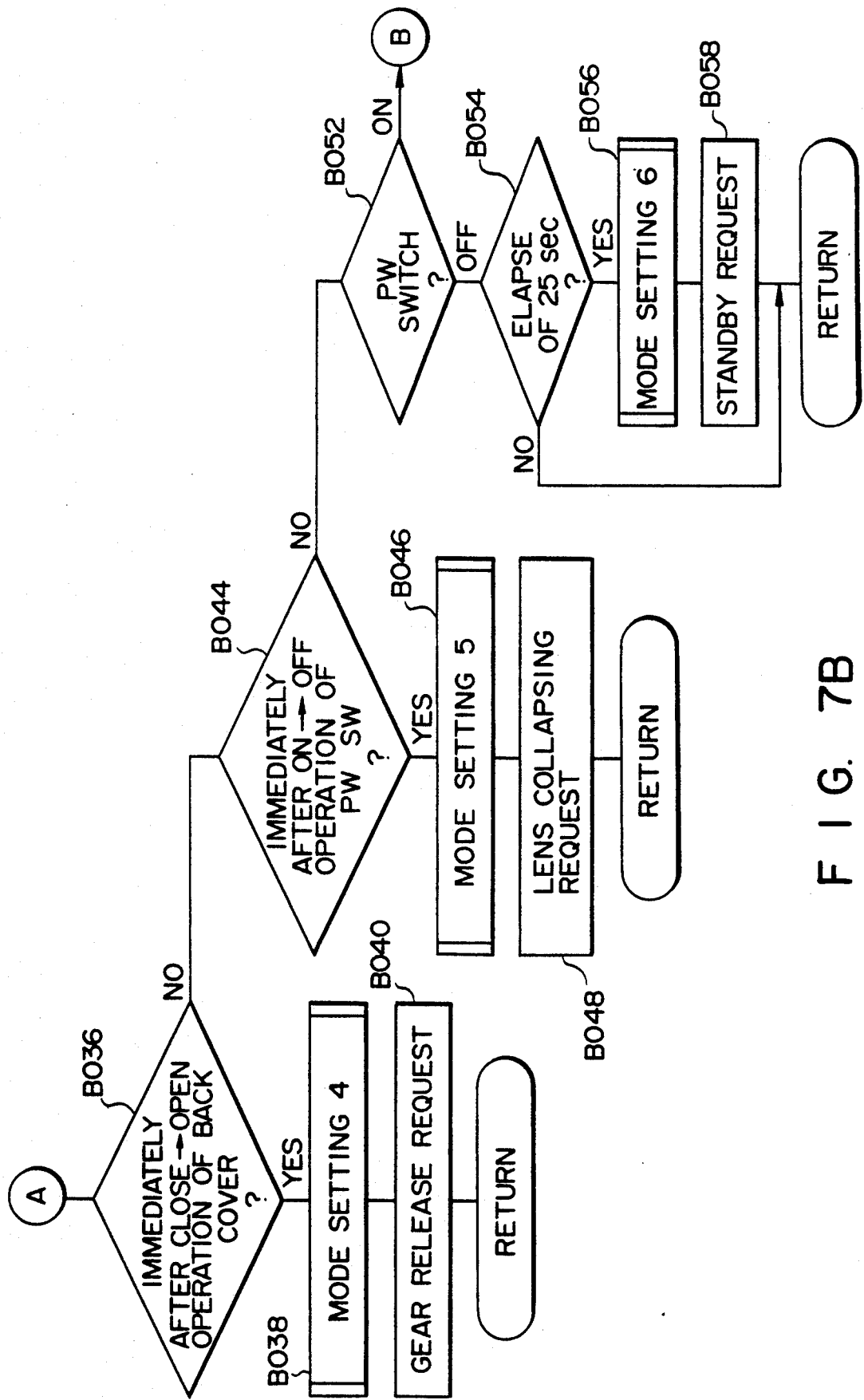
Figure 7D:
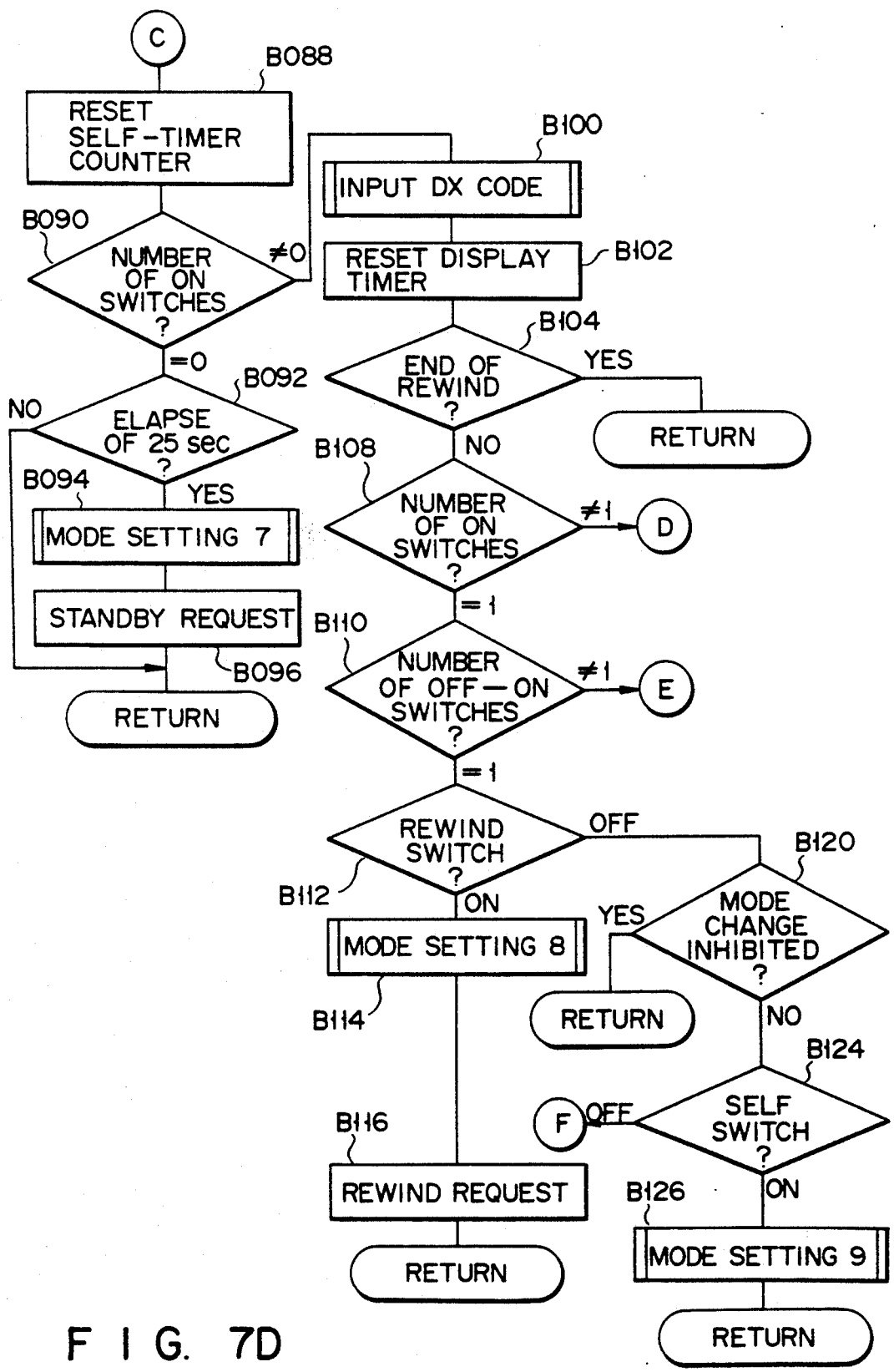
Figure 7E:
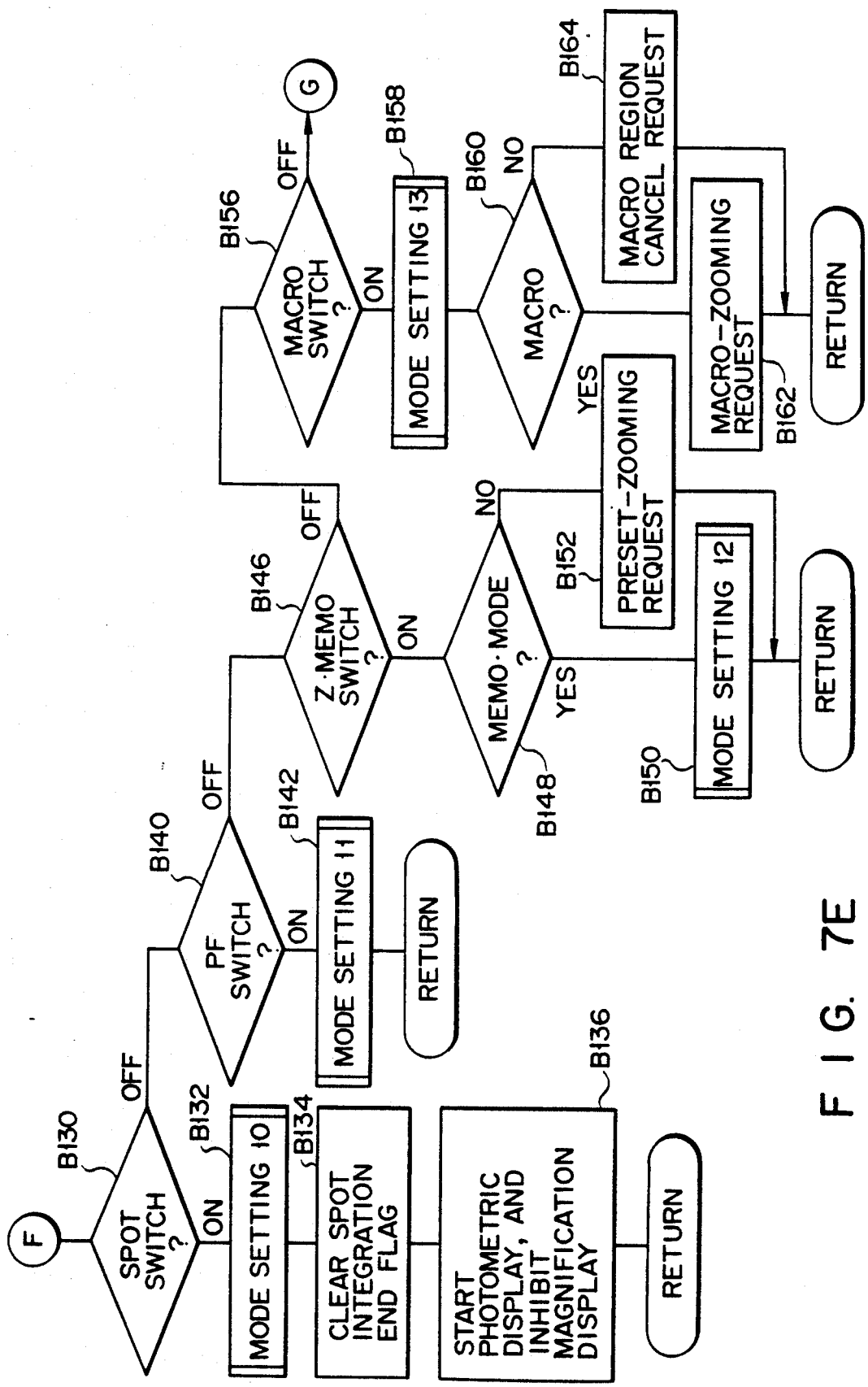
Figure 7G:
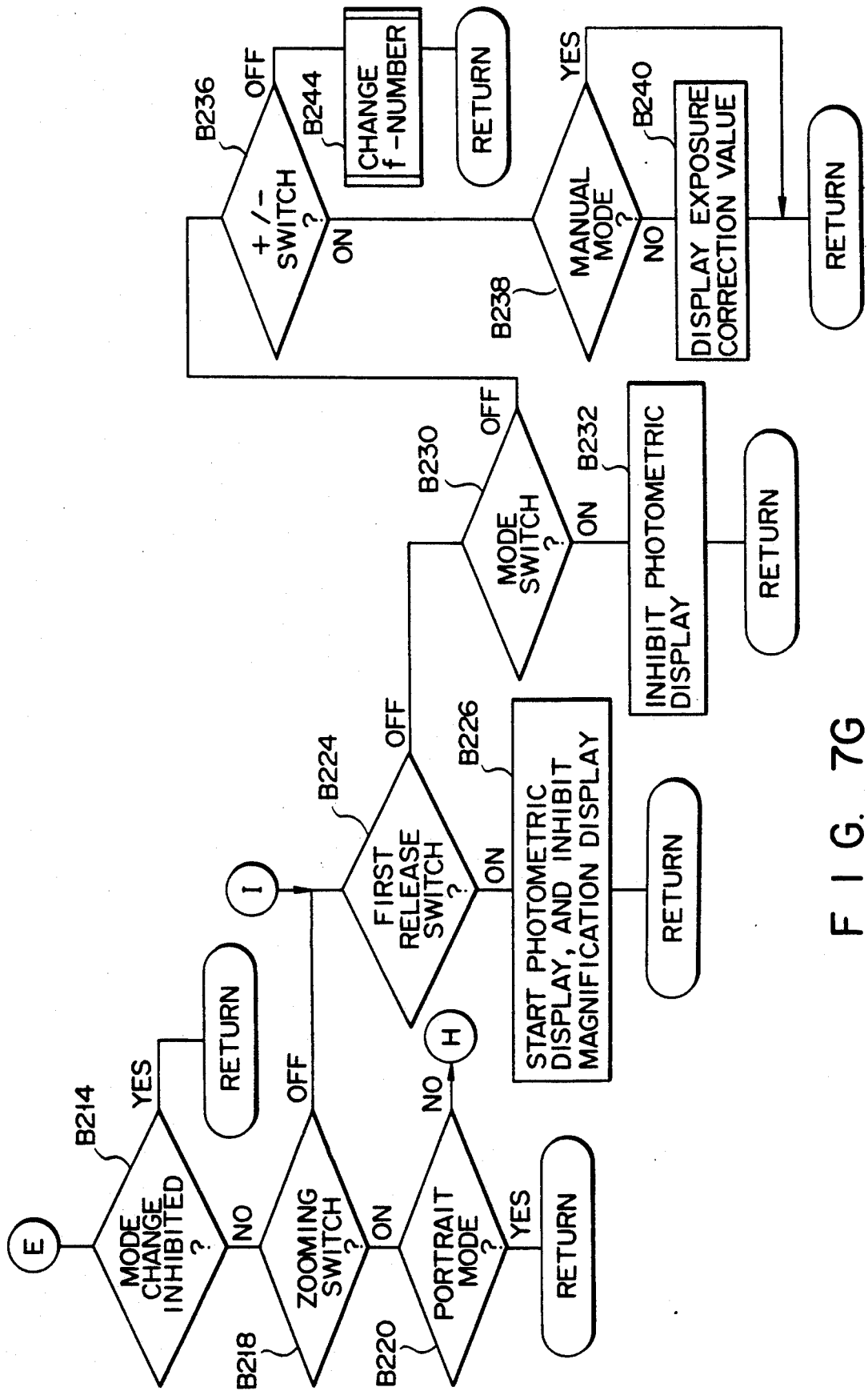

If it is determined, in step B104, to be no rewind ending condition, step B108 is executed. It is checked in step B108 if the number of ON switches is 1. If it is determined that the number of ON switches is not 1 (i.e., two or more), the flow jumps to step B248 (FIGS. 7H-I and 7H-II). However, if it is determined that the number of ON switches is 1, it is checked in step B110 if the switch is turned on immediately before this step. If it is determined that the switch is kept ON before this step, the flow jumps to step B214 (FIG. 7G). On the other hand, if it is determined that the switch is turned on immediately before this step, processing in step B112 and subsequent steps is executed.

In step B112 and subsequent steps, processing when a switch is solely turned on is executed.

The ON/OFF state of the REWIND switch 320 is checked in step B112. If it is determined that the REWIND switch 320 is ON, mode setting processing is executed in step B114, and thereafter, the rewind request code is set in step B116, thus ending the subroutine. On the other hand, if it is determined that the REWIND switch 320 is OFF, step B120 is executed.

It is checked in step B120 if a mode change operation is inhibited. Whether or not the mode change operation is inhibited is determined by checking a mode change inhibit flag. The mode change inhibit flag is set when the initial-loading operation is unsuccessful. Therefore, when the initial-loading operation is unsuccessful, only the REWIND switch 320 is accepted. If it is determined in step B120 that the mode change operation is inhibited, the subroutine is ended. However, if it is determined that the mode change operation is not inhibited, step B124 is executed.

The ON/OFF state of the SELF switch 302 is checked in step B124. If it is determined that the SELF switch 302 is ON, the self-timer mode flag (F_MSLF) is set/reset in step B126, and the subroutine is ended. On the other hand, if it is determined that the SELF switch 302 is OFF, step B130 is executed.

The ON/OFF state of the SPOT switch 310 is checked in step B130. If it is determined that the SPOT switch is ON, a SPOT mode flag (F_MSPOT) is set/reset in step B132, and a SPOT integration end flag (F_SPLOCK) is reset in step B134. Furthermore, a photometric calculation display is enabled in step B136 and a magnification display is inhibited. When the flag F_MSPOT is set, and the flag F_SPLOCK is reset, the integration of the AF sensor 291 is started in step A058 of the main routine described above. When an object luminance BV is obtained upon completion of the integration, the flag F_SPLOCK is set, and an AE mode is locked. When the SPOT switch 310 is turned on again in this state, the SPOT photometric mode is canceled.

If it is determined in step B130 that the SPOT switch 310 is OFF, step B140 is executed. In step B140, the ON/OFF state of the PF switch 311 is checked. If it is determined that the PF switch 311 is ON, a PF flag (F-MPF) is set/reset in step B142. When the flag F-MPF is set, the camera is set in a PF (power-focusing) mode; when it is reset, the camera is set in an AF (auto-focusing) mode. In the PF mode, an exposure operation is started regardless of the in-focus/focusing disable state when the second release switch is turned on.

If it is determined in step B140 that the PF switch 311 is OFF, step B146 is executed. In step B146, the ON/OFF state of the Z MEMO (zooming memory) switch 312 is checked. If it is determined that the Z.MEMO switch 312 is ON, it is then checked in step B148 if a MEMO mode is set. If it is determined that the MEMO mode is set, an output value from the zooming encoder 266, and a macro mode state (a TELE macro flag F_TMCR and a WIDE macro flag F_WMCR) are stored in the EEPROM 209, and a zooming memory display blink counter is set. This counter is monitored in step A068 in the main routine (FIGS. 6A to 6D) described above, thereby blinking a zooming memory display five times. Thus, a photographer can confirm that the zooming position is memorized. On the other hand, if it is determined in step B148 that the MEMO mode is not set, a preset-zooming request code is set in step B152, and the subroutine is ended. With this code, step A124 in the main routine (FIGS. 6A to 6D) is called, and a zooming operation can be instantaneously performed on the basis of data stored in the EEPROM 209.

If it is determined in step B146 that the Z.MEM switch 312 is OFF, step B156 is executed. In step B156, the ON/OFF state of the MACRO switch 313 is checked. If it is determined that the MACRO switch 313 is ON, a mode is changed in step B158. In this case, data is changed in the order of a non-macro mode (F_TMCR=0, F_WMCR=0), a TELE macro mode (F_TMCR=1, F_WMCR=0), and a WIDE macro mode (F_TMCR=0, F_WMCR=1).

It is checked in step B160 if the macro mode is set after the data is changed. If it is determined that the macro mode is set, a macro-zooming request code is set in step B162. As a result, a zooming operation is performed in a macro region in step A120 in the main routine (FIGS. 6A to 6D). On the other hand, if it is determined that the non-macro mode is set, a macro region cancel request code is set in step B164. As a result, if the focusing lens is present in the macro region, it is contracted to the normal closest end in step A132 in the main routine (FIGS. 6A to 6D).

If it is determined in step B156 that the MACRO switch 313 is OFF, step B168 is executed. In step B168, the ON/OFF state of the DRIVE switch 314 is checked. If it is determined that the DRIVE switch 314 is ON, data is changed in the order of a single mode (F_MDRV0=0, F_MDRV1=0), a continuous mode (F_MDRV0=1, F_MDRV1=0), and a double-exposure mode (F_MDRV0=0, F_MDRV1=1) in step B170. It is then checked in step B172 if a first photographing operation in the double-exposure mode is ended. If it is determined that the first photographing operation is ended (F_MDRV0=1, F_MDRV1=1), the drive mode is returned to the single mode (step B170), and a one-frame windup request code is set in step B174, thus ending the subroutine. Thus, in step A102 shown in the main routine (FIGS. 6A to 6D), a film is wound up by one frame.

If it is determined in step B168 that the DRIVE switch 314 is OFF, step B178 is executed. In step B178, the ON/OFF state of the SUBJECT switch 315 is checked. If it is determined that the SUBJECT switch 315 is ON, data is changed in the order of a non-subject mode (F_MSBT0=0, F_MSBT1=0), a portrait mode (F_MSBT0=1, F_MSBT1=0), a night-view mode (F_MSBT0=0, F_MSBT1=1), and the zooming memory mode (F_MSBT0=1, F_MSBT1=1) in step B180. The portrait mode is an open aperture priority program AE mode using the auto-zooming mode. If it is determined in step B182 that this mode is selected, a standard-zooming request code is set in step B184 to perform a zooming operation to an auto-zooming initial position. The night-view mode is a night-view photographing program AE mode, and the zooming memory mode is as described above.

If it is determined in step B178 that the SUBJECT switch 315 is OFF, step B188 is executed. In step B188, the ON/OFF state of the FLASH switch 316 is checked. If it is determined that the FLASH switch 316 is ON, the state of the built-in flash device is checked in step B190. If it is determined that the FLASH switch 316 is ON, and the PUP switch 216 for the built-in flash device is ON, data is changed in the order of an AUTO mode (F_MSTR0=0, F_MSTR1=0), an AUTO-S mode (F-MSTR0=1, F_MSTR1=0), and a FILL-IN mode (F_MSTR0=0, F_MSTR1=1), or in the order of the AUTO mode and the AUTO-S mode in accordance with the exposure mode, in step B192. The AUTO mode is a low-luminance state automatic emission mode. In the AUTO-S mode, pre-emission for preventing a "red eye" phenomenon is performed, and then, the same operation as in the AUTO mode is performed. The FILL-IN mode is a forcible emission mode for allowing a back-light daylight synchro operation. When the focal plane shutter is employed, since a photographing operation using a flash device cannot be performed at a high shutter speed, an aperture must be adjusted if the FILL-IN mode is used in a high-luminance state. Therefore, in the camera apparatus of this embodiment, a shutter speed and an aperture are limited to a use in the program AE mode determined by the camera apparatus.

If it is determined in step B188 that the FLASH switch 316 is OFF, step B196 is executed. In step B196, the ZOOM.TELE switch 304 o the ZOOM.WIDE switch 303 is checked. The ZOOM.TELE switch 304 or the ZOOM.WIDE switch 303 has three functions. If it is determined that the switch 304 or 303 is ON, a corresponding request code is set in accordance with a mode. It is checked in step B198 if the portrait mode is selected, and it is then checked in step B202 if the magnification change mode is selected. If it is determined that the portrait mode is selected, and the magnification change mode is selected, a magnification change request is issued in step B204, and the subroutine is ended. In this case, the ZOOM.TELE switch 304 or the ZOOM.WIDE switch 303 is used as an auto-zooming magnification change means. As a magnification, 1/70, 1/50, and 1/30 are available. When the ZOOM.TELE switch 304 is ON, the magnification is changed to the high-magnification side, and when the ZOOM.WIDE switch 303 is ON, the magnification is changed to the low-magnification side. When the control enters the portrait mode, and when the magnification is changed, a numeral "1", "2", or "3" representing 1/70, 1/50, or 1/30, respectively, is displayed on the shutter speed display sections of the intra-finder display LCD 271 (FIG. 4), and the LCD panel 322 or 281 (FIG. 5).

If it is determined in step B198 that the portrait mode is not selected, it is checked in step B206 if the power-focusing (PF) mode is selected. If it is determined that the PF mode is selected, a power-focusing drive request is issued in step B208. In the PF mode, when the ZOOM.TELE switch 304 is turned on, the focusing lens is contracted to an infinity ON direction, and when the ZOOM.WIDE switch 303 is turned on, the focusing lens is extended toward the closest end side. However, if it is determined that the PF mode is not selected, a power-zooming mode is set. Normally, the power-zooming mode is selected. When the power-zooming mode is selected, a power-zooming drive request is issued in step B210. In the power-zooming mode, a zooming operation is performed toward a TELE side or a WIDE side in accordance with the direction of the ON switch. After the power-focusing drive request is issued in step B208, and after the power-zooming drive request is issued in step B210, the subroutine is ended.

On the other hand, if it is determined in step B196 that the ZOOM.TELE switch 304 and the ZOOM.WIDE switch 303 are OFF, the flow jumps to step B224 (FIG. 7G).

In steps B214 to B246, processing when a switch is solely and continuously ON is executed.

In step B214, it is checked based on the mode change inhibit flag if the mode change operation is inhibited like in step B120. If it is determined that the mode change operation is inhibited, the subroutine is ended; otherwise, step B218 is executed.

In step B218, the ZOOM.TELE switch 304 and the ZOOM.WIDE switch 303 are checked. If it is determined that the switch 304 or 303 is ON, it is checked in step B220 if the portrait mode is selected. If it is determined that the switch 304 or 303 is ON, and the portrait mode is not selected, the flow jumps to step B206, and the above-mentioned processing is executed. On the other hand, if it is determined that the portrait mode is selected, the subroutine is ended.

If it is determined in step B218 that the ZOOM.TELE switch 304 or the ZOOM.WIDE switch 303 is OFF, step B224 is executed. In step B224, the ON/OFF state of the first release switch is checked. If it is determined that the first release switch is ON, a photometric calculation and a display are permitted in step B226, and a magnification display is inhibited. Then, the subroutine is ended.

If it is determined in step B224 that the first release switch is OFF, step B230 is executed. In step B230, the ON/OFF state of the MODE switch 308 is checked. If it is determined that the MODE switch 308 is ON, a photometric calculation and a display are inhibited in step B232, and the subroutine is ended.

If it is determined in step B230 that the MODE switch 308 is OFF, step B236 is executed. In step B236, the ON/OFF state of the +/− switch 309 is checked. If it is determined that the +/− switch 309 is ON, it is checked in step B238 if the manual mode is selected. If it is determined that the manual mode is not selected, a display switching flag is set to display a correction amount on the frame count display section of the LCD panel 322 or 281 for the purpose of setting an exposure correction amount. With this flag, in step A068 in the main routine (FIGS. 6A to 6D), a display is switched.

After the display switching flag is set, the subroutine is ended.

If it is determined in step B236 that the +/− 309 is OFF, step B244 is executed. In step B244, a subroutine for changing an f-number is executed. In the aperture priority mode (A mode) or the manual mode (M mode), an f-number is changed by ½ steps between an open f-number and a minimum aperture f-number. In this case, the SHIFT.UP switch 306, and the SHIFT.DOWN switch 307 are monitored. When the SHIFT.UP switch 306 is turned on, a stop-down operation is performed, and when the SHIFT.DOWN switch 307 is turned on, an opening operation is performed. When it is detected that the SHIFT.UP switch 306 or the SHIFT.DOWN switch 307 is changed from an OFF state to an ON state, data is updated, and when it is kept ON, data is updated first after an elapse of 0.5 sec, and is then updated every 0.3 sec. A time interval (0.5 sec or 0.3 sec) for updating data is measured by accumulating the 100-msec timer of the main routine. Upon completion of changing of the f-number, the subroutine is ended.

In step B248 and subsequent steps, processing when it is determined in step B108 that the number of ON switch is not 1 is executed, i.e., processing for multiple depression of switches is executed.

In step B248, it is checked based on the mode change inhibit flag if the mode change operation is inhibited like in steps B120 and B214. If it is determined that the mode change operation is inhibited, the subroutine is ended; otherwise, step B252 is executed.

It is checked in step B252 if the number of ON switches is 2. If it is determined that the number of ON switches is not 2, three or more switches are ON. If three or more switches are simultaneously ON, the ON/OFF state of the first release switch is checked in step B286. If it is determined that the first release switch is ON, a photometric calculation and a display are started in step B288, and a magnification display is inhibited. Then, the subroutine is ended. In this manner, when three or more switches are simultaneously ON, only the first release switch is accepted.

If it is determined that the number of ON switches is 2, the MODE switch 308, the +/− switch 309, the SHIFT.UP switch 306, and the SHIFT.DOWN switch 307 are accepted in addition to the first release switch.

In step B254, the ON/OFF state of the first release switch is checked. If it is determined that the first release switch is ON, a photometric calculation and a display are started in step B288, as described above, and the subroutine is ended.

If it is determined in step B254 that the first release switch is OFF, step B256 is executed. In step B256, the ON/OFF state of the MODE switch 308 is checked. If it is determined that the MODE switch 308 is ON, the ON/OFF state of the +/− switch 309 is checked in step B258. If it is determined that both the MODE switch 308 and the +/− switch 309 are ON, a battery check operation is performed in step B260, and mode reset operations are performed in step B262. The battery check operation is performed immediately before the drive operation of the motor is started. When a photographer wants to perform a battery check operation, he or she need only depress the MODE switch 308 and the +/− switch 309. In the mode reset operations, various modes are reset to home positions. However, in the FLASH mode, the AUTO mode and the AUTO-S mode have equivalent priority according to their use frequencies.

It is then checked in step B264 if the first photographing operation in the double-exposure mode is ended. If it is determined that the first photographing operation in the double-exposure mode is ended, a windup request, and a lens reset request are issued in step B266. The windup request is a request for winding up a film by one frame. The lens reset request is a request for setting the zooming lens at the WIDE end as a position upon power-ON. On the other hand, if it is determined that the first photographing operation in the double-exposure mode is not ended, only the lens reset request is issued in step B268. After execution of step B266 or B268, the subroutine is ended.

If it is determined in step B258 that the switch +/− 309 is OFF, an exposure mode change subroutine is executed in step B272. In the exposure mode change subroutine, the program auto mode (P mode), the aperture priority mode (A mode), and the manual mode (M mode) are scrolled in turn in accordance with operations of the MODE switch 308, the SHIFT.UP switch 306, and the SHIFT.DOWN switch 307. After execution of the exposure mode change subroutine, the mode/request code setting subroutine is ended.

If it is determined in step B256 that the MODE switch 308 is OFF, the ON/OFF state of the +/− switch is checked in step B276. If it is determined that the +/− switch 309 is OFF, i.e., if it is determined that both the MODE switch 308 and the +/− switch 309 are OFF, the subroutine is ended. However, if it is determined that the +/− switch 309 is ON, it is checked in step B278 if the exposure mode is the manual mode (M mode). If it is determined that the exposure mode is the manual mode, a shutter speed change subroutine is executed in step B280. In the shutter speed change subroutine, a shutter speed is changed by ½ steps between maximum and minimum speeds (sec), and a bulb exposure mode is selected next to the minimum speed. On the other hand, if it is determined in step B278 that the exposure mode is a mode other than the manual mode, an exposure correction value change subroutine is executed in step B282. In the exposure correction value change subroutine, an exposure correction value is changed by about ⅓ steps between −4 EV to +4 EV. In the shutter speed change subroutine in step B280 and the exposure correction value change subroutine in step B282, an operation is performed by the +/− switch 309, the SHIFT.UP switch 306, and the SHIFT.DOWN switch 307.

In the exposure mode change subroutine in step B272, the shutter speed change subroutine in step B280, and the exposure correction value change subroutine in step B282, when it is detected that the SHIFT.UP switch 306 or the SHIFT.DOWN switch 307 is changed from an OFF state to an ON state, data is updated like in the f-number change subroutine in step B244, and when the switch is kept ON, the data is sequentially updated first after an elapse of 0.5 sec, and is then updated every 0.3 sec. In this case, a time interval (0.5 sec or 0.3 sec) for updating data is also measured by accumulating the 100-msec timer of the main routine like in the f-number change subroutine in step B244.

The APEX calculation subroutine in step A064 in the main routine (FIGS. 6A to 6D) will be described in detail below with reference to FIGS. 8 to 13.

In this subroutine, as described above, an f-number, a shutter speed, a G-number of the flash device, and the like are determined on the basis of luminance data of an object calculated in step A058 in FIGS. 6A to 6D, data set in step A050, and data of the built-in and external flash devices.

The APEX calculation can be attained by simple additions/subtractions by compressing each exposure parameter to a logarithmic value having 2 as a base. In this case, an exposure value EV can be expressed as:

$$EV = BV + SV = VT + AV \quad (2)$$

where BV is an APEX value representing the luminance obtained based on light reflected by an object, and is calculated in the photometric subroutine in step A058 in the main routine (FIGS. 6A to 6D). SV is an APEX value representing the sensitivity of a film and is input from a DX code printed on the side surface of a patrone. TV is an APEX value representing the shutter speed, and AV is an APEX value representing the f-number.

As described above, the camera apparatus of this embodiment comprises the spot photometric sensor commonly used as the AF sensor 291, and the photometric two-split photodiode 273 arranged to have a concentric pattern as photometric sensors, and in the spot photometric mode, a spot photometric value (BVSPOT) is calculated. When the spot photometric mode is not selected, luminance data BVB of a principal object is obtained based on a photometric value of an inner portion of the photometric two-split photodiode 273, luminance data BVC of a background portion is obtained based on a photometric value of an outer portion of the photometric two-split photodiode 273, and overall luminance data BVAVE is obtained based on an average value of the two photometric values. An estimated photometric value BVESP is calculated according to the absolute values of BVB and BVC, the difference between BVB and BVC, and distance data to the principal object.

Figure 8:
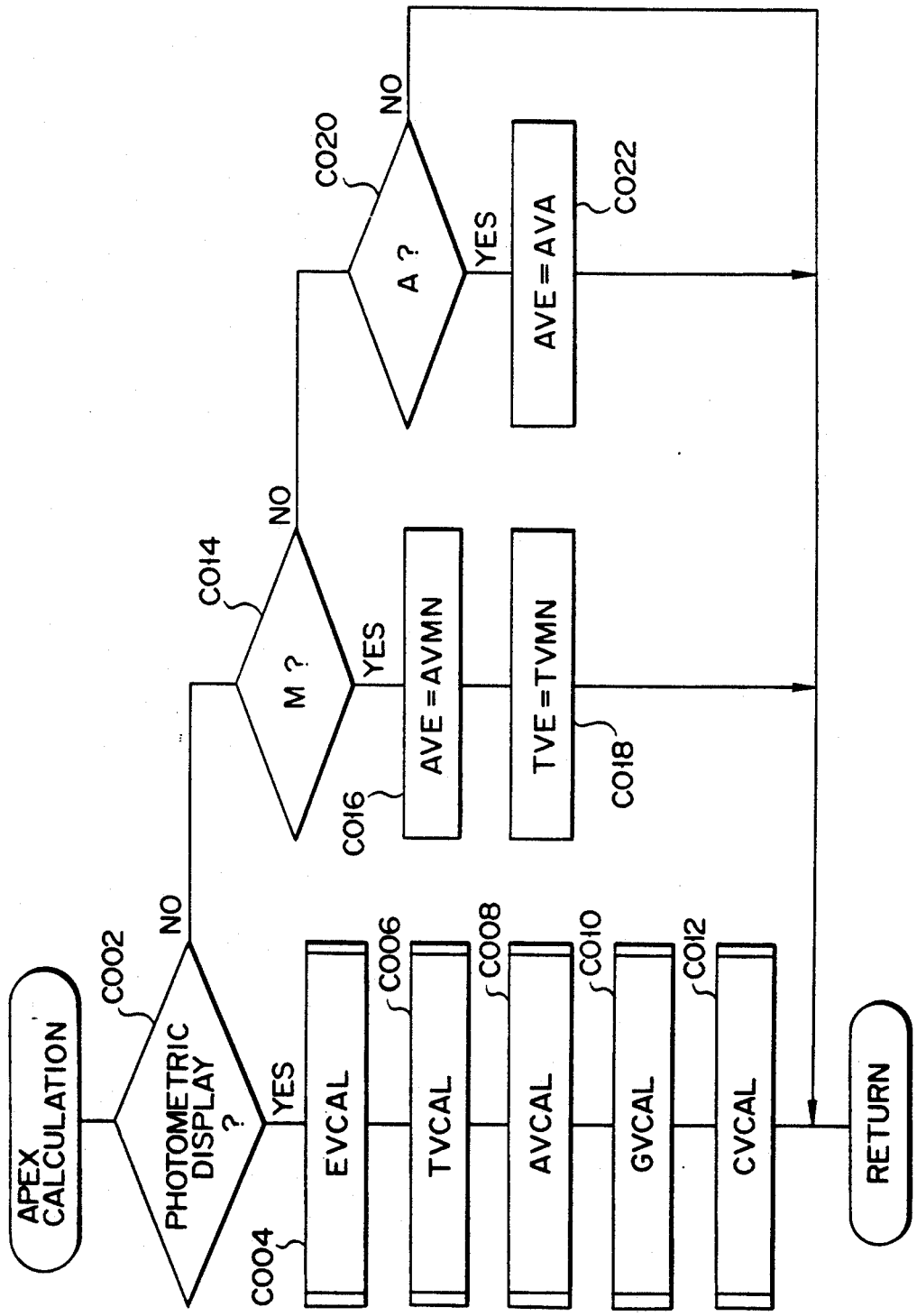
FIG. 8 is a flow chart for explaining an APEX calculation subroutine shown in FIGS. 6A to 6D.

FIG. 8 is a flow chart showing the APEX calculation subroutine.

In step C002, it is checked if the start of the photometric calculation and display is permitted. Note that the start of the photometric calculation and display is permitted in step B136 (FIG. 7E), step B226 (FIG. 7G), and step B288 in the mode/request code setting subroutine in step A050 in the main routine (FIGS. 6A to 6D). The start of the photometric calculation and display is permitted in step B136 when it is determined that the SPOT switch 310 is ON (see step B130 in FIG. 7E). The start of the photometric calculation and display is permitted in steps B226 and B288 when it is determined that the first release switch is ON under a given condition.

If it is determined in step C002 that the start of the photometric calculation and display is permitted, an EVCAL subroutine, a TVCAL subroutine, an AVCAL subroutine, a GVCAL subroutine, and a CVCAL subroutine are sequentially executed, as will be described later, and the flow then returns to the main routine. Note that the EVCAL subroutine is a subroutine for determining an exposure value, the TVCAL subroutine is a subroutine for determining a shutter speed, the AFCAL subroutine is a subroutine for determining an f-number, the GVCAL subroutine is a subroutine for determining a G number of the flash device, and the CVCAL subroutine is a subroutine for calculating an offset amount from a proper exposure value, as will be described in detail later.

If it is determined in step C002 that the start of the photometric calculation and display is not permitted, it is then checked in step C014 if the exposure mode is the manual mode (M mode). If it is determined that the exposure mode is the manual mode, a setup value (AVMN) is adopted as an f-number (AV), and is set in AVE in an exposure data area in step C016. In step C018, a setup value (TVMN) is adopted as a shutter speed (TV), and is set in TVE in the exposure data area. Thereafter, the flow returns to the main routine.

If it is determined in step C014 that the exposure mode is not the manual mode, it is checked in step C020 if the exposure mode is the aperture priority mode (A mode). If it is determined that the exposure mode is the aperture priority mode, a setup value (AVA) is adopted as an f-number (AV), and is set in AVE in an exposure data area in step C022. Thereafter, the flow returns to the main routine. On the other hand, if it is determined that the exposure mode is not the aperture priority mode, the flow directly returns to the main routine.

The EVCAL subroutine in step C004 in FIG. 8 will be described in detail below with reference to FIG. 9. FIG. 9 is a flow chart showing the EVCAL subroutine.

In step C102, it is checked if the SPOT photometric mode is selected. If it is determined that the SPOT photometric mode is selected, BVSPOT is substituted in BV in step C104. More specifically, a spot photometric value BVSPOT is adopted as luminance data BV.

In step C106, EV=BV+SV is calculated. The sensitivity SV of a film is input from a DX code printed on the side surface of a patrone, as described above.

In step C108, it is checked if the exposure mode is the manual mode (M mode). If it is determined that the exposure mode is a mode other than the manual mode, an exposure correction amount (CVSET) set by a user is subtracted from an exposure value EV obtained in step C106 (step C110).

If it is determined in step C102 that the SPOT photometric mode is not selected, it is checked in step C112 if the exposure mode is the program auto mode (P mode). If it is determined that the program auto mode is selected, it is then checked in step C114 if the night-view mode is selected.

If it is determined that the night-view mode is not selected, BVESP is substituted in BV in step C116. That is, the estimated photometric value BVESP is adopted as luminance data BV. Thereafter, the above-mentioned processing in step C106 and subsequent steps is executed.

If it is determined in step C114 that the night-view mode is selected, BVAVE+1 is substituted in BV in step C118. That is, a value obtained by adding "1" to the average value BVAVE of the photometric values BVB and BVC of the inner and outer portions of the photometric two-split photodiode 273 is adopted as luminance data BV. In this case, "1" is added to prevent a photograph from becoming brighter than a visually observed view by shifting the value of luminance data BV to a value larger than an actual luminance. Thereafter, the above-mentioned processing in step C106 and subsequent steps is executed.

On the other hand, if it is determined in step C112 that the program auto mode is not selected, BVAVE is substituted in BV in step C120. That is, the above-mentioned BVAVE is adopted as luminance data BV.

Thereafter, the above-mentioned processing in step C106 and subsequent steps is executed.

The TVCAL subroutine in step C006 in FIG. 8 will be described in detail below. The TVCAL subroutine is a subroutine for determining a shutter speed (TV), as described above.

Figure 10A:
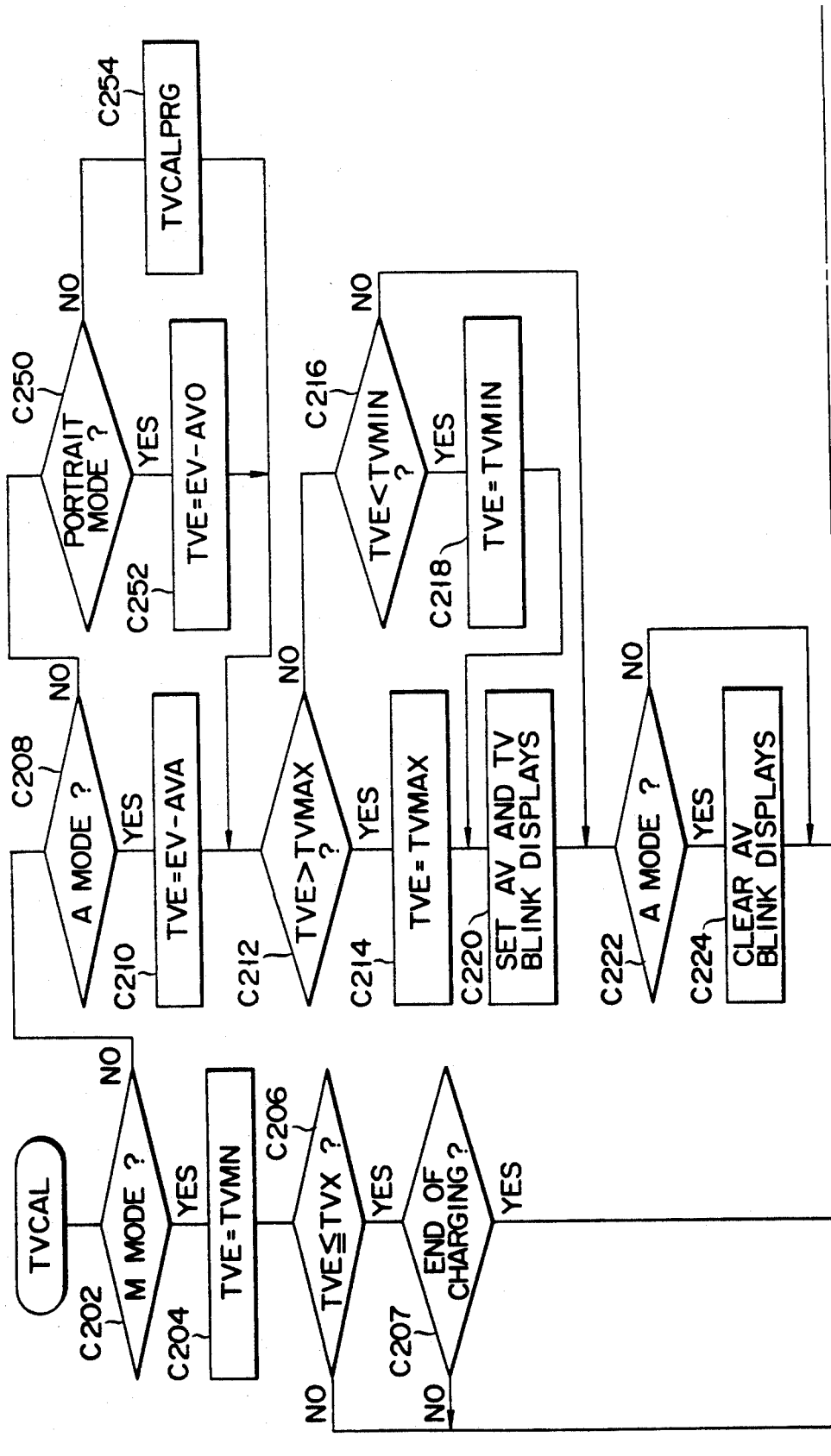
FIGS. 10A and 10B are flow charts for explaining a TVCAL subroutine shown in FIG. 8.
Figure 10B:
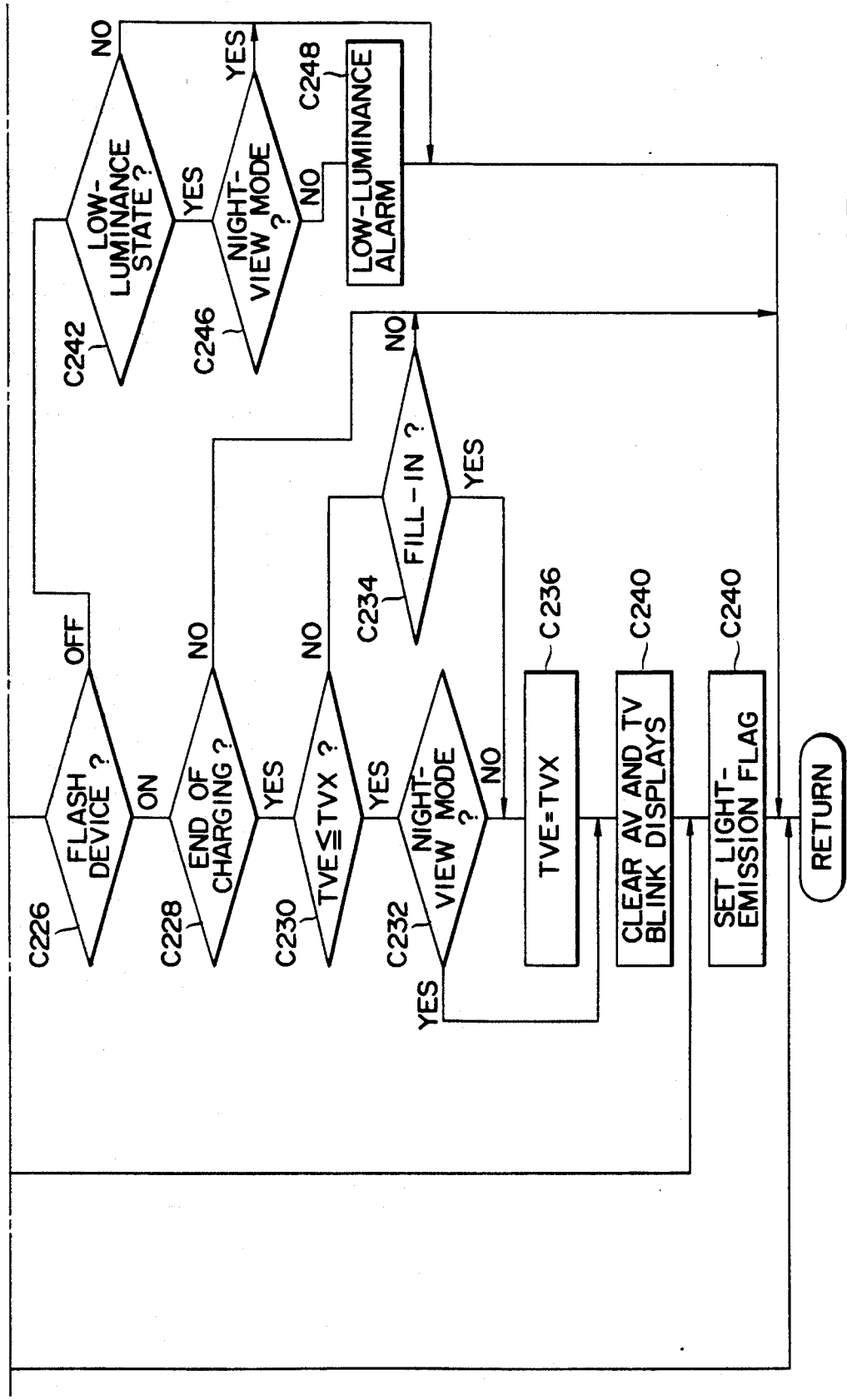

FIGS. 10A and 10B are flow charts showing the TVCAL subroutine.

In step C202, it is checked if the exposure mode is the manual mode (M mode). If it is determined that the exposure mode is the manual mode, TVMN is set in TVE as a TV storage area of the exposure data area in step C204. More specifically, a setup value (TVMN) is adopted as a shutter speed TV. In step C206, TVE is compared with a flash synchronizing time (TVX). IF TVE TVX, it is checked in step C207 if the charging operation of the flash device is ended. If TVE≦TVX, and the charging operation of the flash device is completed, a light-emission flag of the flash device is set in step C240. In step A076 in the main routine (FIGS. 6A to 6D), whether or not light emission of the flash device is performed is determined based on this flag.

If it is determined in step C202 that the exposure mode is not the manual mode, a shutter speed TV is calculated according to the selected mode, and is set in TVE.

It is checked in step C208 if the exposure mode is the aperture priority mode (A mode). If it is determined that the exposure mode is the aperture priority mode, a shutter speed TV is calculated using equation (2) in step C210. More specifically, a value obtained by subtracting a setup f-number AVA from the exposure value EV obtained in the EVCAL subroutine is set in TVE.

If it is determined in step C208 that the exposure mode is not the aperture priority mode, it is checked in step C250 if the portrait mode is selected. If it is determined that the portrait mode is selected, a value obtained by subtracting an open f-number AVO from the exposure value EV obtained in the EVCAL subroutine is set in TVE in step C252 so as to decrease a depth of field.

If it is determined in step C250 that the portrait mode is not selected, a TVCALPRG subroutine is executed. The TVCALPRG subroutine is a subroutine for obtaining a shutter speed TV according to a predetermined program chart, and setting it in TVE.

After TVE is set, TVE is compared with a maximum allowable value TVMAX in step C212. If TVE>TVMAX, TVE is replaced with TVMAX in step C214. If TVE≦TVMAX, TVE is compared with a minimum allowable value TVMIN in step C216. If TVE<TVMIN, TVE is replaced with TVMIN in step C218. If TVE is replaced with TVMAX in step C214, and if TVE is replaced with TVMIN in step C218, flags for blinking shutter speed and f-number displays are set in step C220. When these flags are set, the shutter speed and f-number display sections of the LCD panel 322 or 281, and the intra-finder display LCD 271 are caused to blink in step A068 in the main routine (FIGS. 6A to 6D), thus alarming to a photographer that the shutter speed falls outside a synchronous range. In this case, it is checked in step C222 if the exposure mode is the aperture priority mode (A-mode), and if the aperture priority mode is selected, the flag for blinking the f-number display is reset in step C224.

It is then checked in step C226 if the flash device is ON. If it is determined that the flash device is ON, it is then checked if the charging operation is completed. If it is determined that the charging operation is not completed, the subroutine is ended. On the other hand, if it is determined that the flash device is ON, and the charging operation is completed, a flash synchronizing time TVX is compared with TVE in step C230. If TVE≦TVX, and it is determined in step C232 that the night-view mode is not selected, and if TVE>TVX, and if it is determined in step C234 that the flash FILL-IN mode is selected, TVE is replaced with TVX. If it is determined that the FILL-IN mode is not selected, the subroutine is ended. If TVE≦TVX, and if TVE>TVX, and it is determined that the flash FILL-IN mode is selected, the flags for blinking the shutter speed and f-number displays are reset in step C238, and the flash light-emission flag is set in step C240 Thereafter, the subroutine is ended.

If it is determined in step C226 that the flash device is OFF, it is checked in step C242 if TVE is equal to or lower than a predetermined shutter speed TV, i.e., a luminance is low. If it is determined that TVE is equal to or lower than the predetermined shutter speed TV, it is checked in step C246 if the night-view mode is selected. If it is determined in step C242 that the luminance is low, and if it is determined that the night-view mode is not selected, a low-luminance alarm display for urging a user to use the flash device is made on the intra-finder display LCD 271. The predetermined shutter speed changes depending on the focal length of the lens, and is a shutter speed at which the flash device is preferably used in consideration of camera shake.

The AVCAL subroutine in step C008 in FIG. 8 will be described in detail below. The AVCAL subroutine is a subroutine for determining an f-number (AV), as described above.

Figure 11:
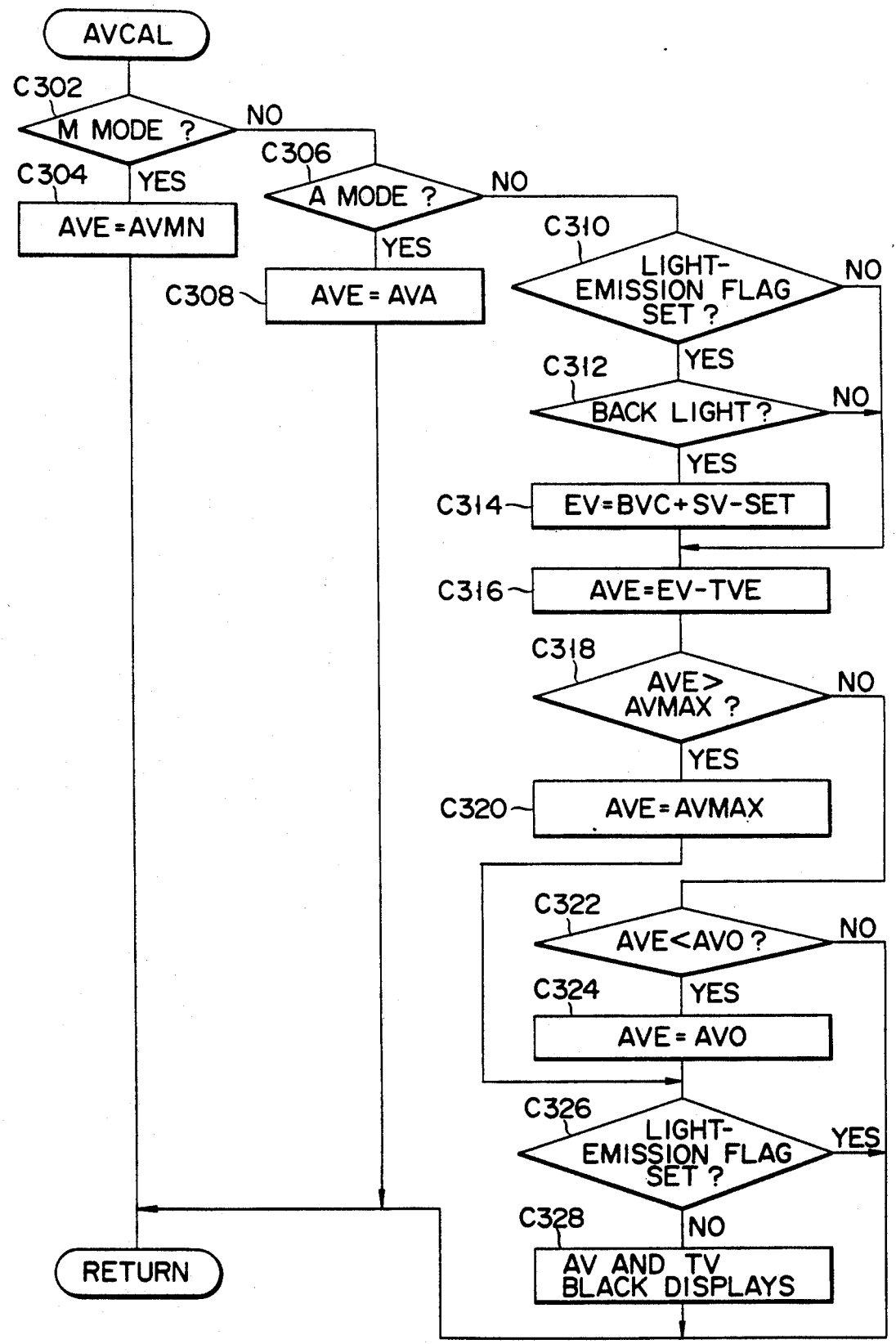
FIG. 11 is a flow chart for explaining an AVCAL subroutine shown in FIG. 8.

FIG. 11 is a flow chart showing the AVCAL subroutine.

It is checked in step C302 if the exposure mode is the manual mode (M mode). If it is determined that the manual mode is selected, AVMN is set in AVE as an AV storage area of the exposure data area in step C304. That is, a setup value (AVMN) is adopted as an f-number AV.

If it is determined in step C302 that the manual mode is not selected, it is checked in step C306 if the exposure mode is the aperture priority mode (A-mode). If it is determined that the aperture priority mode is selected, AVA is set in AVE as the AV storage area of the exposure data area. That is, a setup value (AVA) in the aperture priority mode is adopted as the f-number AV.

In other modes, AVE is calculated by the following equation (step C316):

$$AVE = EV - TVE$$

If it is determined that the light-emission flag is set (step C310), and a back-light state is determined (step C312) EV is recalculated in step C314 before execution of the above-mentioned calculation. The back-light state can be determined in the photometric subroutine in step A058 in the main routine (FIGS. 6A to 6D). If the luminance (BVB) of a principal object is lower than the luminance (BVC) of a background by −1 step or more, a back-light flag is set. In step C312, the back-light state is checked by reading the value of the back-light flag. The exposure value EV is recalculated by:

$$EV = BVC + SV - CVSET$$

where CVSET is the exposure correction value set by a photographer, as described above. The exposure value EV is recalculated to properly expose a background portion in a back-light daylight synchro operation.

After AVE is calculated in step C316, AVE is compared with a maximum allowable value AVMAX in step C318. If AVE>AVMAX, AVE is replaced with AVMAX in step C320. If AVE≦AVMAX, AVE is compared with the open f-number AVO in step C322. If AVE>AVO, AVE is replaced with AVO in step C324. If AVE is replaced with AVMAX in step C320, and if AVE is replaced with AVO in step C324, it is checked again in step C326 if the light-emission flag is set. If it is determined that the flag is not set, the flags for blinking the shutter speed and f-number displays are set in step C328. As described above, when these flags are set, the shutter speed and f-number display sections of the LCD panel 322 or 281, and the intra-finder display LCD 271 are caused to blink in step A068 in the main routine (FIGS. 6A to 6 D), thus alarming to a photographer that the aperture falls outside a synchronous range.

The GVCAL subroutine in step C010 in FIG. 8 will be described in detail below. The GVCAL subroutine is a subroutine for determining an APEX value GV representing the G number of the flash device, as described above.

Figure 12:
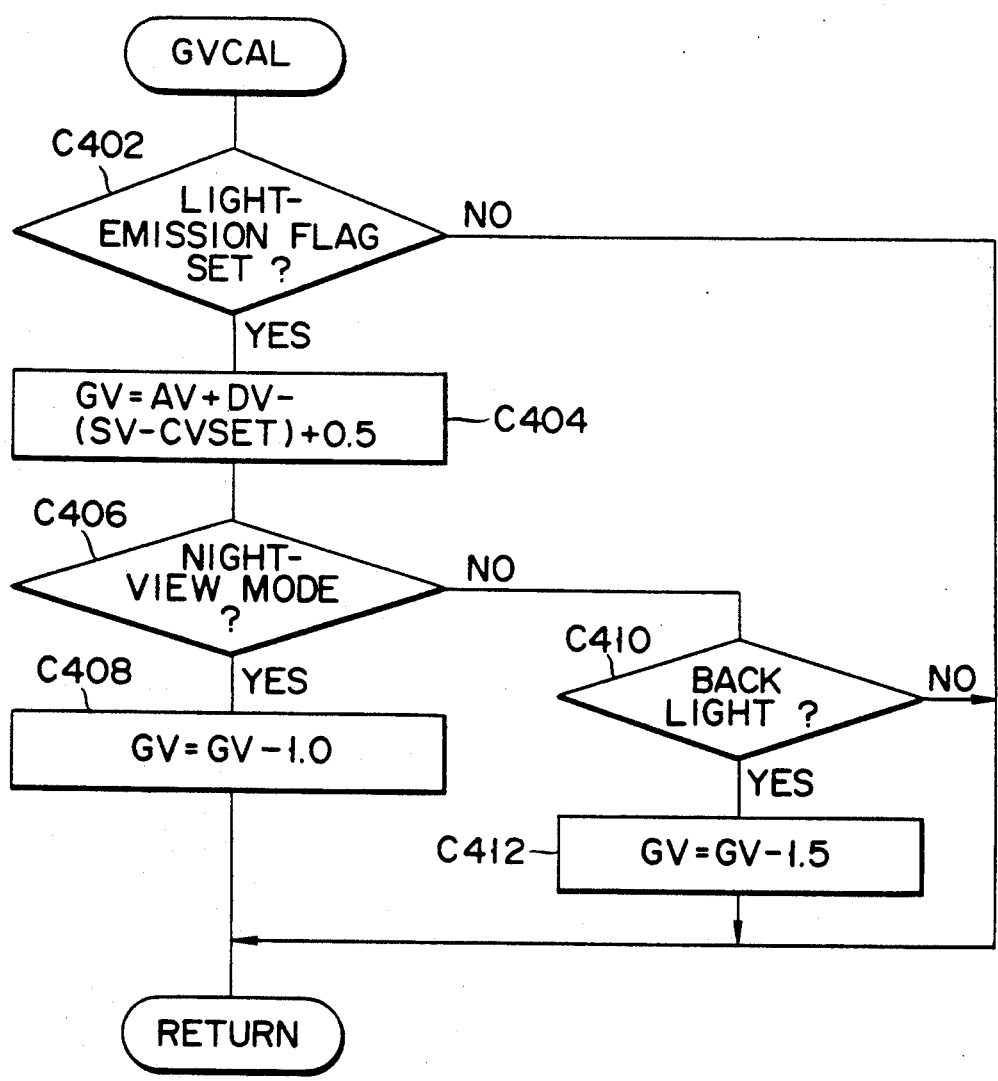
FIG. 12 is a flow chart for explaining a GVCAL subroutine shown in FIG. 8.

FIG. 12 is a flow chart showing the GVCAL subroutine.

It is checked in step C402 if the light-emission flag is set. If it is determined that the flag is set, a calculation in step C404 is made. This calculation is given by:

$$GV = AV + DV - (SV - CVSET) + 0.5$$

where AV is an APEX value representing the f-number calculated in the AVCAL subroutine, DV is the distance data to an object, SV is the film sensitivity, and CVSET is the exposure correction value set by a photographer. Note that DV is calculated in step A052 in the main routine (FIGS. 6A to 6D). "0.5" is added to make a uniform correction for obtaining a good photograph.

It is checked in step C406 if the night-view mode is selected. If it is determined that the night-view mode is selected, "−1" is subtracted from GV calculated in step C404 (step C408). On the other hand, if it is determined that the night-view mode is not selected, a back-light state is checked in step C410 in the same manner as in step C312 (FIG. 11). If a back-light state is determined, "−1.5" is further subtracted from GV calculated in step C404 (step C412). In this manner, since GV calculated in step C404 is corrected by "−1 step" in the night-view mode or by "−1.5 step" in the back-light state, a background portion can be optimized, thus obtaining a good photograph of a night view or in a back-light state.

The CVCAL subroutine in step C012 in FIG. 8 will be described in detail below. The CVCAL subroutine is a subroutine for determining an offset amount (CV) from a proper exposure value, as described above.

Figure 13:
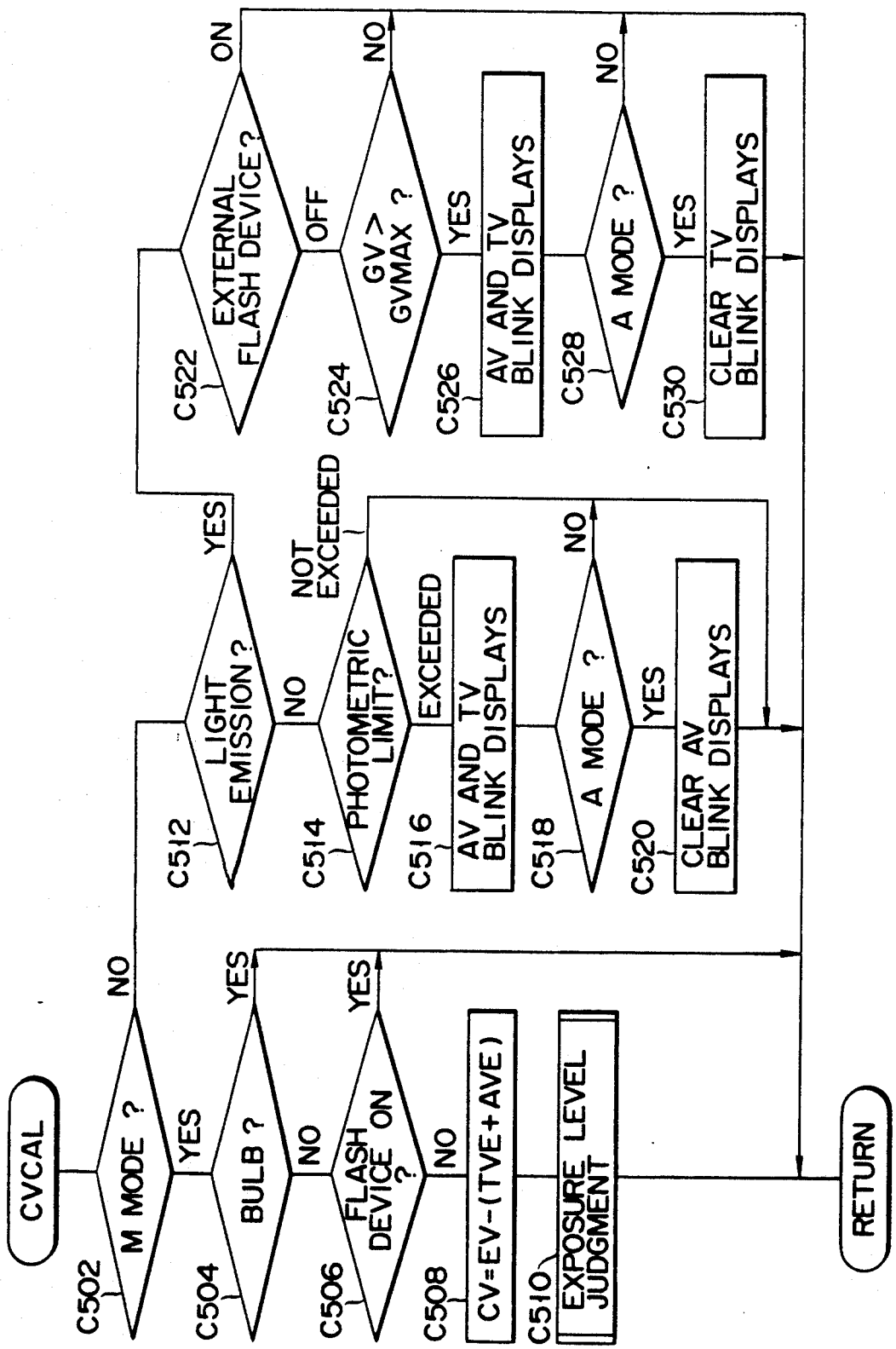
FIG. 13 is a flow chart for explaining a CVCAL subroutine shown in FIG. 8.

FIG. 13 is a flow chart showing the CVCAL subroutine.

It is checked in step C502 if the exposure mode is the manual mode (M mode). If it is determined that the manual mode is selected, it is checked in step C504 if a bulb photographing operation is selected. If it is determined that the bulb photographing operation is not selected, the ON/OFF state of the flash device is checked. If it is determined that the exposure mode is the manual mode, the bulb photographing mode is not selected, and the flash device is not ON, an offset amount CV from the proper exposure value is calculated by the following equation using the shutter speed TV and the f-number AV (step C508):

$$CV = EV - (TVE + AVE)$$

In step C510, an exposure level judgment subroutine is executed to make a judgment for displaying the offset amount from the proper exposure value in step A068 in the main routine (FIGS. 6A to 6D). The display of the offset amount from the proper exposure value is made by commonly using a +/− display of the exposure correction value which can be made in modes other than the manual mode. More specifically, "−" is turned on and off when the offset amount is below −1.5 step, "−" is turned on when the offset amount is between −1.5 step and −0.5 step, both "+" and "−" are turned on when the offset amount is between −0.5 step and +0.5 step. "+" is turned on when the offset amount is between +0.5 step and +1.5 step, and "+" is turned on and off when the offset amount is beyond +1.5 step. Furthermore, when the luminance is below a photometric limit luminance, both "+" and "−" are turned on and off.

If it is determined in step C502 that the manual mode is not selected, it is checked in step C512 if the light-emission flag is set. If it is determined that the flag is not set, i.e., if the flash device is not used, it is checked in step C514 whether or not the luminance exceeds a photometric limit luminance. If it is determined that the luminance exceeds the limit luminance, the flags for blinking the shutter speed and f-number displays are set in step C516. As described above, when these flags are set, the shutter speed and f-number display sections of the LCD panel 322 or 281, and the intra-finder display LCD 271 are caused to blink in step A068 in the main routine (FIGS. 6A to 6D), thus alarming to a photographer that the luminance falls outside a photometric synchronous range. In this case, it is checked in step C518 if the exposure mode is the aperture priority mode (A mode). If it is determined that the aperture priority mode is selected, the flag for blinking the f-number display is reset in step C520.

If it is determined in step C512 that the light-emission flag is set, the ON/OFF state of the external flash device is checked in step C522. If it is determined that the external flash device is ON, it is checked in step C524 if the G number (GV) calculated in the GVCAL subroutine is an emission enable value. If it is determined that the calculated G number is not an emission enable value, the flags for blinking the shutter speed and f-number displays are set in step C526. Thus, an alarm for a photographer is made. In this case it is further checked in step C528 if the exposure mode is the aperture priority mode (A mode). If it is determined that the aperture priority mode is selected, the flag for blinking the shutter speed display is reset in step C530.

The APEX calculation described above is executed once about 100 msec in the main routine. Therefore, the shutter speed TV, the f-number AV, and the like are updated every 100 msec, and display contents on the LCD panel 322 or 281, and the intra-finder display LCD 271 are updated accordingly. As described above, since the program is executed according to the normal main routine even during an operation of the self timer, exposure data can be updated every 100 msec even when the self timer is operating. In this embodiment, a photometric value obtained in step A058 in the main routine (FIGS. 6A to 6D) is locked when the self timer is started, thereby inhibiting the drive operation of the focusing lens. Therefore, at this time, the distance data DV to an object is also locked. However, since charging control of the built-in flash device in steps A060 and A070 in the main routine (FIGS. 6A to 6D), and a data communication of the external flash device in steps A062 and A066 are continued, when these data are changed, a result of the APEX calculation is also changed. For example, when the charging operation of the flash device is completed during an operation of the self timer, the shutter speed TV and the f-number AV are automatically changed to data suitable for a flash photographing operation, and an exposure operation is performed according to the changed data. Contrary to this, when the flash device is turned off during the operation of the self timer, proper exposure without the flash device is performed.

The AF control subroutine shown in step A152 in the main routine (FIGS. 6A to 6D) will be described below with reference to FIGS. 14A-I to 14C.

In this subroutine, as described above, as described above, an AF distance measurement calculation, a lens drive operation for focusing, and in-focus/focusing disable judgment are performed.

In step D002, it is checked if the self timer is being operated. If it is determined that the self timer is being operated, the subroutine is ended without any processing.

If it is determined that the self timer is not operated, it is checked in step D004 if the power-focusing (PF) mode is selected. If it is determined that the PF mode is selected, AF auxiliary light (the auxiliary-light LED 212) is turned off in step D006, and all the AF control flags are reset in step D008. Thereafter, only a distance measurement subroutine is executed (step D010). In this distance measurement subroutine, control of the AF sensor 291, a calculation of a defocus amount based on sensor data, and a calculation of a drive amount of the focusing lens based on the calculated defocus amount are performed. In addition, the luminance of an object is also calculated based on a spot photometric operation in this subroutine.

If it is determined in step D004 that the PF mode is not selected, the first release switch is monitored in step D014. If it is determined that the first release switch is OFF, the AF control flags are reset in step D016. However, if it is determined that the first release switch is ON, it is checked in step D018 if the night-view mode is selected. If it is determined that the night-view mode is not selected, it is checked in step D020 if the portrait mode is selected. If it is determined in step D018 that the night-view mode is selected, and if it is determined in step D020 that the portrait mode is selected, it is checked in step D022 if the focusing lens is reset to the infinity position. If it is determined that the focusing lens is not reset to the infinity position, the focusing lens is reset to the infinity position as an initial state (step D024), and an infinity reset flag is set (step D026). The reason why the focusing lens is reset to the infinity position in the night-view mode is to permit exposure at the infinity position when AF (auto-focusing) is impossible The reason why the focusing lens is reset to the infinity position in the portrait mode is to improve precision of distance data in an auto-zooming calculation.

If it is determined in step D020 that the portrait mode is not selected, it is checked in step D028 if the drive mode is a single mode or a continuous mode. In the camera apparatus of this embodiment, the drive mode and the AF mode are interlocked. More specifically, in the single mode, an AF operation is performed only once, and after an in-focus state is established, AF control is locked until the first release switch is turned off. In the continuous mode, AF control is also set in a continuous mode, and an AF operation is repeated while the first release switch is kept ON. As a result, continuous photographs of a moving object can be easily taken.

If it is determined that the continuous mode is selected, the flow jumps to step D118.

If it is determined that the single mode is selected, it is checked in step D030 if the AF operation is completed once. If it is determined that the AF operation is completed once, the subroutine is ended since no processing continues.

However, if it is determined that the AF operation is not completed, the value of an auxiliary light flag as a flag indicating that AF auxiliary light (the auxiliary-light LED 212 is ON is checked in step D034. If it is determined that the auxiliary light flag is set, an auxiliary light ON command is transmitted to the IFIC 210 in step D036, thereby turning on the auxiliary-light LED 212. The AF auxiliary light is utilized to shorten an integration time when an object has a low luminance, and the AF sensor 291 requires a long integration time of a light amount.

In steps D038 to D044, a lens scan operation is performed.

It is checked in step D038 if a scan request is issued. If it is determined that the scan request is issued, a lens scan operation is performed in step D040, a scan request flag is cleared (step D042), and a scan end flag is set (step D044).

In step D046, the same distance measurement subroutine as in step D010 is executed.

It is checked in step D048 if the AF sensor 291 is executing an integration. As described above, since the AF sensor 291 requires a long integration time, in particular, in a low-luminance state, if it is determined that the AF sensor 291 is executing an integration, the flow returns to the main routine (FIGS. 6A to 6D).

On the other hand, if it is determined that the AF sensor 291 is not executing an integration, AF auxiliary light OFF processing upon completion of the integration is performed via the IFIC 210 in step D052.

Furthermore, the ON/OFF state of the first release switch is checked in step D054. If it is determined that the first release switch is OFF, the flow returns to the main routine after distance measurement processing is executed.

If it is determined in step D054 that the first release switch is ON, the state of the auxiliary light flag (step D034) is checked in step D056. If it is determined that the auxiliary light flag is set, it is checked in step D058 if focusing is disabled. A focusing disable flag is set in the distance measurement subroutine when focusing cannot be performed due to a low luminance, or when focusing cannot be performed since an object has a low contrast.

If it is determined that the focusing disable flag is set, it is checked in step D076 if the night-view mode is selected. If it is determined that the night-view mode is selected, it is then checked in step D078 if the focusing lens is reset to the infinity position. If it is determined that the focusing lens is reset to the infinity position, the auxiliary light flag is checked in step D080 to check if the luminance is low. If it is determined that the luminance is low, an in-focus flag is set in step D082. In this manner, in the night-view mode, even when focusing is impossible, if the focusing lens is reset to the infinity position, and the luminance is low, exposure is permitted. When the in-focus flag is set, an in-focus display is made on the intra-finder display LCD 271 in step A068 in the main routine (FIGS. 6A to 6D).

If it is determined in step D076 if the night-view mode is not selected, the auxiliary light flag is reset (step D106), and if the lens scan operation is not completed, the lens scan request flag is set (step D108). When this lens scan request flag is set, the lens scan operation is performed in step D040 when the AF control subroutine is executed next time.

If it is determined in step D058 that focusing is not disabled, it is checked in step D060 if an in-focus state is attained. If it is determined that the in-focus state is attained, it is checked in step D062 if the portrait mode is selected. The portrait mode is a mode having an auto-zooming function. The auto-zooming mode is a mode for setting a given photographing magnification of an object, and a zooming operation is performed once after an in-focus state is attained. If it is determined in step D064 if the auto-zooming operation is not completed (i.e., an auto-zooming end flag is not set), an auto-zooming subroutine is executed in step D066 to perform a zooming operation. In the auto-zooming subroutine, a zooming operation is performed to a lens focal distance obtained by (object distance)×(magnification). Upon completion of the auto-zooming operation, the auto-zooming end flag is set in step D068. After the auto-zooming operation, an AF operation is performed again when the AF control subroutine is executed next time, thereby correcting a moved focal point caused by the zooming operation.

If it is determined in step D062 if the portrait mode is not selected, and if it is determined in step D064 that the auto-zooming operation is completed, a single AF end flag is set in step D072, and the flow returns to the main routine. When this flag is set, since processing in step D034 and subsequent steps is not executed in the single mode until the first release switch is turned off, AF control is locked.

Figure 14C:
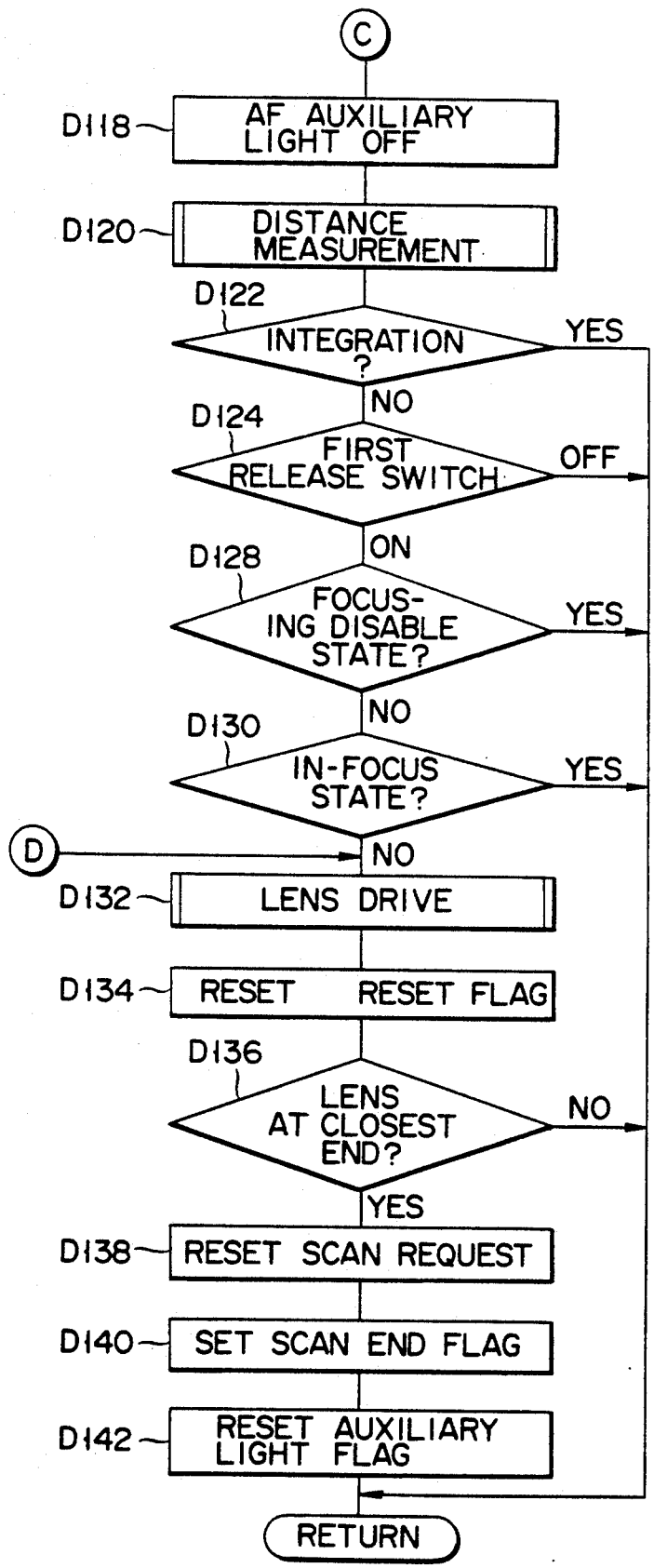
Figure 15A:
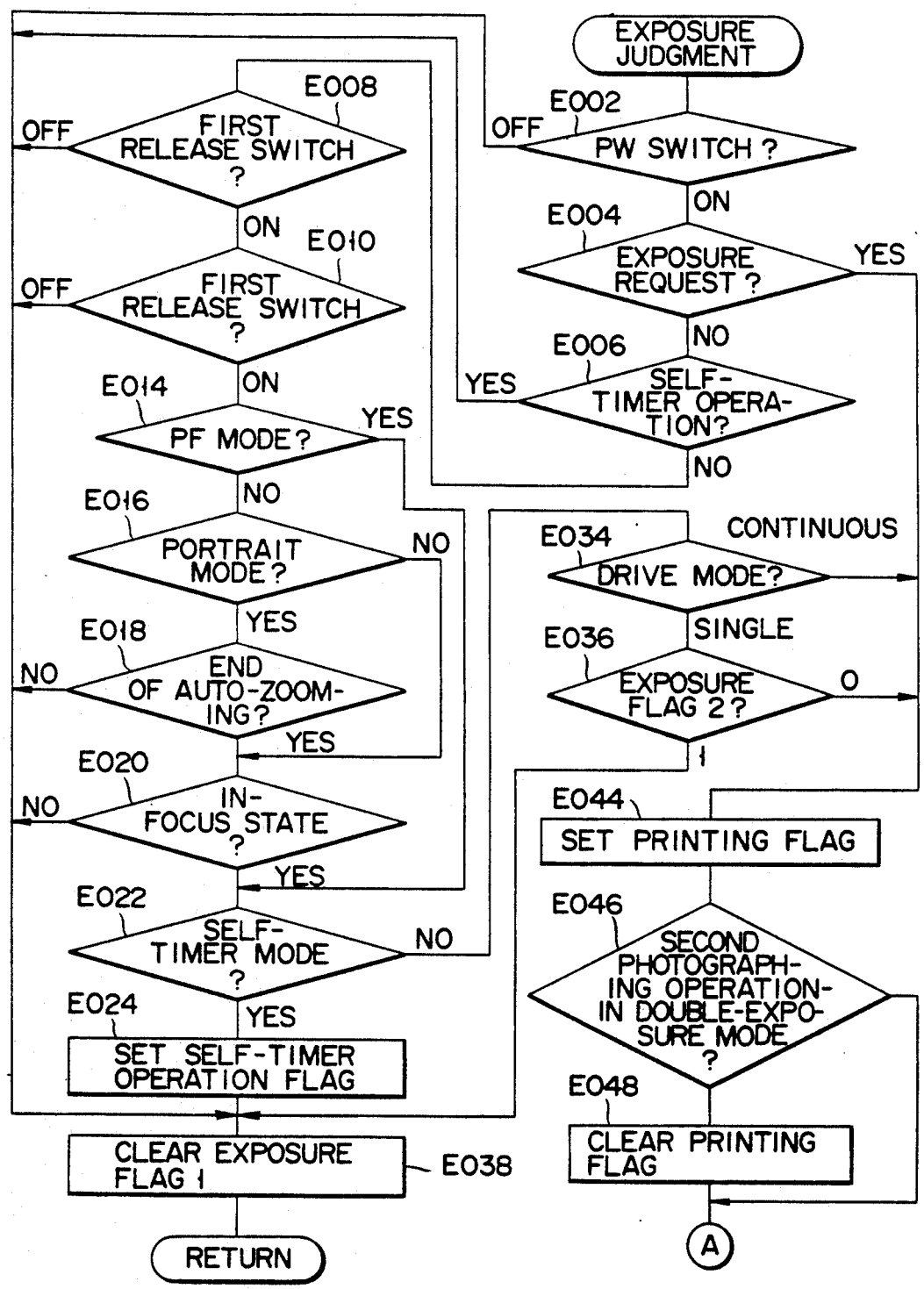
FIGS. 15A and 15B are flow charts for explaining an exposure judgment/exposure subroutine shown in FIGS. 6A to 6D.
Figure 15B:
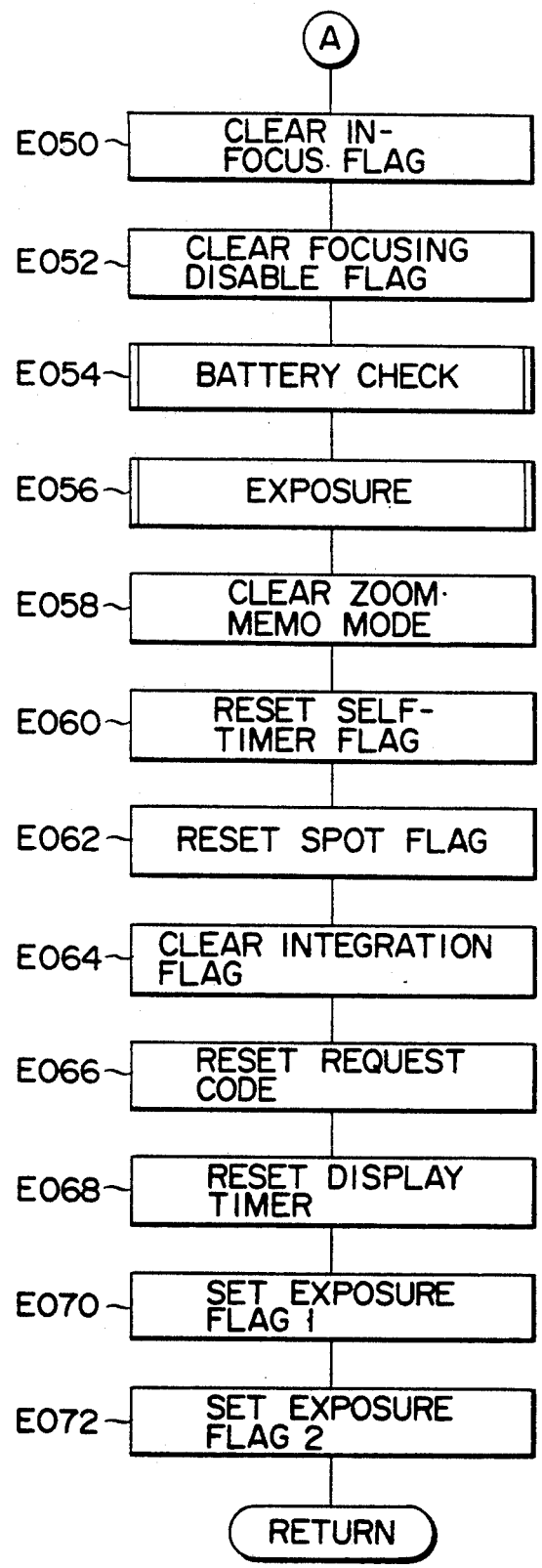

If it is determined in step D060 that an in-focus state is not established, the flow jumps to step D132 (FIG. 14C).

If it is determined in step D056 that the auxiliary light flag is not set, the presence/absence of an auxiliary light ON request is checked based on the auxiliary light ON request flag in step D086. If it is determined that no request is set, the flow jumps to step D058. On the other hand, if it is determined that the request is set, the auxiliary light flag is set (step D088), and the auxiliary light request flag is cleared (step D090). Note that the auxiliary light request flag is set in the distance measurement subroutine when an integration time of the sensor is longer than a predetermined value. Thereafter, it is checked in step D094 if the night-view mode is selected. If it is determined that the night-view mode is selected, it is checked in step D098 if a lens scan request flag is set. If it is determined that the flag is set, the auxiliary light flag is reset (step D100), and it is then checked in step D102 if focusing is disabled. If it is determined that focusing is disabled, the subroutine is ended; otherwise, the flow jumps to step D110. If it is determined in step D094 that the night-view mode is not selected, it is checked in step D096 if focusing is disabled. If it is determined that focusing is disabled, the flow jumps to step D110; otherwise, the flow jumps to step D060.

In step D118 and subsequent steps, processing when it is determined in step D028 that the continuous mode is selected is executed.

In step D118, the AF auxiliary light (the auxiliary-light LED 212) is turned off, and in step D120, the distance measurement subroutine is executed.

It is then checked in step D122 if the AF sensor 291 is executing an integration. If it is determined that the AF sensor 291 is executing an integration, the subroutine is ended. On the other hand, if it is determined that the AF sensor 291 does not execute an integration, the ON/OFF state of the first release switch is checked in step D124. If it is determined that the first release switch is OFF, the subroutine is ended. On the other hand, if it is determined that the first release switch is ON, it is checked in step D128 if focusing is disabled. If it is determined that focusing is disabled, the subroutine is ended. On the other hand, if it is determined that focusing is not disabled, it is checked in step D130 if an in-focus state is attained. If it is determined that the in-focus state is attained, a lens drive subroutine is executed on the basis of focusing lens drive amount data calculated in the distance measurement routine in step D132.

Upon completion of the lens drive operation, the infinity reset flag is reset in step D134, and it is then checked in step D136 if the lens is located at the closest end. If it is determined that the lens is not located at the closest end, the subroutine is ended. On the other hand, if it is determined that the lens is located at the closest end, the lens scan request flag is reset in step D138, the lens scan end flag is set in step D140, and the auxiliary light flag is reset in step D142. Thereafter, the flow returns to the main routine.

When the above-mentioned processing is repeated according to a command in the main routine, AF control is performed.

The exposure judgment/exposure subroutine in step A076 in the main routine (FIGS. 6A to 6D) will be described below with reference to FIGS. 15 and 15B, and FIGS. 16A and 16B.

In this subroutine, as described above, a judgment for a branch operation to an exposure sequence, and an exposure operation are performed.

In step E002, the ON/OFF state of the PW switch 217 or 301 is checked. If it is determined that the PW switch 217 or 301 is OFF, an exposure flag 1 is cleared in step E038, and the flow returns to the main routine. The exposure flag 1 is a judgment flag after the flow returns to the main routine, and is used in step A078 in FIGS. 6A to 6D. This flag is set to be "1" when exposure is performed, and is set to be "0" when no exposure is performed.

If it is determined that the PW switch 217 or 301 is ON, it is checked in step E004 if an exposure request code is set. Other request codes are judged in the main routine. However, the exposure request code is processed in this subroutine. The exposure request code is set about 12 sec after the timer is started in the self-timer mode. If it is determined that the exposure request code is set, the flow jumps to step E044.

If it is determined that the exposure request code is not set, it is checked in step E006 if the self timer is being operated. If it is determined that the self timer is being operated, the flow jumps to step E038. On the other hand, if it is determined that the self timer is stopped, the ON/OFF state of the first release switch is checked in step E008. If it is determined that the first release switch is ON, the ON/OFF state of the second release switch is checked in step E010. In this case, if it is determined that one of the first and second release switches is OFF, the flow jumps to step E038. However, if it is determined that both the release switches are ON, step E014 is executed.

It is checked in step E014 if the focusing mode is the power-focusing (PF) mode. If it is determined that the PF mode is selected, since an in-focus judgment is unnecessary, the flow jumps to step E022. On the other hand, if it is determined that the PF mode is not selected, it is checked in step E016 if the portrait mode is selected. If it is determined that the portrait mode is selected, it is checked in step E018 if auto-zooming processing is ended. If it is determined that the auto-zooming processing is not ended, the flow jumps to step E038.

If it is determined that the auto-zooming processing is ended, it is checked in step E020 if an in-focus state is attained. If it is determined that the in-focus state is not attained, the flow jumps to step E038. On the other hand, if it is determined that the in-focus state is attained, it is checked in step E022 if the self-timer mode is set. If it is determined that the self-timer mode is set, the self-timer operation flag is set in step E024, and no exposure is performed. With this flag, the self timer is started. At this time, the intra-finder display LCD 271 is turned off in step A068 in the main routine (FIGS. 6A to 6D), thus informing to a photographer that the self timer is started. Thereafter, step E038 is executed, and the subroutine is ended.

On the other hand, if it is determined in step E022 that the self-timer mode is not set, it is checked in step E034 if the drive mode is the single mode or the continuous mode. If it is determined that the single mode is selected, the state of an exposure flag 2 is checked in step E036. The exposure flag 2 is set in step E072 (to be described later) when exposure is performed, and is not cleared until the first release switch is turned off. Therefore, once a photographing operation is performed in the single mode, the next photographing operation cannot be performed unless the release switch 305 is released.

If it is determined in step E034 that the continuous mode is selected, step E044 and subsequent steps are executed. In step E044 and subsequent steps, exposure processing is executed.

In step E044, a printing flag is set. The printing flag is cleared in step E048 when it is determined in step E046 that a second photographing operation in the double-exposure photographing mode is performed. With this printing flag, a date printing operation is executed in step E056 (exposure subroutine; to be described later).

Subsequently, the in-focus flag, and the focusing disable flag are respectively cleared in steps E050 and E052, and a battery check subroutine is executed in step E054. In the battery check subroutine, the voltage level of the battery 221 is checked. In the camera apparatus of this embodiment, four voltage levels are set. The voltage of the battery 221 is measured by operating the dummy load 211 connected to the IFIC 210. When a battery voltage output selection command is transmitted while the dummy load 211 is operated, a voltage obtained by level-converting the voltage of the battery 221 is output to a port, connected to the A/D port of the main CPU 200, of the output ports of the IFIC 210. The main CPU 200 A/D-converts the input voltage, and determines the level of the battery. The first level is a level near that of a new battery, and no problem is posed. When the battery has the second level, the duty of the duty-driven zooming motor is increased to perform a zooming operation at high speed. This is to make a zooming drive speed almost constant regardless of the voltage of the battery 221. When the battery has the third level, since the battery is nearly discharged, an alarm must be generated to urge a user to exchange the battery. This alarm is performed by blinking a battery mark display on the LCD panel 322 or 281. The fourth level is a level at which camera operations cannot be assured. In this case, a battery mark is displayed (all other displays are turned off) in the battery subroutine, and all the operations except for an operation of the PW switch 217 or 301 are inhibited. Only when the PW switch 217 or 301 is turned off, the same power-down processing as in step A082 in the main sequence (FIGS. 6A to 6D) is executed.

If the battery level is one of the first to third levels, the exposure subroutine is executed in step E056, thus performing an exposure operation.

After the exposure operation, the respective flags are set/reset (steps E058 to E072), and the flow then returns to the main routine.

Figure 16A:
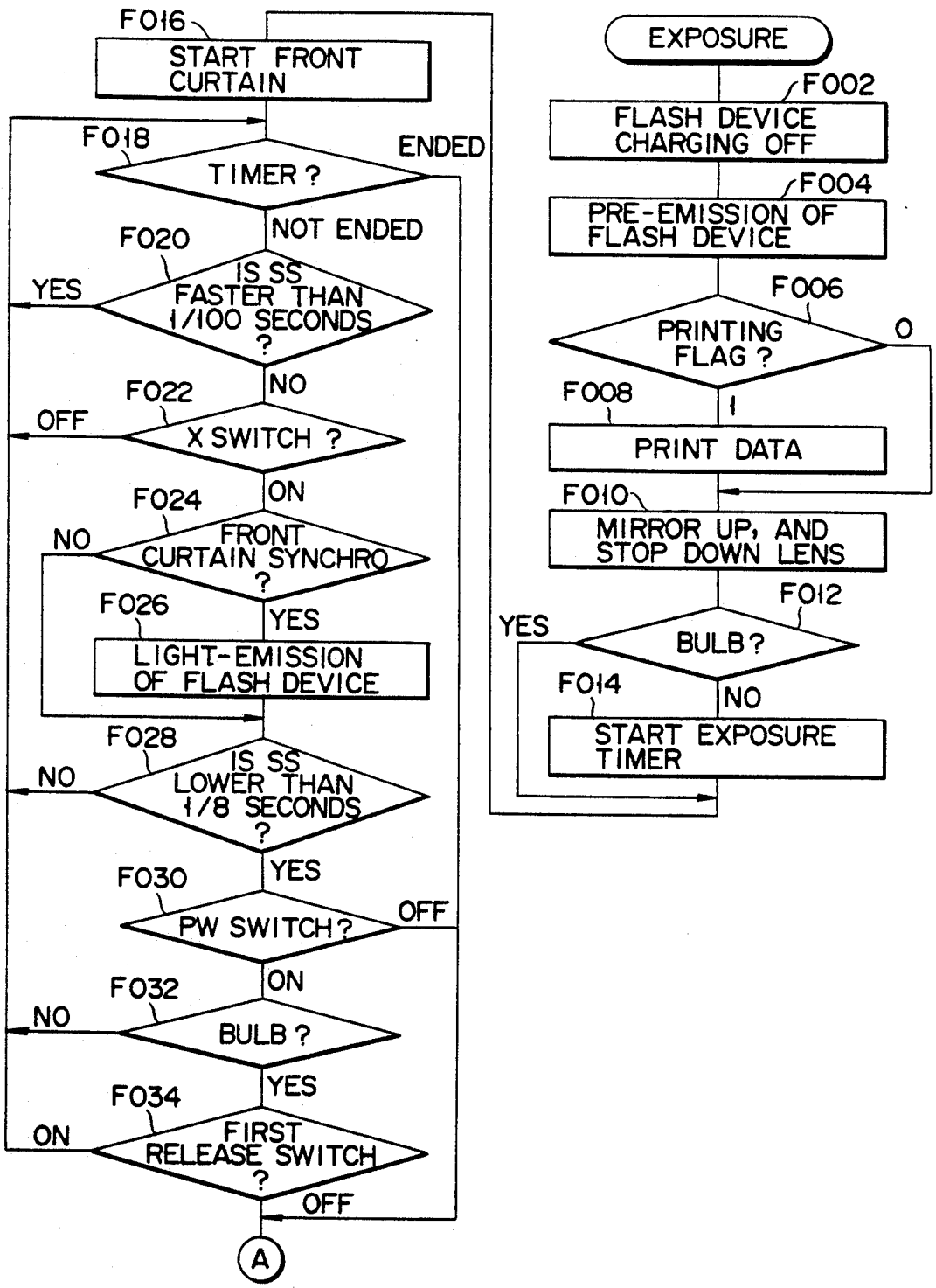

The exposure subroutine in step E056 will be described below. FIGS. 16A and 16B are flow charts showing the exposure subroutine.

In step F002, a charging operation of the flash device is stopped.

In step F004, pre-emission of the flash device is performed to prevent a red eye phenomenon, as needed. As shown in FIGS. 2A and 2B, the flash device includes the TELE Xe tube 233, and the WIDE Xe tube 235. For pre-emission, the WIDE Xe tube 235 is used, and for main emission for a photographing operation, one or a combination of the TELE Xe tube 233, the WIDE Xe tube 235, and the external flash device are used.

In step F006, the state of the printing flag is checked. As described above, the printing flag is a flag for setting whether or not a date printing operation is performed. When the printing flag is set, a printing trigger signal is output from the main CPU 200 to the date module 284 in step F008. The date printing operation is switched depending on the sensitivity of a film to be used, and is set when the film sensitivity is input in step A050 in the main routine (FIGS. 6A to 6D).

In step F010, a mirror-up operation, and a stop-down operation are performed.

It is checked in step F012 if a photographing mode is a bulb mode. In the bulb photographing mode, an exposure operation is continued while the release switch 305 is depressed, and in this case, an exposure timer is not started.

In step F016 and subsequent steps, exposure processing is executed.

In step F016, the front curtain is started.

Thereafter, an exposure operation is continued while a loop consisting of steps F018 to F034 is repetitively executed. The exposure operation is basically ended when the timer is ended in step F018.

It is checked in step F020 if a shutter speed is faster than 1/100 sec. If it is determined that the shutter speed is faster than 1/100 sec, the flow jumps to step F018.

More specifically, when the shutter speed is faster than 1/100 sec, the exposure operation is ended only when the timer is ended in step F018.

It is then checked in step F022 based on the X switch if the drive operation of the front curtain is ended. If it is determined that the drive operation of the front curtain is not ended, the flow jumps to step F018. On the other hand, if it is determined that the drive operation of the front curtain is ended, it is checked in step F024 if a front curtain synchro mode is selected. If it is determined that the front curtain synchro mode is selected, light emission operations of the built-in and external flash devices are performed in step F026.

It is then checked in step F028 if a shutter speed defines a long time exposure longer than ⅛ sec. If it is determined that the shutter speed is faster than ⅛ sec, the flow jumps to step F018. On the other hand, if it is determined that the shutter speed > ⅛ sec, the ON/OFF state of the PW switch 217 or 301 is checked in step F030. If it is determined that the P switch 217 or 301 is OFF, the flow jumps to step F036. More specifically, when the shutter speed defines a long exposure time longer than ⅛ sec, the exposure operation is also ended when the PW switch 217 or 301 is turned off.

It is checked in step F032 if the bulb photographing mode is selected. If it is determined that the bulb photographing mode is not selected, the flow jumps to step F018. On the other hand, if it is determined that the bulb photographing mode is selected, the ON/OFF state of the first release switch is checked. If it is determined that the first release switch is ON, the flow jumps to step F108; otherwise, the exposure operation is ended. More specifically, when the bulb photographing mode is selected, the exposure operation can be ended by turning off the first release switch.

When the exposure operation is completed, it is checked again if the shutter speed is longer than 1/100 sec. If it is determined that the shutter speed is slower than 1/100 sec, it is checked if a rear curtain synchro mode is selected. If it is determined that the rear curtain synchro mode is selected, light-emission control of the built-in and external flash devices is performed in step F040.

If the night-view mode is selected, the shutter check code speed is longer than ⅛ sec (step F042), and an inter-exposure zooming mode is selected (step F044), the inter-exposure zooming operation is executed in step F046. In the inter-exposure zooming mode, a zooming is performed during exposure to continuously change the focal length of the lens. In the camera apparatus of this embodiment, a zooming operation is performed in a direction indicated by the ZOOM.WIDE switch 303 or the ZOOM.TELE switch 304 before the exposure operation is started for a time period equal to an exposure time or until the lens reaches the end portion.

Upon completion of the above-mentioned processing, the rear curtain is moved to end the exposure operation in step F048. In step F050, a mirror-down operation, an aperture opening operation, and the like are performed to prepare for the next exposure operation.

In steps F052 to F056, a film windup operation after the exposure operation is performed. When the first photographing operation in the double-exposure mode is completed, a flag is set, but no windup operation is performed.

The portrait mode will be described in more detail below.

The characteristic feature of the portrait mode is to perform an open-aperture priority program AE operation for decreasing the depth of field to be photographed, and to have a so-called auto-zooming function for automatically performing a zooming operation to a focal length for setting a given photographing magnification given by equation (1) above, so that the size of an image on a film surface can be made constant regardless of an object distance.

The auto-zooming function will be described in detail below.

When the portrait mode is selected (i.e., the auto-zooming mode is selected) in the mode/request code setting subroutine (FIGS. 7A to 7H-II), a zooming operation is initially performed to a standard position. In order to clearly indicate that control enters the auto-zooming mode, dummy data including a photographing magnification of 1/50, and an object distance of 3 m is input, and a zooming operation is performed to a focal length of 60 mm. The dummy data is held until object distance data is input in the following auto-focusing operation. When object distance data is input by the auto-focusing operation, a photographing magnification is calculated according to equation (1) above, and a zooming operation is performed.

When the portrait mode is selected, if it is determined in step D014 (FIGS. 14A-I and 14A-II) in the AF control subroutine that the first release switch is ON, the focusing lens is temporarily reset to the infinity position in step D024. As described above, the object distance is obtained by detecting an extension amount of the focusing lens from the infinity position by the AF photointerrupter 262. In this case, when the focusing lens is repetitively driven, precision of distance data is degraded since an error caused by mechanical cluttering of a lens frame is accumulated. Therefore, the focusing lens is reset to the infinity position as a reference position, thereby improving precision of the auto-zooming operation.

If it is determined in step D060 that an in-focus state is attained (FIG. 14B), the auto-zooming subroutine is executed in step D066, and a zooming operation is performed according to equation (1) above. Thereafter, the control enters the release sequence.

As a photographing magnification, ×1/70 for photographing the whole body, ×1/50 for photographing an upper body, and ×1/30 for taking a bust shot can be set. In the portrait mode, when it is detected that the ZOOM.WIDE switch 303 or the ZOOM.TELE switch 304 is ON, photographing magnification data is changed in step B200 in the mode/request code setting subroutine (FIGS. 7A to 7H-II). When the ZOOM.WIDE switch 303 is turned on, the photographing magnification data is changed in the order of ×1/30, ×1/50, and ×1/70, and when the ZOOM.TELE switch 304 is turned on, it is changed in the order of ×1/70, ×1/50, and ×1/30. However, when the photographing magnification exceeds a limit value (×1/30 or ×1/70), the data is left unchanged. When the photographing magnification is changed to the high-magnification side, and the zooming lens is not located at the TELE end, or when the photographing magnification is changed to the low-magnification side, and the zooming lens is not located at the WIDE end, a zooming request code upon a change in magnification is set in step B204 in the mode/request code setting subroutine, thus executing a zooming operation.

Figure 17:
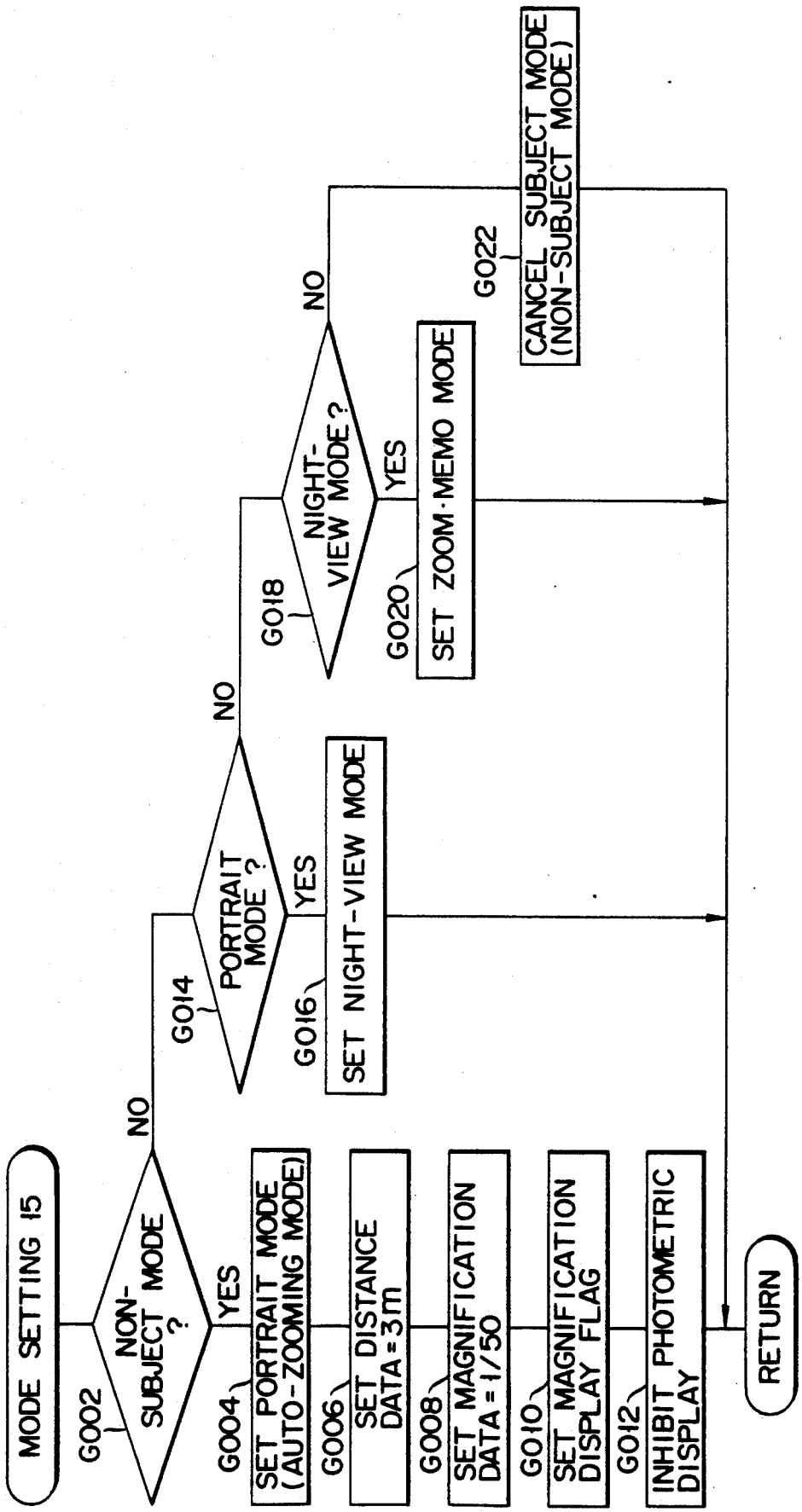
FIG. 17 is a flow chart for explaining the content of mode setting step B180 shown in FIG. 7F.
Figure 18:
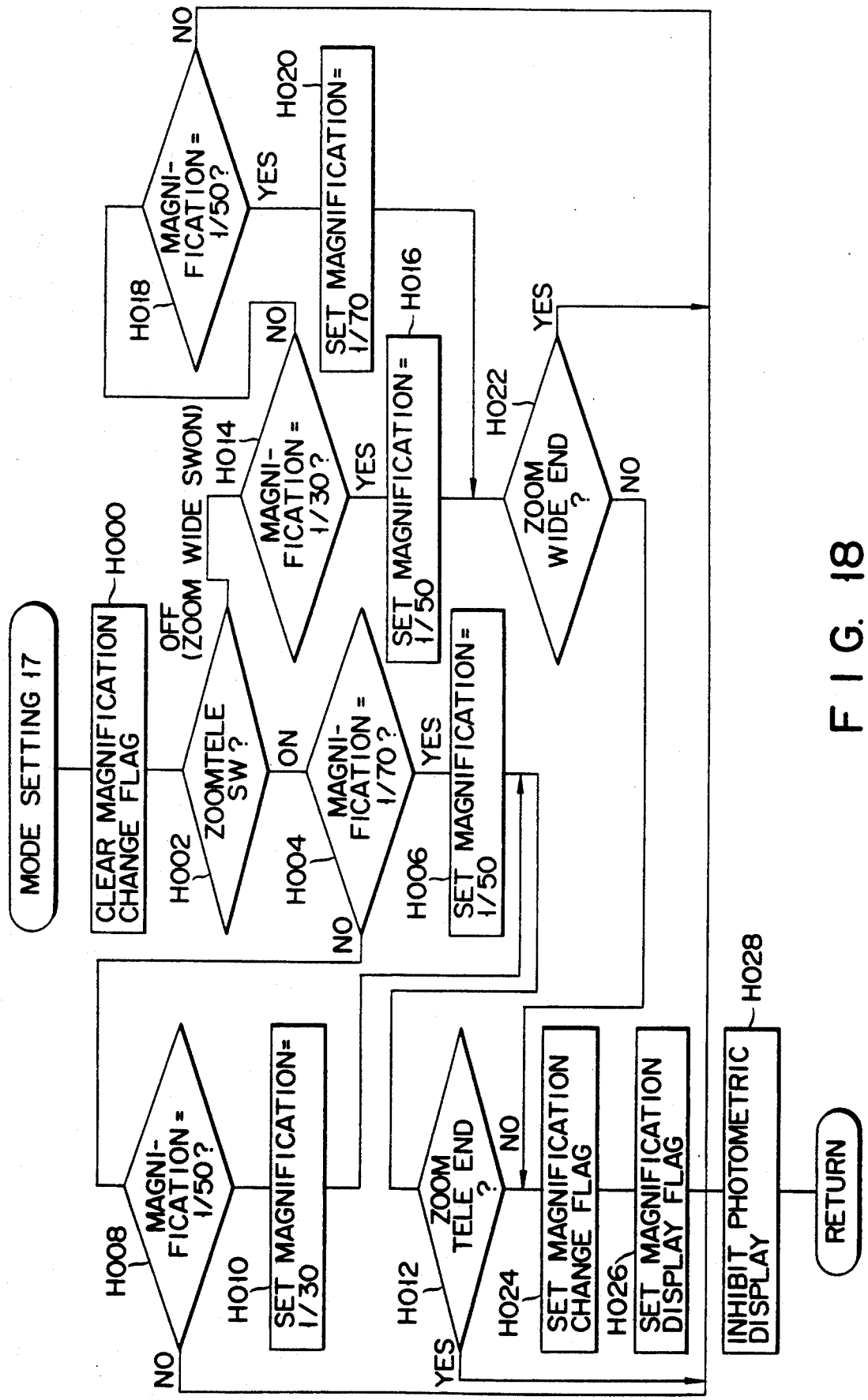
FIG. 18 is a flow chart for explaining the content of mode setting step B200 shown in FIG. 7F.

The above-mentioned processing will be described in detail below with reference to FIGS. 17 and 18. FIG. 17 is a flow chart showing step B180 in FIGS. 7F-I and 7F-II, and FIG. 18 is a flow chart showing step B200 in FIGS. 7F-I and 7F-II. In FIG. 17, steps G002, G004, and G014 to G022, the non-subject mode, the portrait mode (auto-zooming mode), the night-view mode, and the zooming memory mode are switched in turn, as described above (see step B178). Thus, every time the SUBJECT switch 315 is depressed, the mode is switched in turn. Furthermore, when the portrait mode is set, dummy distance data (3 m) is set in step G006, and initial magnification data is set in step G008. In step G101, a magnification display flag is set, and in step G012, a photometric display started when the first release switch is turned on (step B226 in FIG. 7G, and step B228 in FIGS. 7H-I and 7H-II), and the SPOT switch is turned on (step B136 in FIG. 7E) is inhibited (a photometric display flag is cleared). Thus, as will be described later, an auto-zooming magnification display is made in place of a shutter speed display. After the subroutine is ended, a standard zooming request (equivalent to a magnification change request in step B204) code is set in step B184 in FIGS. 7F-I and 7F-II, and a zooming operation is performed to a focal length corresponding to (object distance)×(magnification) in step A126 in FIGS. 6A to 6D.

FIG. 18 shows a case wherein the ZOOM.TELE switch 304 or ZOOM.WIDE switch 303 is depressed in the portrait mode.

In step H002, it is checked whether the ZOOM.TELE switch 304 or ZOOM.WIDE switch 303 is turned on. If it is determined that the ZOOM.TELE switch 304 is ON, a setting magnification is shifted toward the high-magnification side in steps H004 to H010, and if it is determined that the zooming lens is not located at the TELE end (step H012), a magnification change flag is set in step H024. If it is determined in step H002 that the ZOOM.TELE switch 304 is not ON, it is determined that the ZOOM.WIDE switch 303 is ON, and the magnification is shifted toward the low-magnification side in steps H014 to H020. If it is determined in step H022 that the zooming lens is not located at the WIDE end, a magnification change flag is set in step H024. Steps H026 and H028 are the same as steps G010 and G012 in FIG. 17.

After the subroutine is ended, the magnification change flag set in step H024 in FIG. 18 is checked in step B202 in FIGS. 7F-I and 7F-II, and if the magnification is changed, a magnification change zooming request code is set in step B204. In step A126 in FIGS. 6A to 6D, a zooming operation is executed.

A photographing magnification display will be described below

As described above, three photographing magnifications of ×1/30, ×1/50, and ×1/70 are available. Since a display of "1/30", "1/50", or "1/70" is not familiar to a user, ×1/30 is displayed as "1", ×1/50 is displayed as "2", and ×1/70 is displayed as "3". These displays are made on the shutter speed display sections on the LCD panel 322 or 281 shown in FIG. 4, and the intra-finder display LCD 271 shown in FIG. 5. Since a photographing magnification is displayed on the shutter speed display section, neither extra liquid crystal driver nor display segments are required. Since the shutter speed display section is arranged adjacent to a portrait mode mark, a magnification display can be made in association with the portrait mode.

A display is switched by checking a photometric display flag and a magnification display flag in the display subroutine, and switching data to the LCDIC 283. The magnification display flag is set when the portrait mode is set, and when a magnification is changed upon operation of the ZOOM.WIDE switch 303 or the ZOOM.TELE switch 304. In this case, the photometric display flag is cleared. On the other hand, the magnification display flag is cleared when the first release switch is turned on, or when a photometric calculation is started by turning on the SPOT switch 310. In this case, the photometric display flag is set. These flags are set/cleared in the mode/request code setting subroutine.

FIG. 19 shows a display state of the LCD panel 322 or 281 when a shutter speed is displayed, and FIG. 20 shows a display state of the LCD panel 322 or 281 when a photographing magnification is displayed. When a photographing magnification is displayed, an f-number display is also inhibited.

Figure 21A:
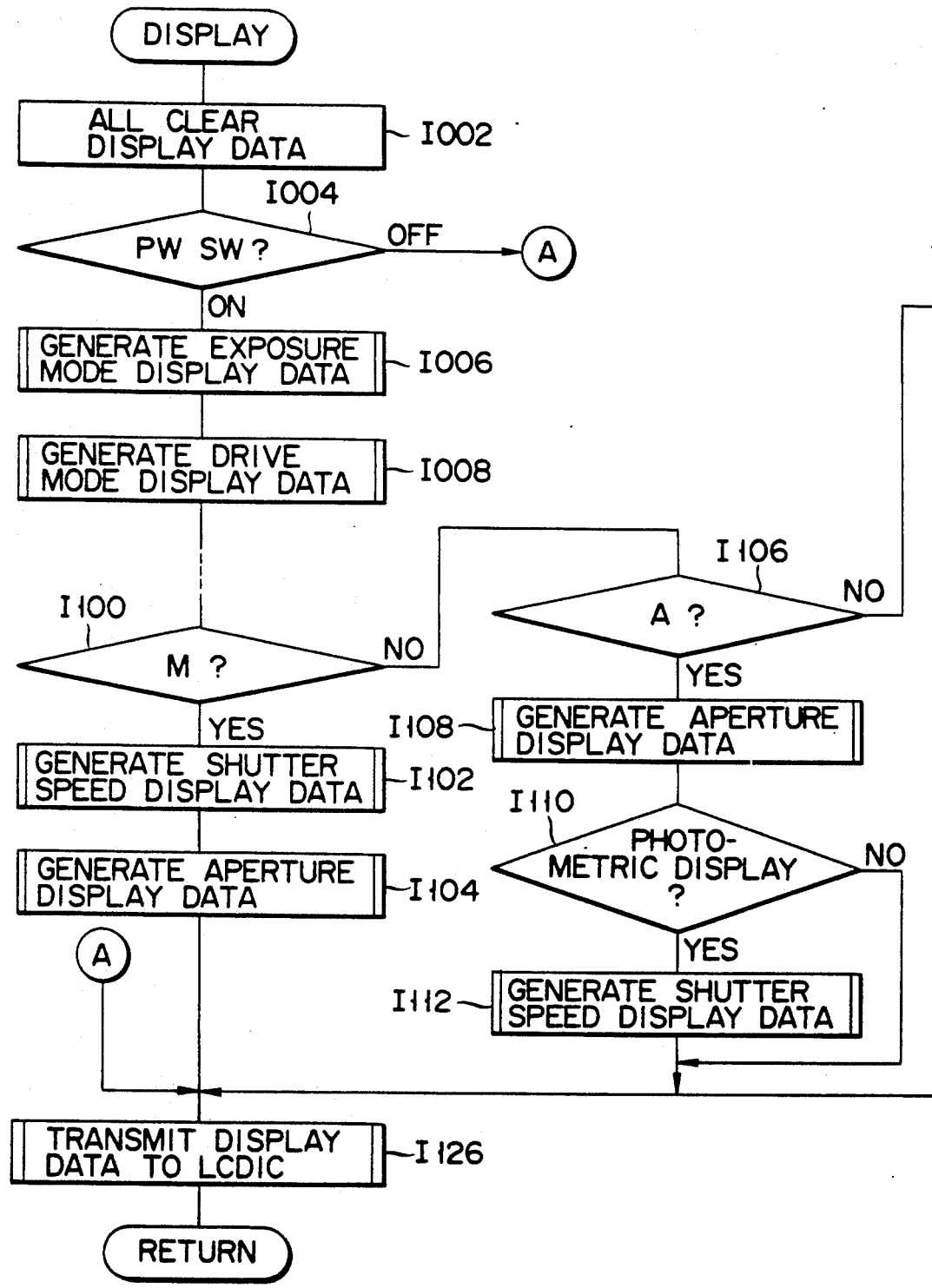
FIGS. 21A and 21B are flow charts showing some steps of a display subroutine in step A068 shown in FIGS. 6A to 6D.
Figure 21B:
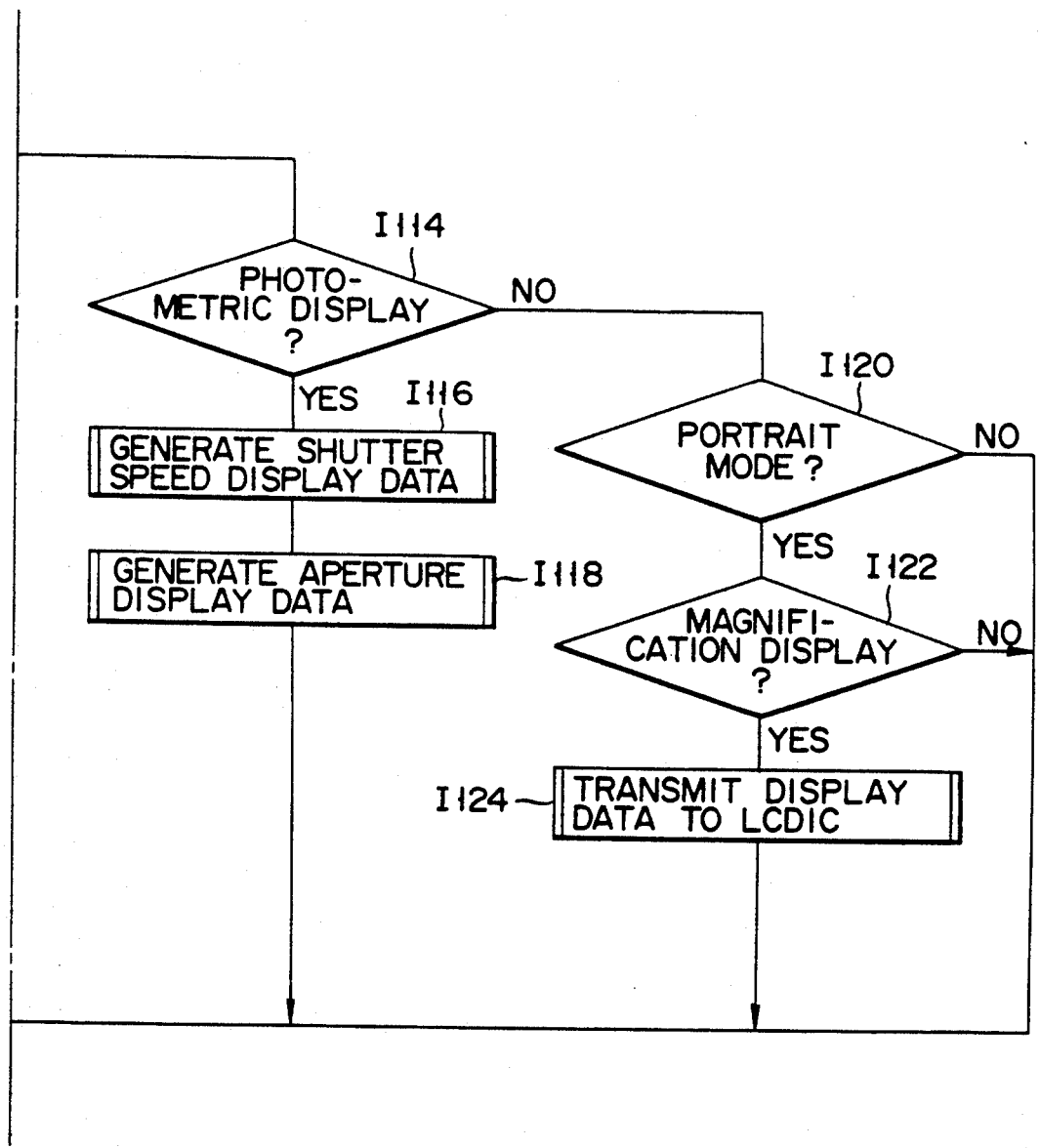

FIGS. 21A and 21B are charts showing some steps of the display subroutine in step A068 in FIGS. 6A to 6D. In step I002, display data of the main CPU 200 is temporarily cleared. If it is determined in step I004 that the PW switch 217 or 301 is OFF, the flow jumps to step I126, and the cleared data is transferred to the LCDIC 283, thus turning off all the displays. If it is determined in step I004 that the PW switch is ON, display data is generated according to respective data in steps I006 to I104, and is transferred to the LCDIC 283 in step I126, thus making an LCD display. In this case, in step I006, which one of "P", "A", and "M" of the LCD is displayed is determined based on the exposure mode data, and display data is set. In step I008, which one of "S", "C", and "D.EXP" is displayed is determined based on the drive mode data, and display data is set. Display data of the respective modes are similarly calculated, and these steps are omitted from FIGS. 21A and 21B Finally, in step I100 and subsequent steps, display data for the shutter speed display section, and the f-number display section are generated. In step I100, it is checked if the exposure mode is the manual mode. If it is determined that the manual mode is selected, display data for a shutter speed display and an aperture display are generated in accordance with TVE and AVE calculated in the APEX calculation subroutine in step A064 in FIGS. 6A to 6D in steps I102 and I104.

If it is determined that the manual mode is not selected, and if it is determined in step I106 that the aperture priority mode is selected, aperture display data is generated in step I108. If it is determined in step I110 based on the photometric display flag (this flag is set when the first release switch is ON or when the spot photometric operation is started) that a photometric display is started, shutter speed data is generated in step I112. If step I112 is not executed, since display data is cleared in step I002, no data can be displayed on the shutter speed display section, as a matter of course. If it is determined in step I106 that the aperture priority mode is not selected (i.e., the program exposure mode is selected), the photometric display flag is checked in step I114. If it is determined that the photometric display is performed, shutter speed display data, and aperture display data are generated in steps I116 and I118; otherwise, it is checked in step I120 if the portrait mode is selected. If it is determined that the portrait mode is selected, and if it is determined in step I122 that a magnification display is performed, magnification display data is generated in step 1124, and is set in a shutter speed display section data area.

Figure 23:
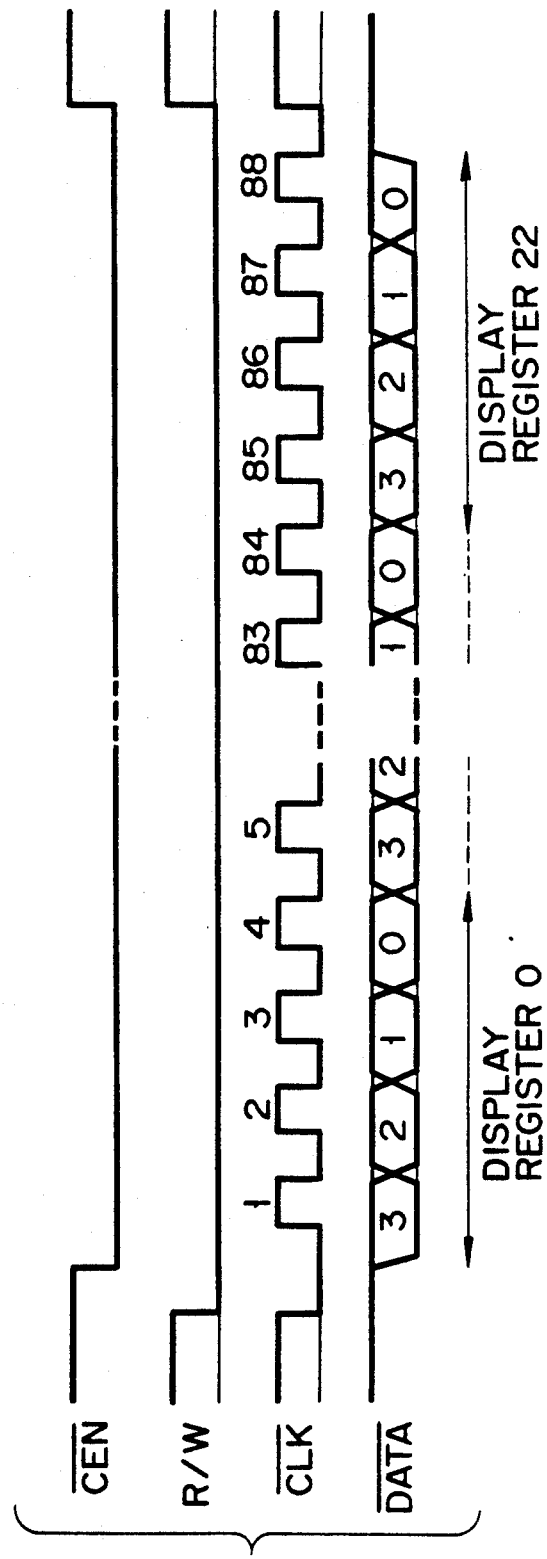
FIG. 23 is a timing chart showing data write timings to an LCDIC 283.

FIG. 22 is a schematic block diagram showing an arrangement of the LCDIC 283. In FIG. 22, reference numeral 1901 denotes a 22-bit LCD segment driver; 1902, a 4-bit LCD common driver; 1903, a 4-bit, 22-stage display register; 1904, an input/output buffer; 1905, a 4-bit serial/parallel conversion shift register; 1906, a ¼ counter; 1907, a 5-bit address counter; 1908, a control circuit; 1909, a 10-bit key register & chattering removal circuit; 1910, an oscillation circuit; and 1911, a frequency-dividing circuit. FIG. 23 is a timing chart showing a data write operation to the LCDIC 283.

Figures 25A, 25B:
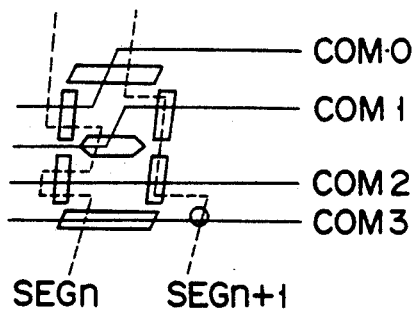
FIGS. 25A and 25B are schematic views showing data when the COM and SEG signals shown in FIG. 22 are assigned to a numeral display 7-segment LCD.

In the display subroutine, display data are calculated on the basis of corresponding data, and 88 data are transferred to the LCDIC 283 via a serial communication. The 88 data are latched by the 4-bit 22-stage display register 1903, and the 88 display segments are selectively displayed by the LCD segment driver 1901 on the basis of the latched data. FIG. 24A shows the relationship between the segments, and COM and SEG signals shown in FIG. 22, and FIGS. 24B and 24C show drive waveforms. FIG. 25A shows the relationship between a 7-segment LCD for displaying a numeral, and COM and SEG signals, and FIG. 25B shows data when this LCD is turned on. Since three 7-segment displays, and one segment for displaying "0" are assigned to the shutter speed display section, for example, if a shutter speed "125" is to be displayed, "00110000", "00111110", "01011011", and "0" are transmitted to the LCDIC 283. If a photographing magnification "2" is to be displayed, "00111110", "00000000", "00000000", and "0" are transmitted.

In this embodiment, a shutter speed and a photographing magnification are selectively displayed in this manner.

As described above, according to the present invention, a photographing magnification is displayed without increasing the number of display means, or a photographing magnification is changed and displayed without increasing the number of operation switches. Therefore, an inexpensive camera apparatus having photographing magnification setting and displaying functions with good operability can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:
1. An auto-zooming camera comprising:
    a photographing lens system including at least a zooming lens;
    a photometric circuit for measuring brightness of an object;
    an exposure calculation circuit for calculating an exposure value in accordance with an output from said photometric circuit;
    a distance measurement circuit for measuring a distance to the object;
    a magnification setting circuit for determining a photographing magnification on a film arranging surface on which an image of the object is to be formed;
    an auto-zooming calculation circuit for determining a focal length of said photographing lens system in accordance with an output from said magnification setting circuit and an output from said distance measurement circuit;
    drive means for driving said zooming lens in accordance with an output from said auto-zooming calculation circuit;
    a release button which is operated in a photographing operation;
    a switch which is turned on by a first depression state of said release button;
    a switching circuit, connected to said switch, said exposure calculation circuit, and said magnification setting circuit, for outputting a first value according to a setting value of said magnification setting circuit before said switch is turned on, and outputting a second value according to an output from said exposure calculation circuit after said switch is turned on;
    a display circuit which is operated according to an output from said switching circuit; and
    display means for selectively displaying the first and second values in accordance with an output from said display circuit.

2. A camera according to claim 1, wherein said display means includes a first display member arranged on an outer surface of a camera main body, and a second display member arranged in a finder of said camera main body.

3. An auto-zooming camera comprising:
    first setting means for setting an exposure data value including at least one of a shutter speed value, and an aperture value;
    a zooming lens;
    a drive source for moving said zooming lens;
    distance measurement means for measuring a distance to an object;
    second setting means for setting a photographing magnification for determining a size when an image of the object is formed on a film arranging surface;
    calculation means for calculating an output from said distance measurement means, and an output from said second setting means to determine a focal length value;
    auto-zooming control means for operating said drive source in accordance with an output from said calculation means; and
    selective display means for selectively displaying the exposure data value from said first setting means, and the photographing magnification value from said second setting means in a finder of a camera main body.

4. A camera according to claim 3, further comprising a shutter release button operated in a photographing operation, and wherein said selective display means includes means for displaying the photographing magnification value before said shutter release button is depressed, and displaying the exposure data value after said shutter release button is depressed.

5. A camera having an auto-zooming mode for automatically performing a zooming operation to a focal length obtained based on object distance data from a distance measurement device, and a selected photographing magnification, comprising:
    a photometric circuit for measuring brightness of an object;
    calculation means for calculating an exposure control value in accordance with an output from said photometric circuit;

magnification setting means for setting a photographing magnification value used in an operation in the auto-zooming mode;

release means for generating at least a first release signal during a photographing operation;

selection means for selecting one of the exposure control value from said calculation means, and the photographing magnification value from said magnification setting means, said selection means selecting the photographing magnification value before the first release signal is input from said release means, and selecting the exposure control value after the first release signal is input; and display means for displaying the value selected by said selection means.

6. A camera according to claim 5, wherein said display means includes means for displaying the photographing magnification value as a specific symbol.

7. A camera according to claim 6, wherein said means for displaying the photographing magnification as the specific symbol includes means for displaying a numeral corresponding to the photographing magnification value.

8. A camera having an auto-zooming mode for automatically performing a zooming operation to a focal length obtained based on object distance data from a distance measurement device, and a selected photographing magnification, comprising:

a photometric circuit for measuring brightness of an object;

calculation means for calculating an exposure control value in accordance with an output from said photometric circuit;

magnification setting means for setting a photographing magnification value used in an operation in the auto-zooming mode; and display means for displaying one of the exposure control value from said calculation means, and the photographing magnification value from said magnification setting means, said display means displaying the photographing magnification value before a photographing operation by said camera is started, and displaying the exposure control value after the photographing operation is started.

9. A camera having a power-zooming mode for causing a drive source, which is selectively operated in one of forward and reverse directions, to move a zooming-lens optical system, and an auto-zooming mode for causing said drive source to move said zooming-lens optical system on the basis of a value determined according to an output from photographing magnification setting means for determining a size when an image of an object is formed on a film, and an output from distance measurement means for measuring a distance to the object, comprising:

mode switching means for selecting one of the power-zooming mode and the auto-zooming mode;

an operation member for selectively outputting one of outputs indicating the forward and reverse directions;

control means for determining an operation direction of said drive source in the power-zooming mode, and for changing a setting value set by said photographing magnification setting means in the auto-zooming mode, in accordance with an operation of said operation member; and display means for displaying the setting value set by said photographing magnification setting means and the setting value changed by said control means.

10. A camera having a power-zooming mode for causing a drive source, which is selectively operated in one of forward and reverse directions, to move a zooming-lens optical system, and an auto-zooming mode for causing said drive source to move said zooming-lens optical system on the basis of a value determined according to a output from photographing magnification setting means for determining a size when an image of an object is formed on a film, and an output from distance measurement means for measuring a distance to the object, comprising:

mode switching means for selecting one of the power-zooming mode and the auto-zooming mode;

a first display member for displaying the auto-zooming mode when the auto-zooming mode is selected by said mode switching means;

a second display member, arranged adjacent to said first display member, for displaying data according to the photographing magnification set by said photographing magnification setting means;

an operation member for selectively outputting one of outputs indicating the forward and reverse directions; and control means for determining an operation direction of said drive source in the power-zooming mode, and for changing a setting value set by said photographing magnification setting means in the auto-zooming mode, in accordance with an operation of said operation member.

11. A camera according to claim 10, wherein said first display member is arranged in a finder of a camera main body.

12. A camera according to claim 10, wherein said second display member is arranged adjacent to said first display member in a finder of a camera main body.

13. An auto-zooming camera comprising:

a zooming lens;

a drive source for moving said zooming lens;

distance measurement means for measuring a distance to an object;

photographing magnification setting means for determining a size when an image of the object is formed on a film arranging surface;

calculation means for calculating an output from said distance measurement means, and an output from said photographing magnification setting means to determine a focal length value of said zooming lens;

auto-zooming control means for operating said drive source in accordance with the output from said calculation means;

a manual operation member;

switching means for selectively transmitting an output from said manual operation member to one of said drive source and said photographing magnification setting means; and display means for displaying a photographing magnification determined by said photographing magnification setting means, wherein said manual operation member sets a moving direction of said drive source, and the photographing magnification value to be set by said photographing magnification setting means.

14. An auto-zooming camera comprising:

a zooming lens;

a manual zooming switch;

a zooming lens drive circuit for changing a focal length of said zooming lens in accordance with a output from said manual zooming switch;

a photographing magnification setting circuit;

an auto-zooming calculation circuit for determining the focal length of said zooming lens in accordance with object distance data, and an output from said photographing magnification setting circuit;

a mode setting circuit for setting one of a power-zooming mode for setting the focal length in accordance with an output from said zooming switch, and an auto-zooming mode for setting the focal length in accordance with an output from said auto-zooming calculation circuit as a zooming control mode;

display means for displaying a photographing magnification set by said photographing magnification setting circuit; and an output switching circuit, inserted between said zooming switch and said zooming lens drive circuit, for preventing an output from said zooming switch from being transmitted to said zooming lens drive circuit upon reception of an auto-zooming mode output from said mode setting means, and transmitting the output from said zooming switch to said photographing magnification setting circuit instead.

15. A lens driving apparatus for performing a power-zooming operation, comprising:

a zooming lens;

a manual operation member for outputting a signal according to a manual operation;

first zooming means for performing a manual power-zooming operation of said zooming lens in accordance with the signal from said manual operation member;

distance measurement means for outputting object distance data;

photographing magnification setting means for setting photographing magnification data;

second zooming means for performing an automatic power-zooming operation of said zooming lens to a target focal length obtained based on the object distance data from said distance measurement means, and the photographing magnification data set by said photographing magnification setting means, said second zooming means including means for storing a plurality of photographing magnification data, means for selecting one of the stored photographing magnification data in turn every time the signal is input from said manual operation member, and updating means for updating the already set photographing magnification data with the selected photographing magnification data;

mode setting means for setting one of a manual power-zooming mode and an automatic power-zooming mode for the power-zooming operation;

control means for operating one of said first and second zooming means in accordance with an operation mode set by said mode setting means; and display means for displaying the photographing magnification data set by said photographing magnification setting means, and the photographing magnification data updated by said updating means.

16. A lens driving apparatus comprising:

a zooming lens;

a manual operation member for indicating a zooming direction of said zooming lens;

first zooming means for performing a manual power-zooming operation of said zooming lens in accordance with an operation of said manual operation member;

distance measurement means for outputting object distance data;

setting means for setting photographing magnification data;

second zooming means for performing an automatic power-zooming operation of said zooming lens to a focal length obtained based on the object distance data from said distance measurement means, and the photographing magnification data set by said setting means;

mode setting means for setting one of a manual power-zooming mode and an automatic power-zooming mode for the power-zooming operation;

first control means for operating one of said first and second zooming means in accordance with an operation mode set by said mode setting means;

second control means for providing a function of changing the photographing magnification data to said manual operation member while said first control means causes said second zooming means to execute the automatic power-zooming operation; and display means for displaying the photographing magnification data set by said setting means, and photographing magnification data changed by said manual operation member.

17. An apparatus according to claim 16, wherein said second control means includes means for selecting one of a plurality of photographing magnification data prepared in advance in turn every time said manual operation member is operated, and replacing the already set photographing magnification data with the selected photographing magnification data.

* * * * *